(12) United States Patent
Xiong et al.

(10) Patent No.: US 11,989,482 B2
(45) Date of Patent: May 21, 2024

(54) SPLIT-SCREEN PROJECTION OF AN IMAGE INCLUDING MULTIPLE APPLICATION INTERFACES

(71) Applicant: HUAWEI TECHNOLOGIES CO., LTD., Shenzhen (CN)

(72) Inventors: Liudong Xiong, Shenzhen (CN); Chundong Li, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 148 days.

(21) Appl. No.: 17/612,935

(22) PCT Filed: May 26, 2020

(86) PCT No.: PCT/CN2020/092195
§ 371 (c)(1),
(2) Date: Nov. 19, 2021

(87) PCT Pub. No.: WO2020/238871
PCT Pub. Date: Dec. 3, 2020

(65) Prior Publication Data
US 2022/0229624 A1 Jul. 21, 2022

(30) Foreign Application Priority Data
May 29, 2019 (CN) .......................... 201910459096.0

(51) Int. Cl.
*G06F 3/14* (2006.01)
*G06F 3/04817* (2022.01)
(Continued)

(52) U.S. Cl.
CPC ........ *G06F 3/1454* (2013.01); *G06F 3/04817* (2013.01); *G06F 3/0482* (2013.01); *G09G 5/14* (2013.01); *G09G 2354/00* (2013.01)

(58) Field of Classification Search
CPC .................................................... G06F 3/1454
See application file for complete search history.

(56) References Cited

U.S. PATENT DOCUMENTS

| 2010/0257450 A1 | 10/2010 | Go et al. |
| 2013/0014029 A1 | 1/2013 | Hornback, Jr. et al. |
| 2022/0004315 A1 | 1/2022 | Zhang et al. |

FOREIGN PATENT DOCUMENTS

| CN | 103324435 A | 9/2013 |
| CN | 105027060 A | 11/2015 |

(Continued)

OTHER PUBLICATIONS

Machine Translation for CN105100907A Nov. 25, 2015 (Year: 2023).*

(Continued)

*Primary Examiner* — Gustavo Polo
(74) *Attorney, Agent, or Firm* — Rimon PC

(57) ABSTRACT

The present disclosure relates to a screen projection method. In the method, an electronic device displays M application interfaces on a display of the electronic device, where M is an integer greater than 1. The electronic device receives a first selection operation, and determines N application interfaces based on the first selection operation, where the first selection operation is performed on the electronic device to determine the N application interfaces from the M application interfaces, and N is a positive integer less than or equal to M. The electronic device sends first data to an external display device in response to the first selection operation, where the first data is used by the external display device to display the N application interfaces.

18 Claims, 84 Drawing Sheets

(51) Int. Cl.
*G06F 3/0482* (2013.01)
*G09G 5/14* (2006.01)

(56) References Cited

FOREIGN PATENT DOCUMENTS

| CN | 105100907 A | 11/2015 |
| CN | 106959796 A | 7/2017 |
| CN | 108762604 A | 11/2018 |
| CN | 109660842 A | 4/2019 |
| CN | 109766066 A | 5/2019 |
| CN | 110221798 A | 9/2019 |
| EP | 2669788 A1 | 12/2013 |
| KR | 20160092363 A | 8/2016 |

OTHER PUBLICATIONS

ITU-T H.264(Apr. 2017), Series H: Audiovisual and Multimedia Systems, Infrastructure of audiovisual services—Coding of moving video, Advanced video coding for generic audiovisual services, total 812 pages.

* cited by examiner

TO

TO

TO

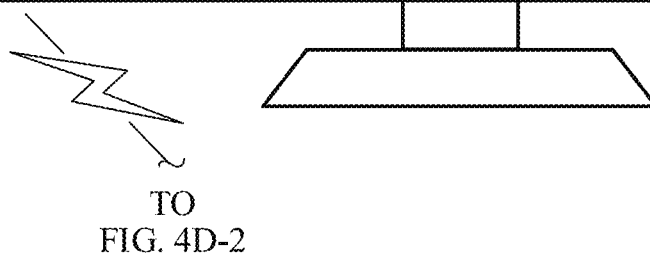
TO
FIG. 4D-2
FIG. 4D-1

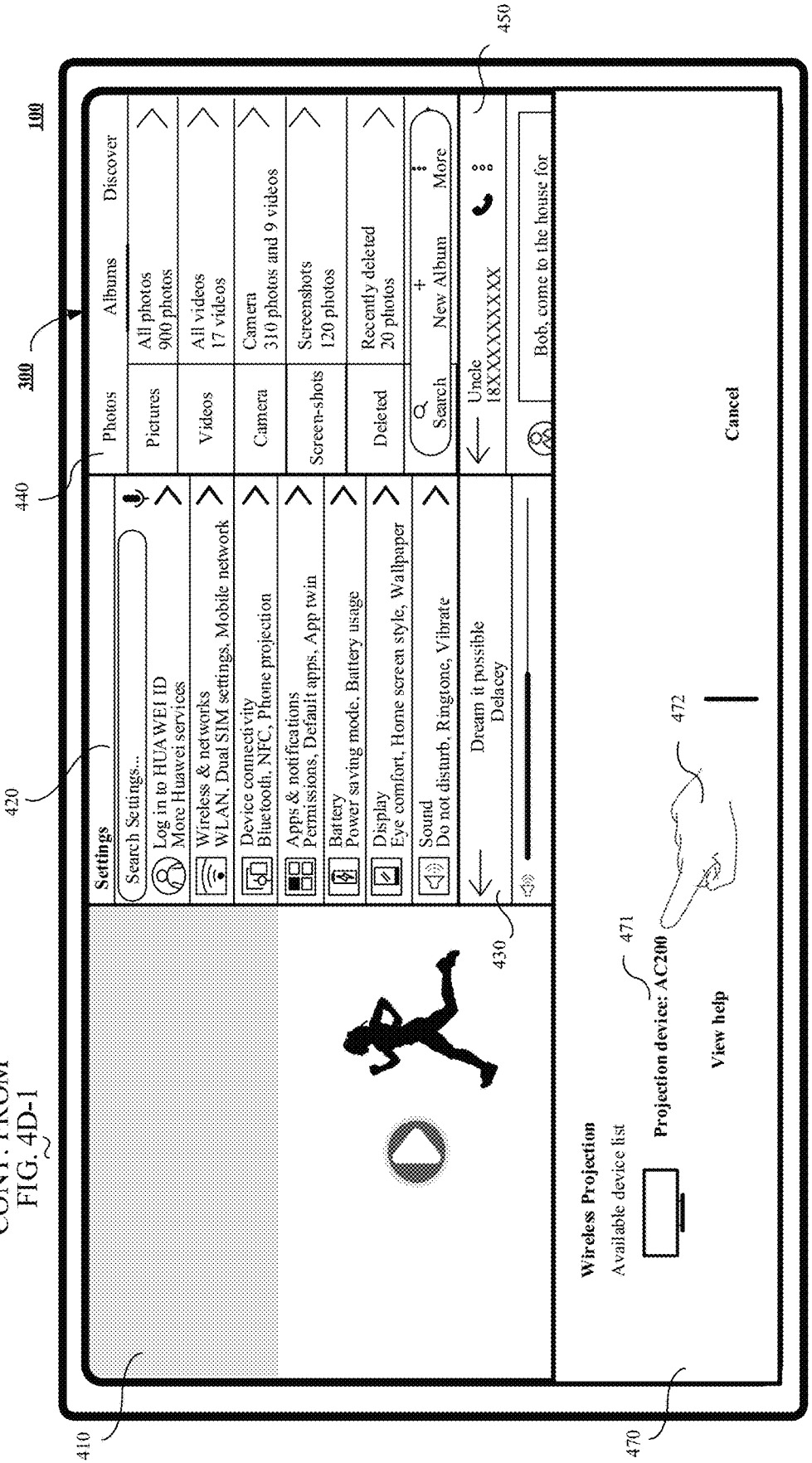

TO

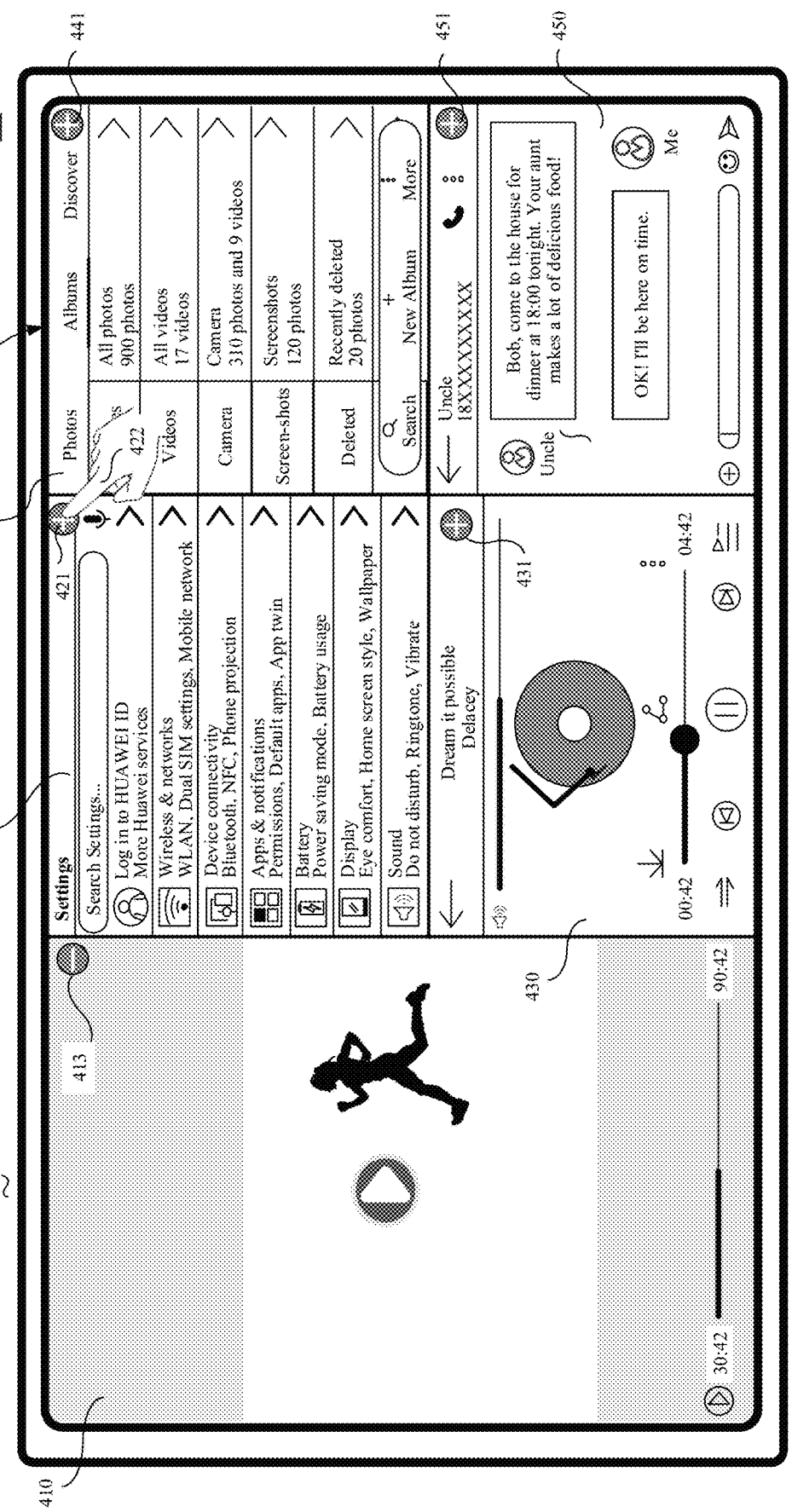

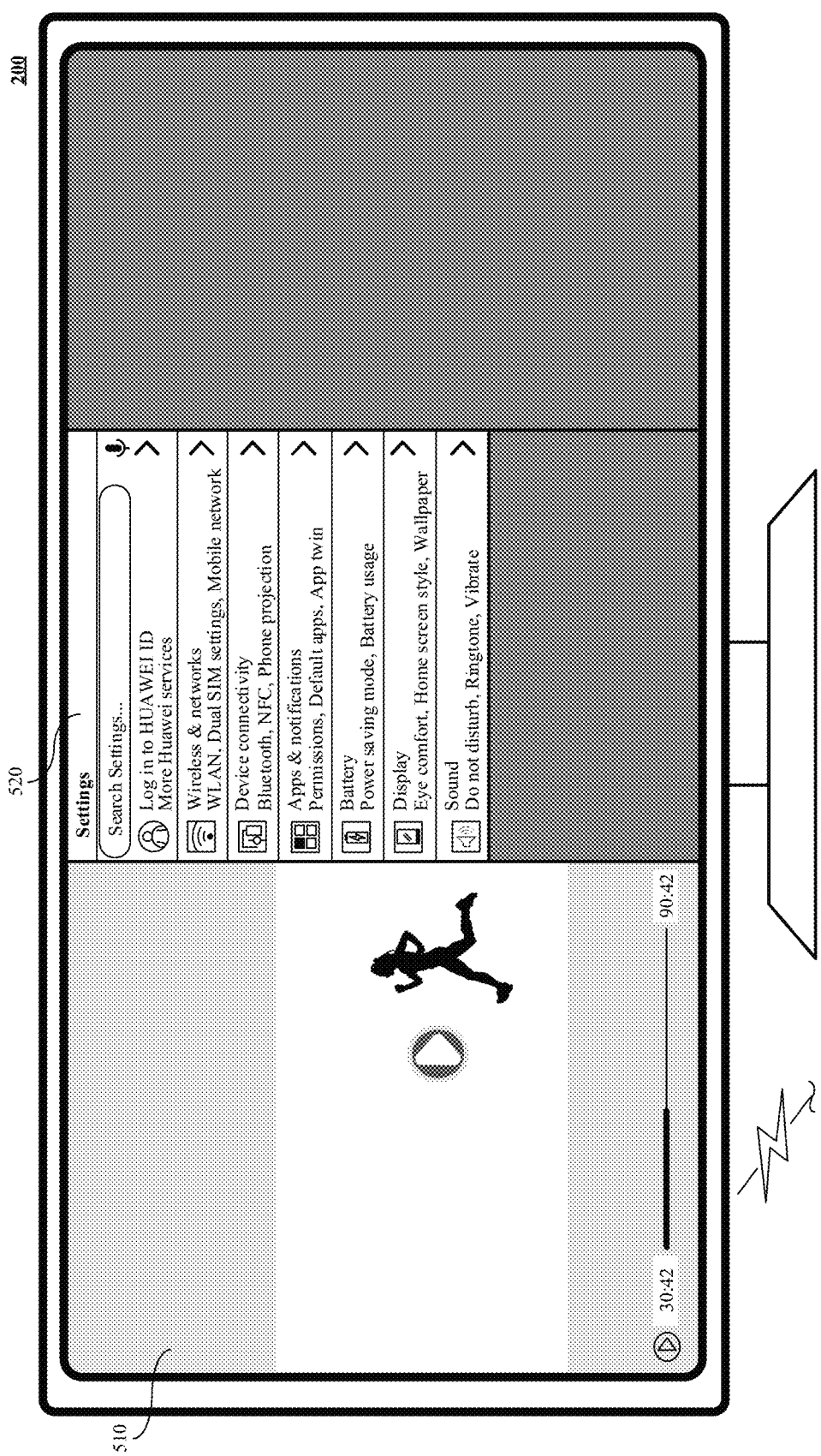

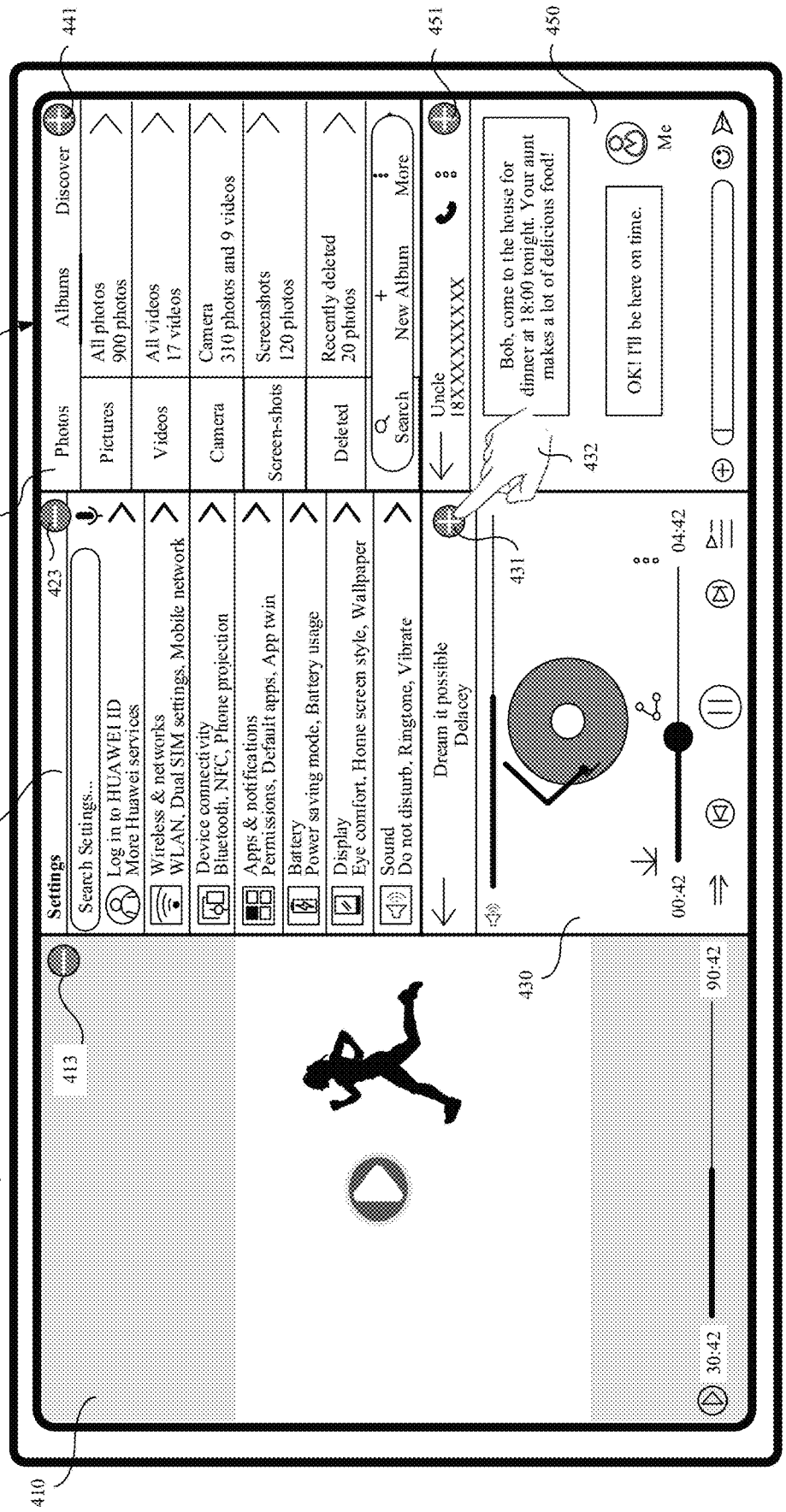
FIG. 4G-1 / FIG. 4G-2

TO

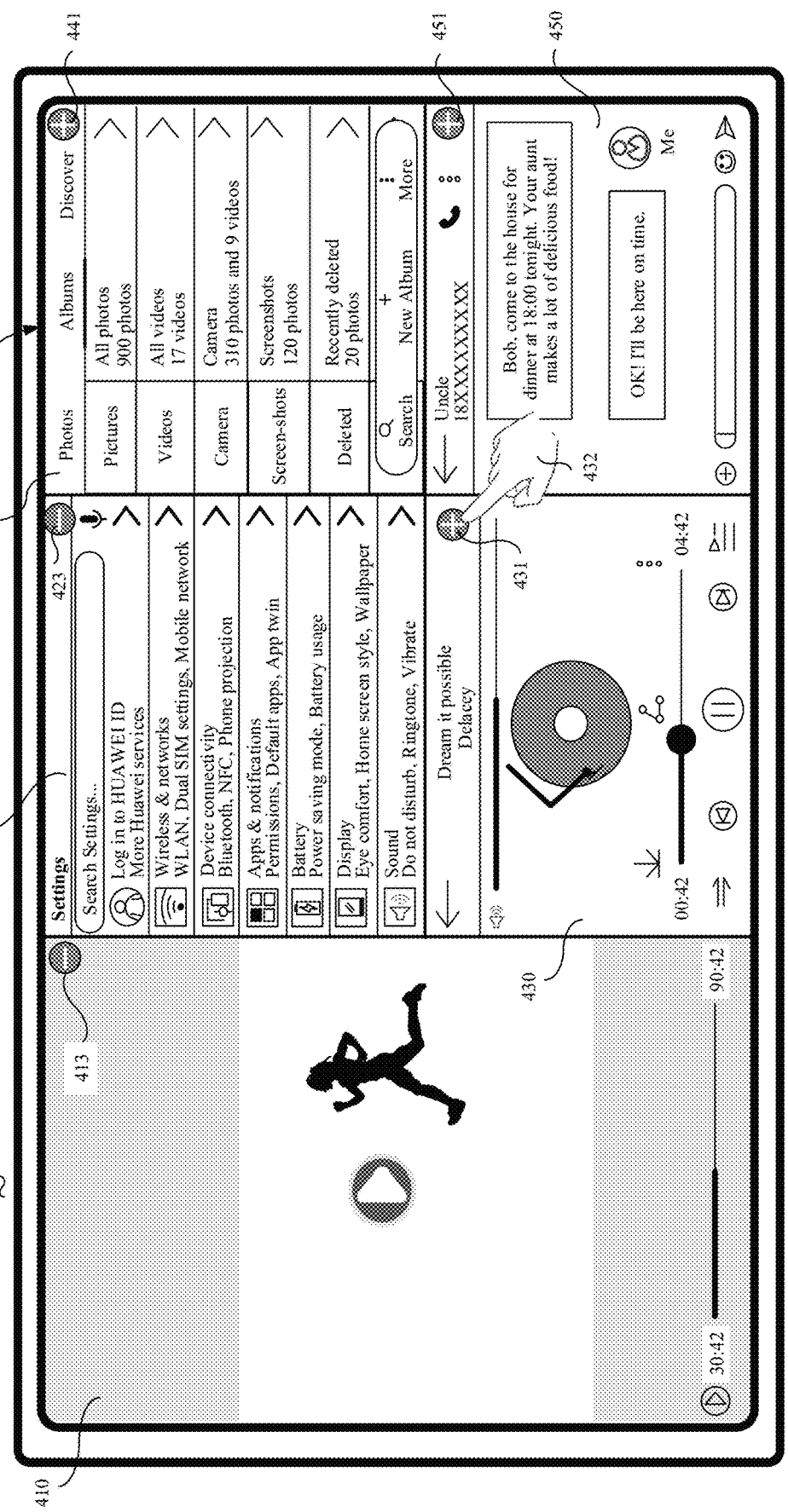

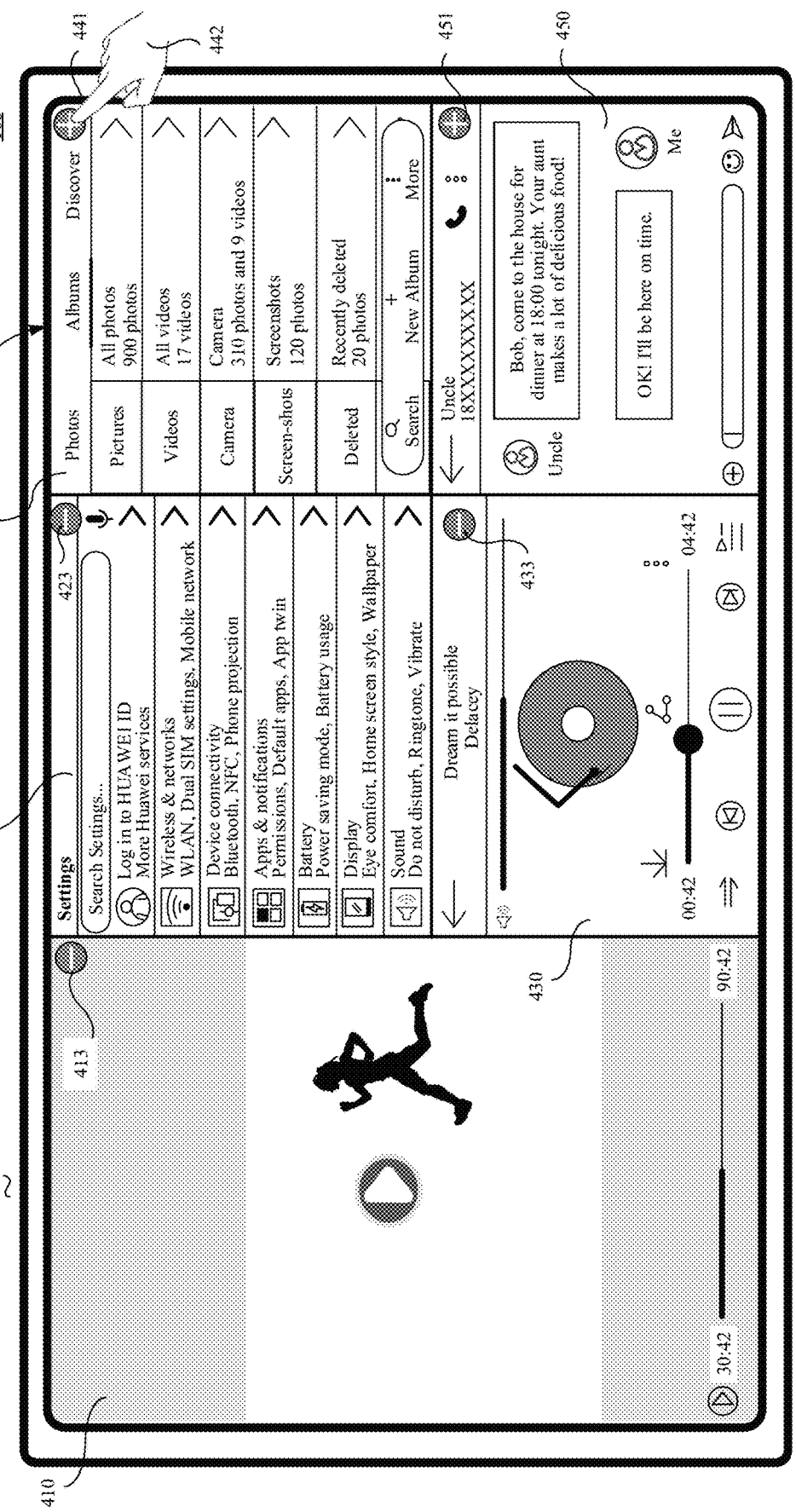

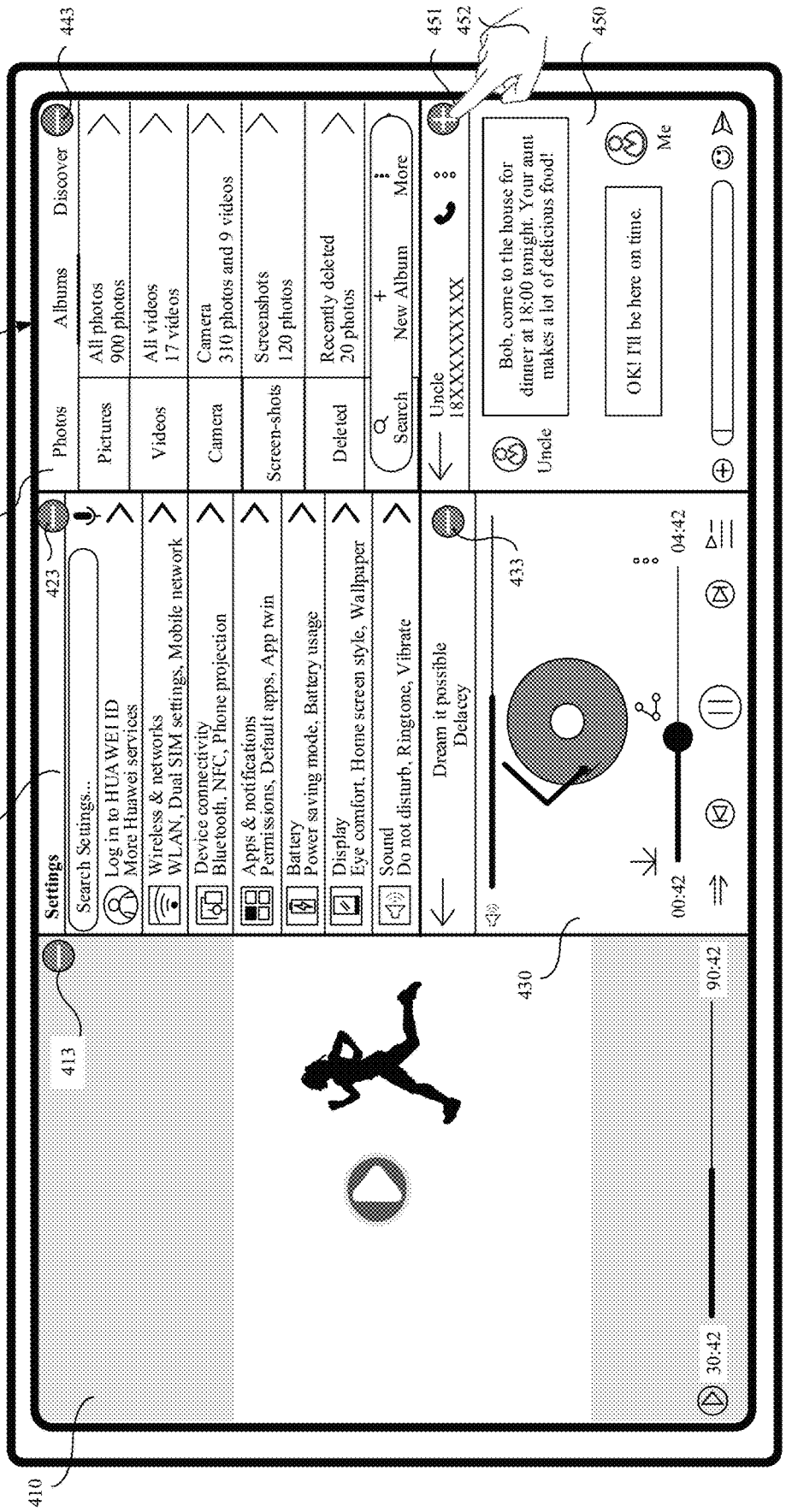

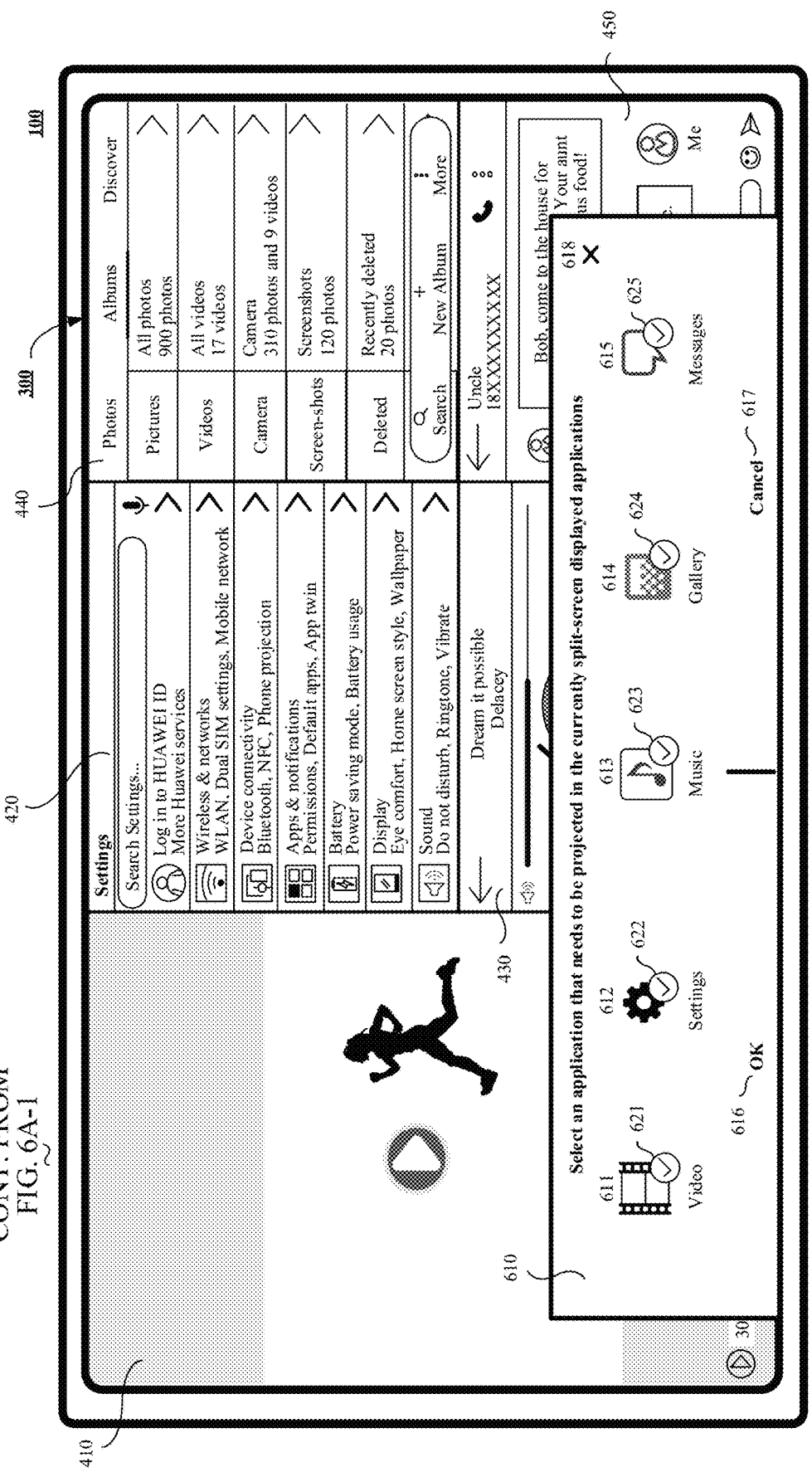

TO

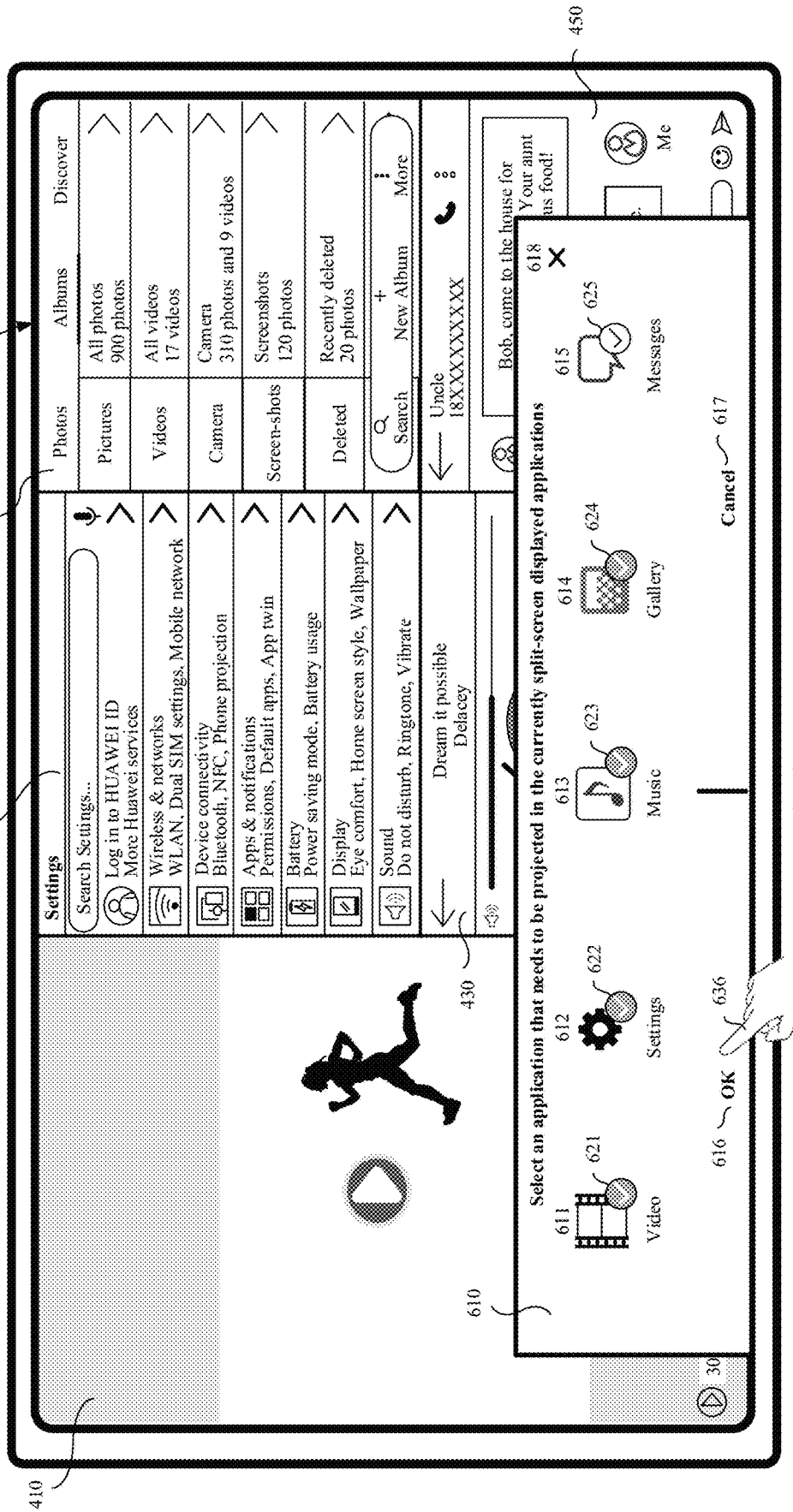

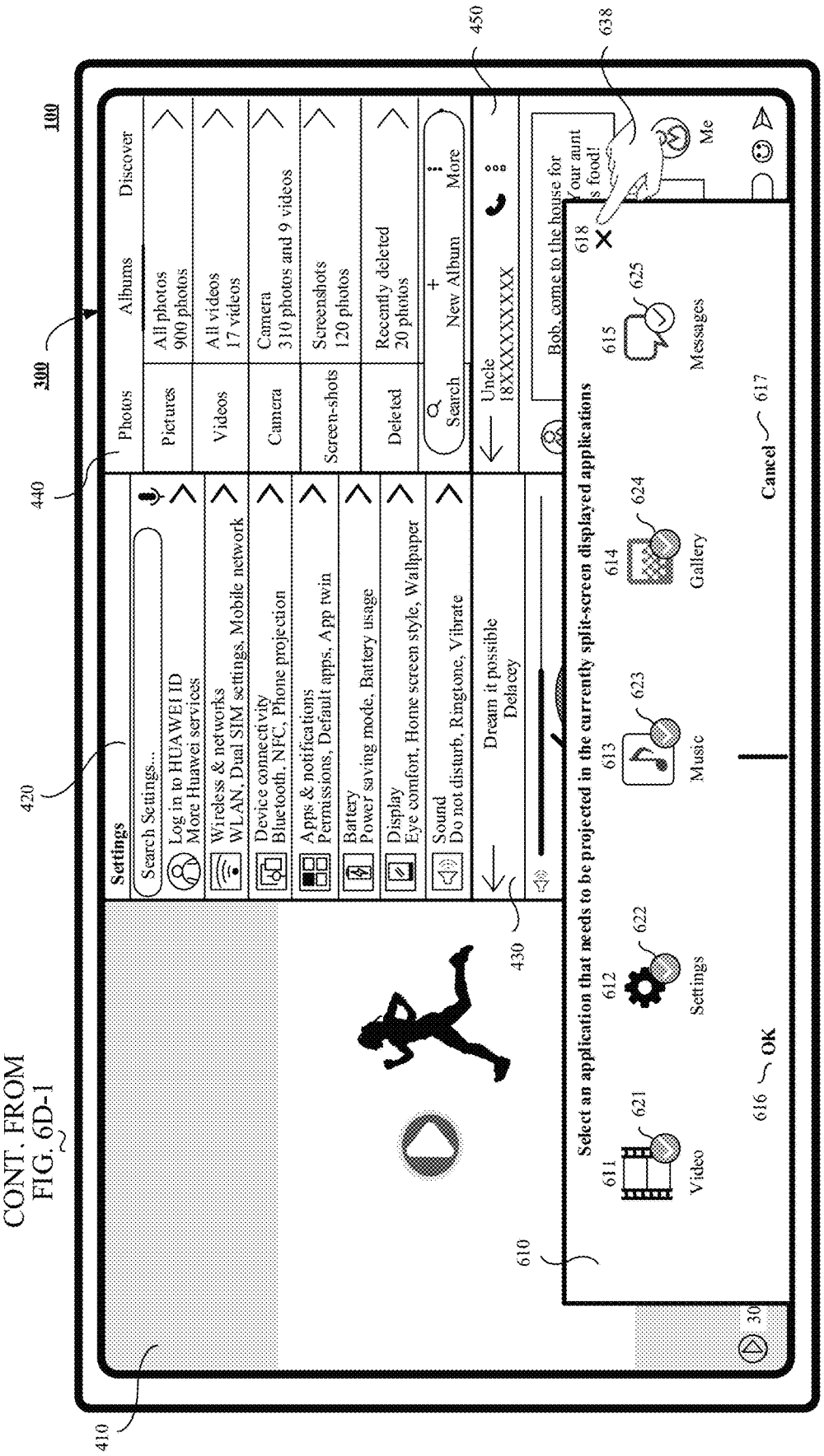

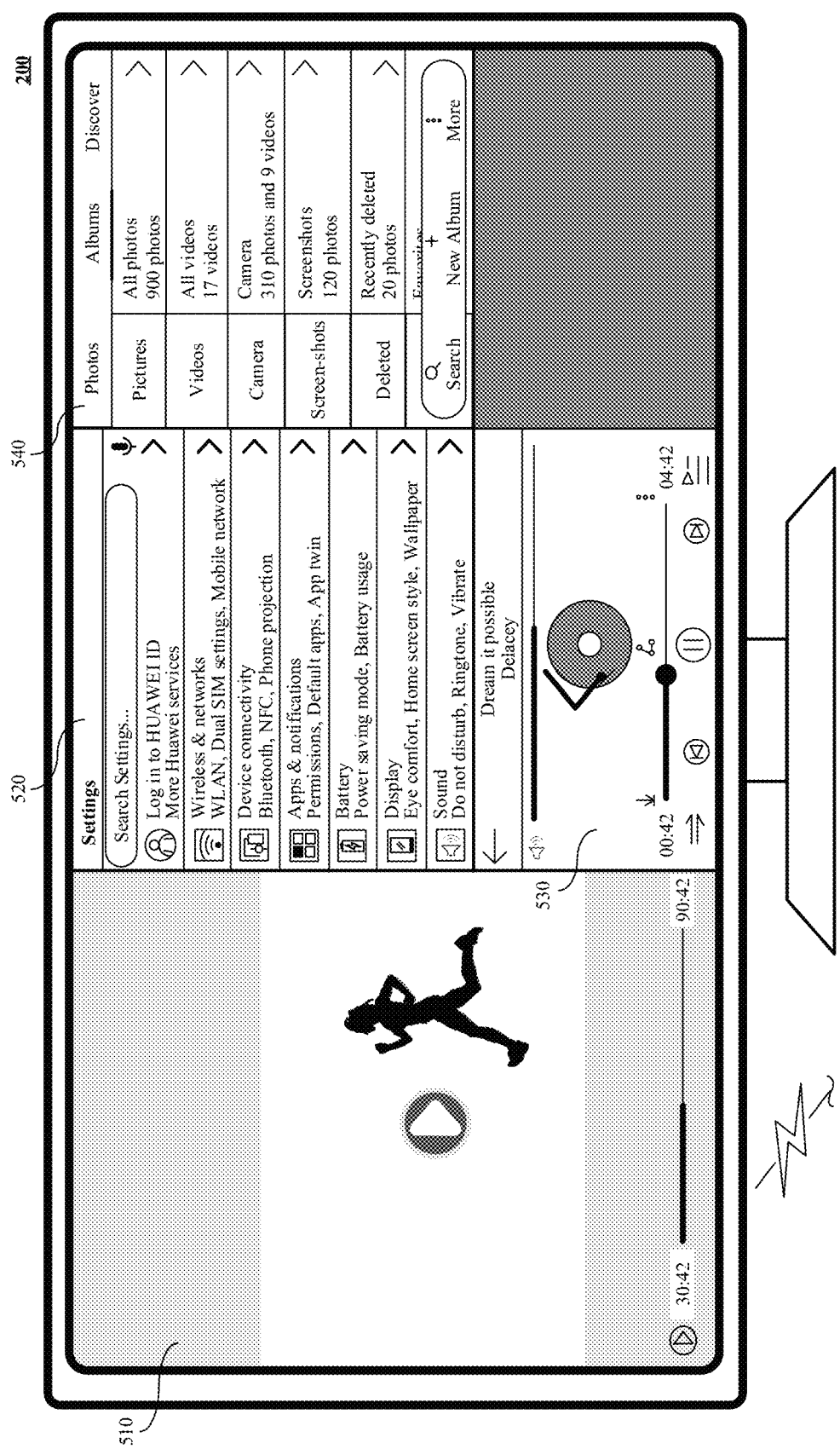

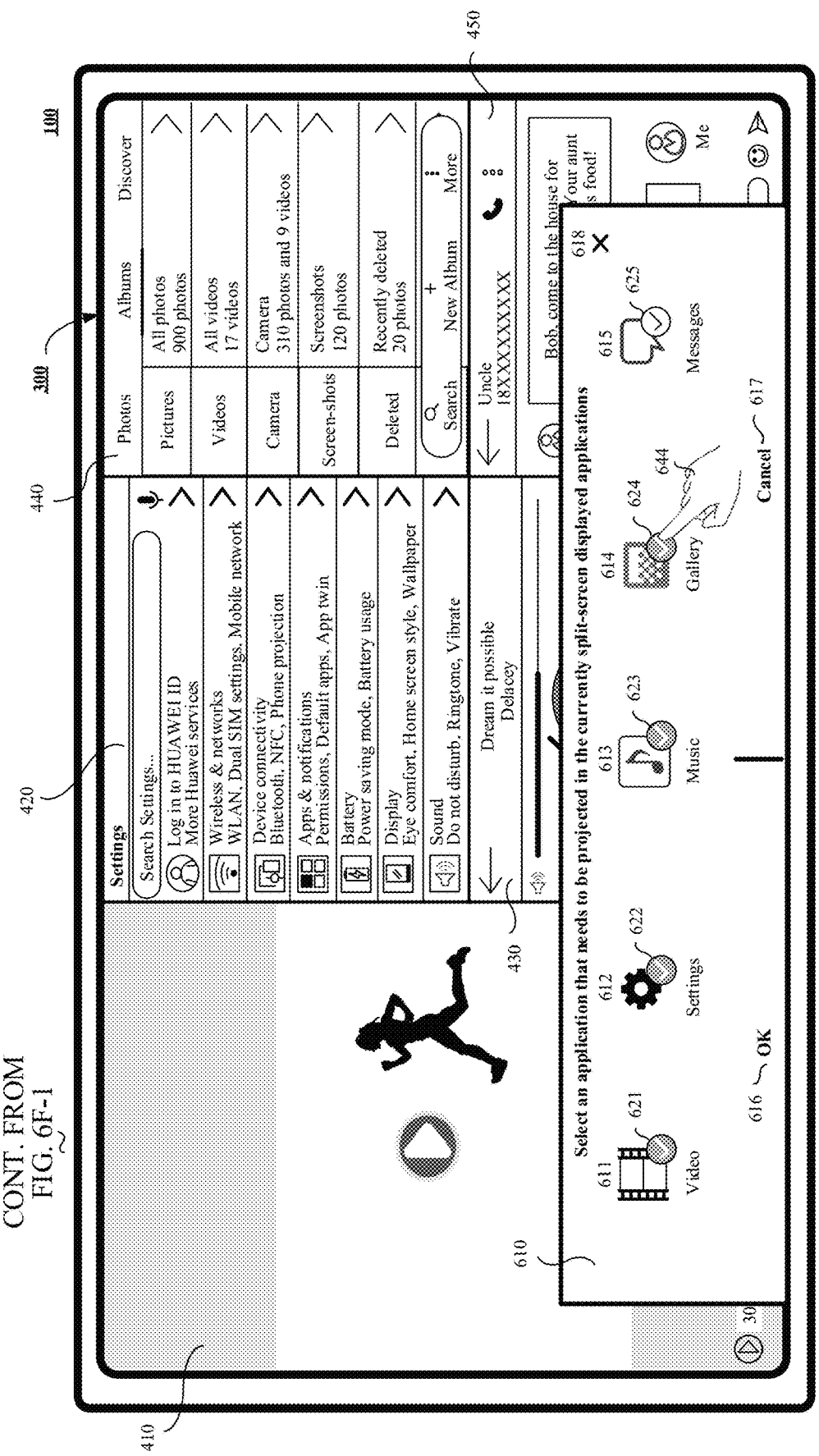

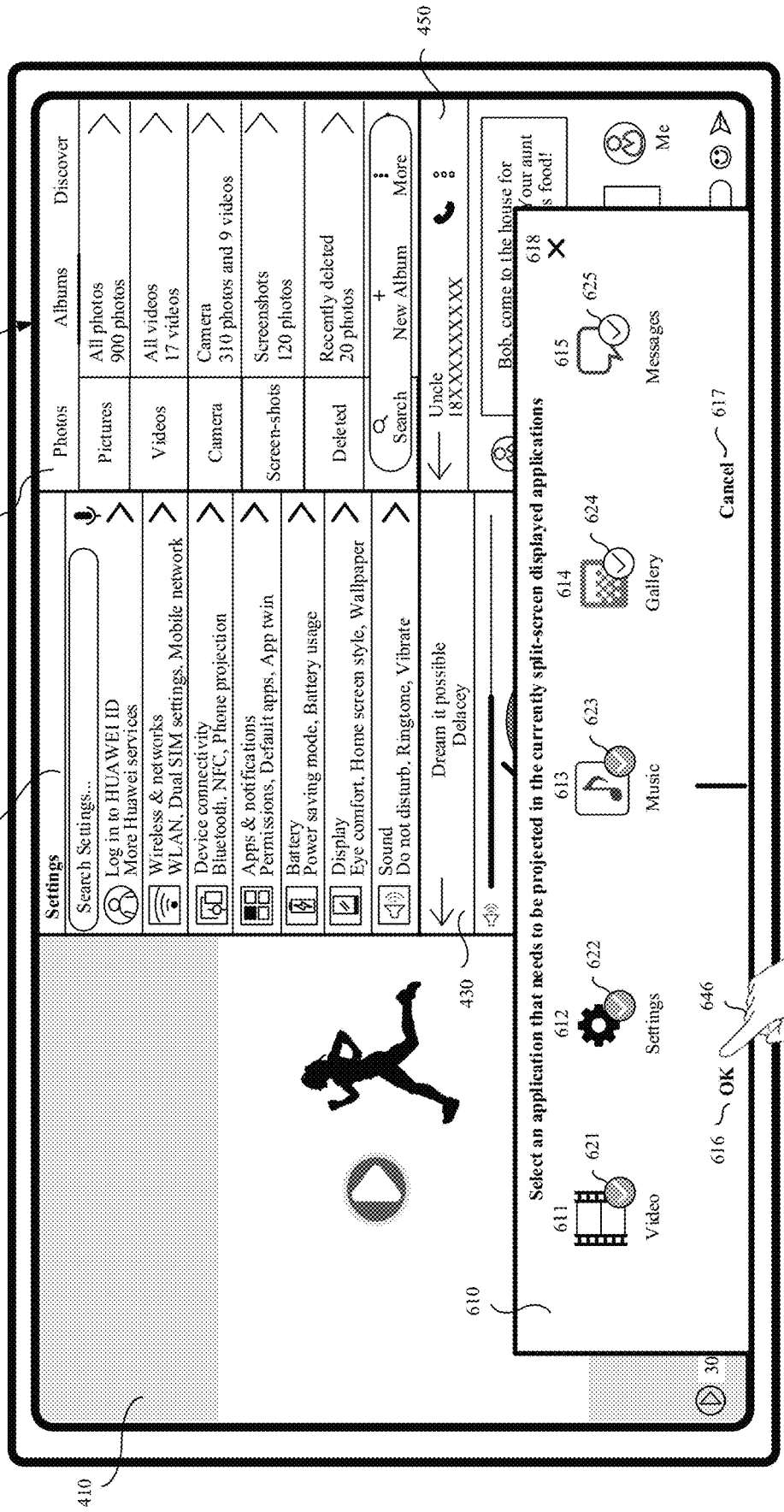

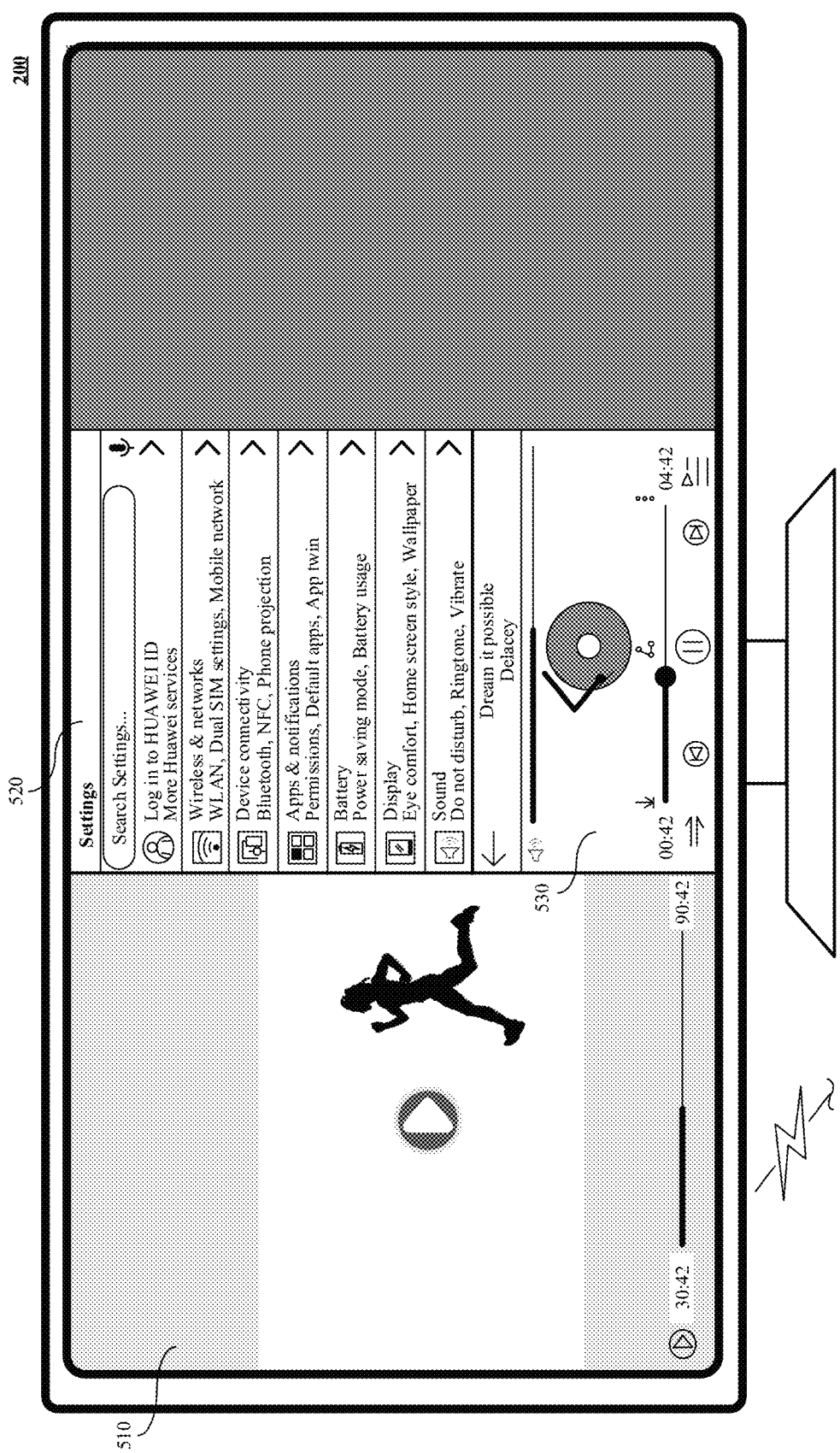

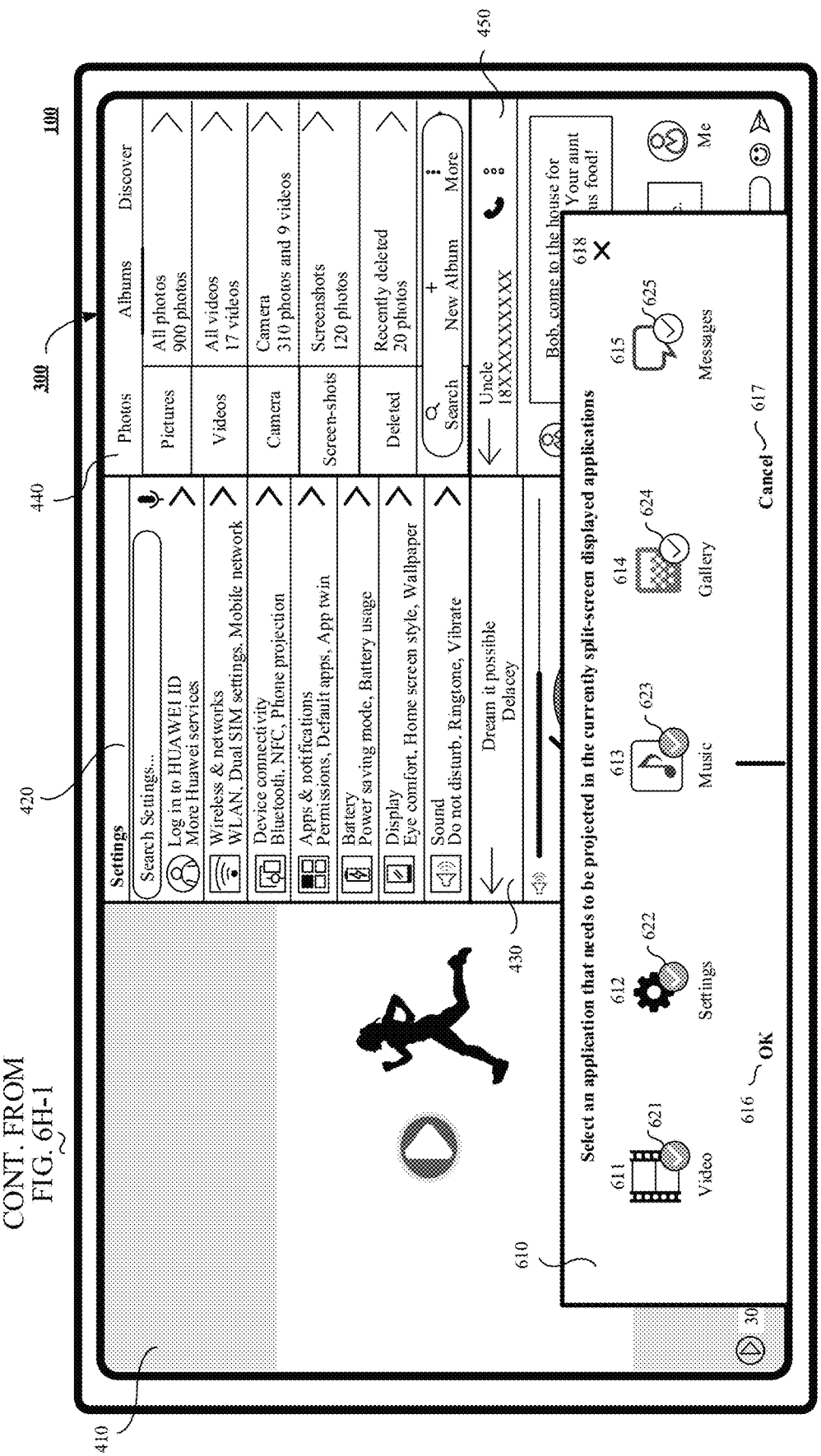

CONT. FROM
FIG. 7C-1

08:08 AM
Friday, February 9

WLAN  Bluetooth  Auto-rotate
Huawei Share  Airplane mode  Sound  Screenshot
Eye comfort  Hotspot  Location  NFC
  Flashlight  Large screen projection — 461
  Mobile data
  Screen recorder

460

300

100

710 — Projecting...
Select an application that needs to be projected in the currently split-screen displayed applications 711 Video
712 Settings
713 Music
714 Gallery
715 Messages 721
722
723
724
725

716 — OK    717 — Cancel
736

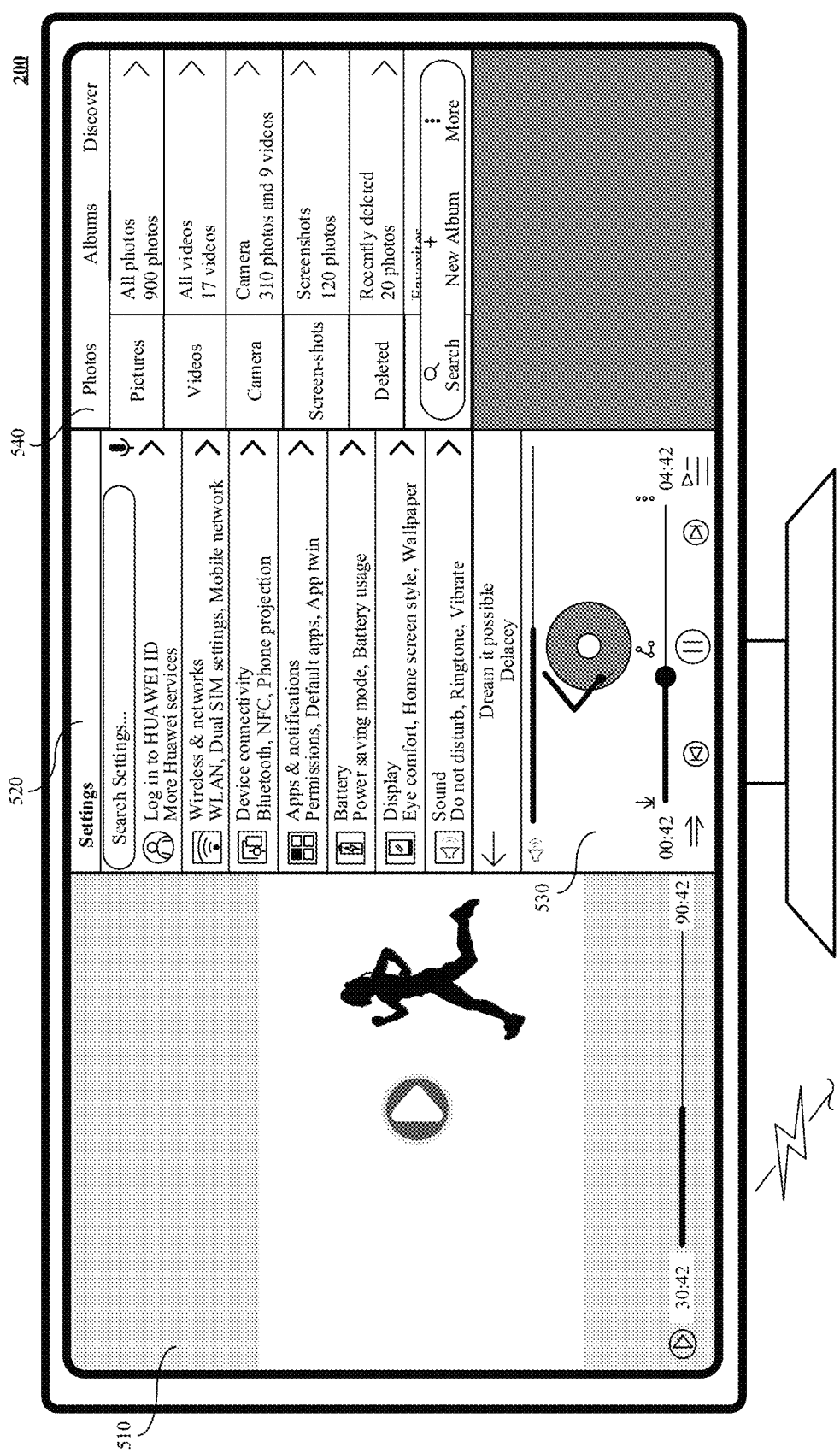

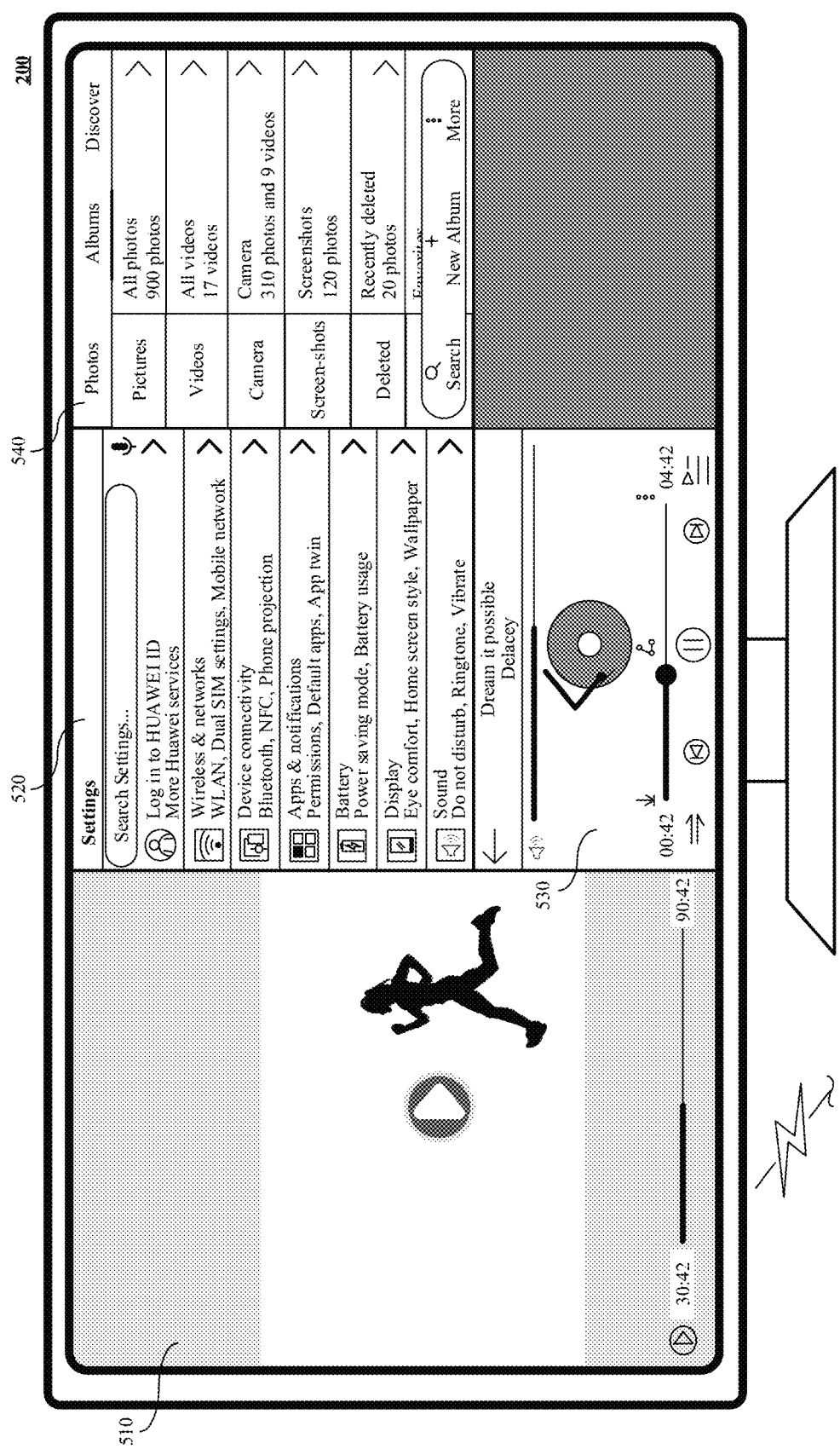

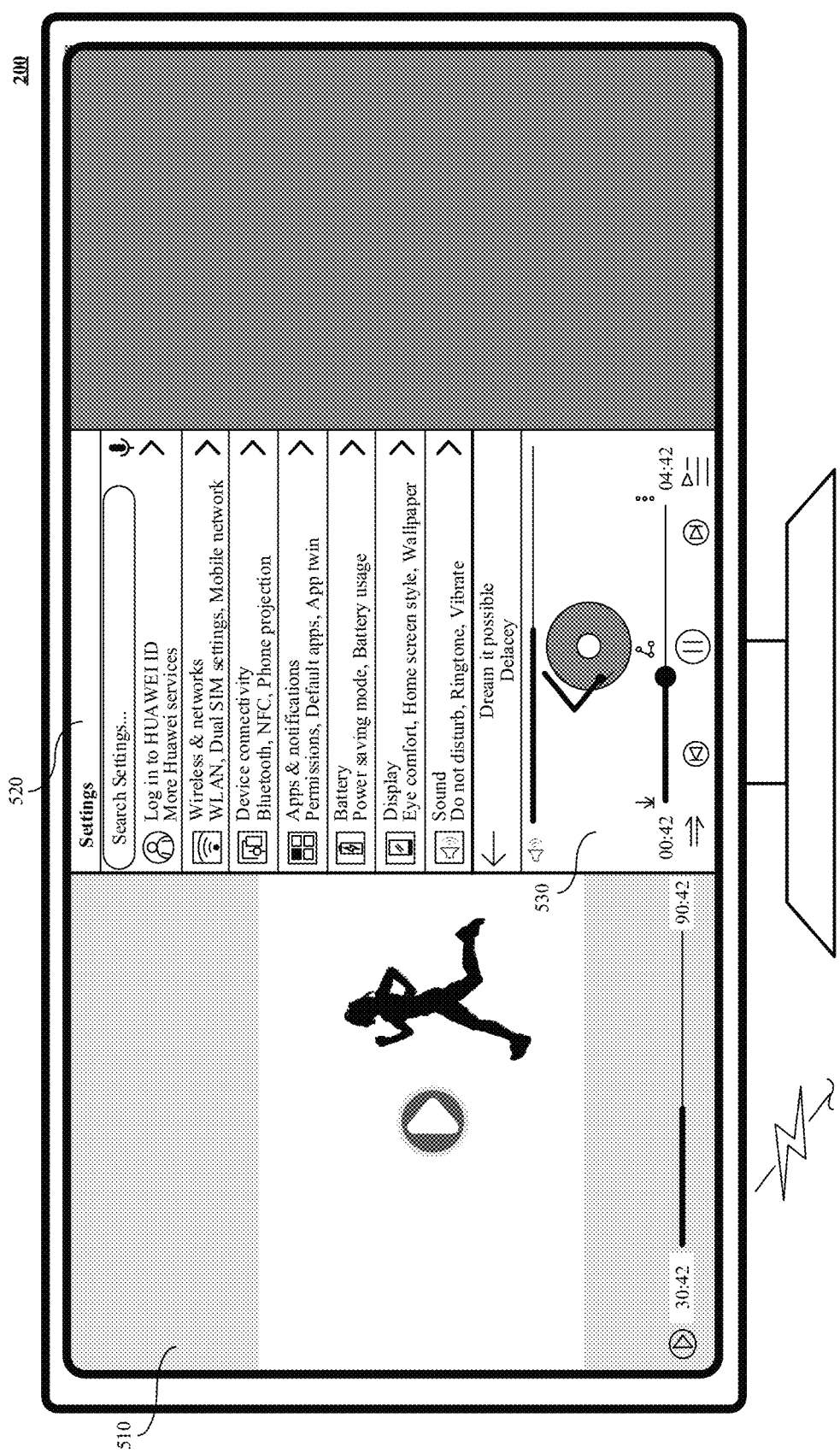

TO

SPLIT-SCREEN PROJECTION OF AN IMAGE INCLUDING MULTIPLE APPLICATION INTERFACES

CROSS-REFERENCE TO RELATED APPLICATION

This application is a national stage of International Application No. PCT/CN2020/092195, filed on May 26, 2020, which claims priority to Chinese Patent Application No. 201910459096.0, filed on May 29, 2019. Both of the aforementioned applications are hereby incorporated by reference in their entireties.

TECHNICAL FIELD

This application relates to the field of electronic technologies, and in particular, to a screen projection method, a system, and a related apparatus.

BACKGROUND

With the development of digital technologies, an electronic device such as a mobile phone is used as a personal computer (PC), and this is one of the important means to implement mobile office. Specifically, the electronic device such as the mobile phone may project, by using a Wi-Fi-display (Wi-Fi-Display) function or a Microsoft continuum function, display content on a screen of the mobile phone to a large-screen display of a PC or the like.

Currently, the screen of an electronic device such as a mobile phone has become increasingly larger. To give full play to application value of a large screen, a split-screen display technology is developed, so that an electronic device such as a mobile phone can simultaneously display a plurality of application interface windows on a same touchscreen. However, when the plurality of application interface windows are simultaneously split-screen displayed on the touchscreen of an electronic device such as a mobile phone, if the electronic device such as the mobile phone performs screen projection, the electronic device such as the mobile phone projects, onto a large-screen display for displaying, all the plurality of application interface windows split-screen displayed on the touchscreen. Therefore, some relatively private application interface windows (for example, a chat interface window of Messages) split-screen displayed on the electronic device such as the mobile phone are also projected onto the large-screen display. This easily causes loss of user privacy.

SUMMARY

This application provides a screen projection method, a system, and a related apparatus, so that when an electronic device split-screen displays a plurality of application interfaces, one or more of the plurality of application interfaces can be selected and projected onto a large-screen display, to ensure that an application interface involving user privacy is projected only after a user agrees and confirms. This protects user privacy and improves user experience.

According to a first aspect, this application provides a screen projection method, including: First, an electronic device displays M application interfaces on a display of the electronic device, where M is an integer greater than 1. Then, the electronic device receives a first selection operation, and determines N application interfaces based on the first selection operation, where the first selection operation is performed on the electronic device to determine the N application interfaces from the M application interfaces, and N is a positive integer less than or equal to M. Then, the electronic device sends first data to an external display device in response to the first selection operation, where the first data is used by the external display device to display the N application interfaces.

According to the screen projection method provided in this application, when a plurality of application interfaces are displayed on the display of the electronic device, the electronic device may receive a selection operation of a user, and project one or more application interfaces selected by the user onto the external display device for displaying. In this way, the electronic device can project, based on the selection operation of the user onto the external display device for displaying, the one or more application interfaces selected by the user on the display of the electronic device. This ensures that an application interface concerning user privacy is projected only after the user agrees and confirms, to ensure user privacy and improve user experience.

In a possible implementation, the first data includes a to-be-projected image including the N application interfaces. Before the electronic device sends the first data to the external display device, the electronic device may further obtain a synthesized image of the M application interfaces and first display information of the N application interfaces, where the first display information includes sizes, positions, and display levels of respective display windows of the N application interfaces. The electronic device crops the to-be-projected image from the synthesized image of the M application interfaces based on the first display information of the N application interfaces. In this way, the electronic device can project, onto the external display device, the N application interfaces of the M application interfaces split-screen displayed on the display. In this way, the electronic device can project, onto the external display device, the N application interfaces of the M application interfaces split-screen displayed on the display.

In a possible implementation, before the electronic device sends the first data to the external display device, the electronic device obtains a synthesized image of the M application interfaces and first display information of the N application interfaces. The first data includes the synthesized image of the M application interfaces and the first display information of the N application interfaces, the first display information includes sizes, positions, and display levels of respective display windows of the N application interfaces, and the first display information is used by the external display device to crop, from the synthesized image of the M application interfaces, an image including the N application interfaces and display the image. In this way, the electronic device can project, onto the external display device, the N application interfaces of the M application interfaces split-screen displayed on the display.

In a possible implementation, the first data includes respective image data streams of the N application interfaces, and is used by the external display device to display the N application interfaces in N display windows in a one-to-one correspondence. Before the electronic device sends the first data to the external display device, the electronic device may further obtain the respective image data streams of the N application interfaces. In this way, the electronic device can project, onto the external display device, the N application interfaces of the M application interfaces split-screen displayed on the display.

In a possible implementation, that the electronic device receives a first selection operation specifically includes: The electronic device receives a first input. In response to the first input, the electronic device displays M projection add controls on the display, where the M projection add controls one-to-one correspond to the M application interfaces. The electronic device receives a second input used by the user to trigger N of the M projection add controls. The electronic device determines, based on the second input, the N application interfaces selected by the user, and sends, to the external display device, the first data used to display the N application interfaces. In this way, a projection add control is triggered, so that an application interface corresponding to the projection add control is projected onto the external display device, to ensure that an application interface involving user privacy is projected only after the user agrees and confirms. This ensures user privacy.

In a possible implementation, in response to the first input, the electronic device may display M projection add controls and an OK button on the display. After receiving a second input used by the user to trigger N of the M projection add controls, the electronic device may further receive a third input used by the user to trigger the OK button, and determine, based on the second input, the N application interfaces selected by the user. In response to the third input, the electronic device may send, to the external display device, the first data used to display the N application interfaces. In this way, the user can be prevented from accidentally touching a projection add control, to prevent the user from mistakenly projecting an application interface corresponding to the projection add control onto the external display device for displaying. This improves user experience.

In a possible implementation, after any projection add control is triggered, the electronic device displays a projection cancel control corresponding to the projection add control, where the projection cancel control is used by the user to cancel projection of an application interface corresponding to the projection cancel control. The electronic device receives a fourth input used by the user to trigger the projection cancel control. In response to the fourth input, the electronic device stops sending, to the external display device, image data of the application interface corresponding to the projection cancel control. In this way, the electronic device can stop projection of an application interface onto the external display device at any time according to a user requirement, to improve user experience.

In a possible implementation, that the electronic device receives a first selection operation may specifically include: The electronic device receives a fifth input. In response to the fifth input, the electronic device displays a shortcut menu on the display, where the shortcut menu includes M options, and the M options one-to-one correspond to the M application interfaces. The electronic device receives a sixth input used to select N of the M options. The electronic device determines, based on the sixth input, the N application interfaces selected by a user, and sends, to the external display device, the first data used to display the N application interfaces. In this way, the electronic device can select, based on the input operation of the user, the one or more application interfaces from the plurality of application interfaces displayed on the display of the electronic device, and project the one or more application interfaces onto the external display device, to ensure that an application interface involving user privacy is projected only after the user selects the application interface. This ensures user privacy.

In a possible implementation, the shortcut menu may include the M options and an OK button. After the electronic device receives a sixth input used to select N of the M options, the electronic device may further receive a seventh input used by the user to trigger the OK button. The electronic device may determine, based on the sixth input, the N application interfaces selected by the user. In response to the seventh input, the electronic device sends, to the external display device, the first data used to display the N application interfaces. In this way, after the user selects the N options, the electronic device projects the N application interfaces corresponding to the N options onto the external display device for displaying only after the user confirms. This prevents the user from mistakenly selecting an application interface for projection, and ensures user privacy.

According to a second aspect, this application provides a system, including an electronic device and an external display device. The electronic device is connected to the external display device. The electronic device is configured to display M application interfaces on a display of the electronic device, where M is an integer greater than 1. The electronic device is further configured to receive a first selection operation, and determine N application interfaces based on the first selection operation, where the first selection operation is performed on the electronic device to select the N application interfaces from the M application interfaces, and N is a positive integer less than or equal to M. The electronic device is further configured to send first data to the external display device in response to the first selection operation. The external display device is configured to display the N application interfaces after receiving the first data.

According to a third aspect, this application provides an electronic device, including a memory, a display, and at least one processor. The memory stores program code. The memory, the display, and the at least one processor communicate with each other. The processor runs the code to indicate the electronic device to perform the screen projection method according to any possible implementation of the first aspect.

According to a fourth aspect, embodiments of this application provide a computer storage medium, including computer instructions. When the computer instructions are run on an electronic device, the electronic device is enabled to perform the screen projection method according to any possible implementation of the first aspect.

According to a fifth aspect, embodiments of this application provide a computer program product. When the computer program product is run on a computer, the computer is enabled to perform the screen projection method according to any possible implementation of the first aspect.

BRIEF DESCRIPTION OF DRAWINGS

FIG. 4A-1 and FIG. 4A-2 to FIG. 4J-1 and FIG. 4J-2 are schematic diagrams of a group of interfaces according to an embodiment of this application;

FIG. 5A-1 and FIG. 5A-2 to FIG. 5F-1 and FIG. 5F-2 are schematic diagrams of another group of interfaces according to an embodiment of this application;

FIG. 6A-1 and FIG. 6A-2 to FIG. 6H-1 and FIG. 6H-2 are schematic diagrams of another group of interfaces according to an embodiment of this application;

FIG. 7A-1 and FIG. 7A-2 to FIG. 7G-1 and FIG. 7G-2 are schematic diagrams of another group of interfaces according to an embodiment of this application;

FIG. 8A-1 and FIG. 8A-2 to FIG. 8E-1 and FIG. 8E-2 are schematic diagrams of another group of interfaces according to an embodiment of this application;

FIG. 9A-1, FIG. 9A-2, FIG. 9B-1, and FIG. 9B-2 are schematic diagrams of another group of interfaces according to an embodiment of this application;

DESCRIPTION OF EMBODIMENTS

The following clearly describes technical solutions in the embodiments of this application in detail with reference to accompanying drawings. In the descriptions of the embodiments of this application, unless otherwise specified, "/" indicates "or". For example, A/B may indicate A or B. The term "and/or" in this specification merely describes an association relationship for describing associated objects, and indicates that three relationships may exist. For example, A and/or B may indicate the following three cases: Only A exists, both A and B exist, and only B exists. In addition, in the descriptions of the embodiments of this application, "a plurality of" means two or more.

The following terms "first" and "second" are merely intended for description, and shall not be understood as an indication or implication of relative importance or implicit indication of a quantity of indicated technical features. Therefore, a feature limited by "first" or "second" may explicitly or implicitly include one or more features. In the descriptions of the embodiments of this application, unless otherwise specified, "a plurality of" means two or more.

Figure 1:
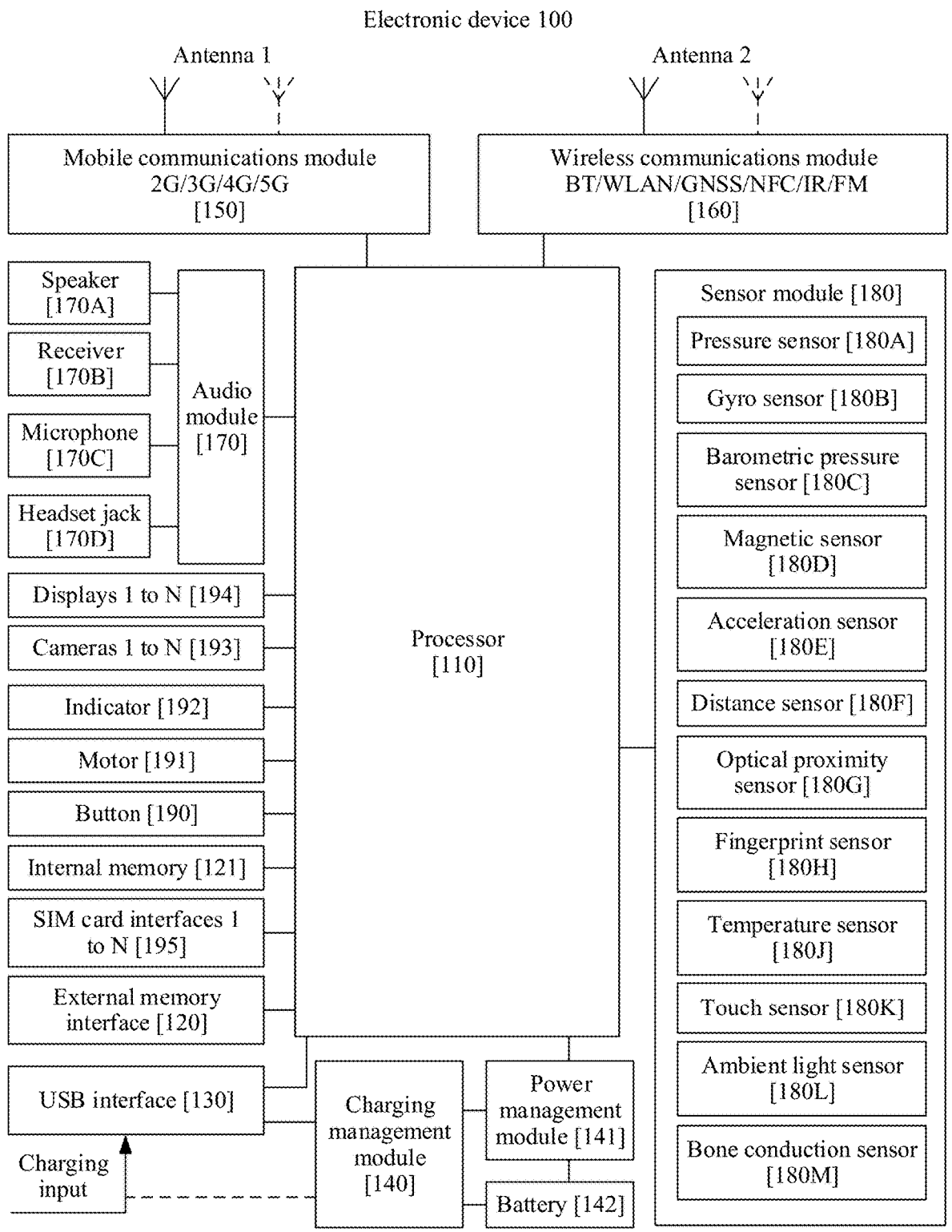
FIG. 1 is a schematic diagram of a structure of an electronic device according to an embodiment of this application.

FIG. 1 is a schematic diagram of a structure of an electronic device 100.

The following uses the electronic device 100 as an example to specifically describe this embodiment. It should be understood that the electronic device 100 shown in FIG. 1 is merely an example, and the electronic device 100 may have more or fewer components than those shown in FIG. 1, or two or more components may be combined, or different component configurations may be used. Various components shown in the figure may be implemented in hardware, software, or a combination of hardware and software that includes one or more signal processing and/or application-specific integrated circuits.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that a structure shown in the embodiments of the present invention does not constitute a specific limitation on the electronic device 100. In some other embodiments of this application, the electronic device 100 may include more or fewer components than those shown in the figure, or some components may be combined, or some components may be split, or different component arrangements may be used. The components in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

The controller may be a nerve center and a command center of the electronic device 100. The controller may generate an operation control signal based on an instruction operation code and a time sequence signal, to control to read instructions and execute instructions.

A memory may be further disposed in the processor 110, and is configured to store instructions and data. In some embodiments, the memory in the processor 110 is a cache memory. The memory may store instructions or data that has just been used or is cyclically used by the processor 110. If the processor 110 needs to use the instructions or the data again, the processor 110 may directly invoke the instructions or the data from the memory, to avoid repeated access. This reduces a waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes a serial data line (SDL) and a serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 through an I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be configured to perform audio communication, and sample, quantize, and code an analog signal. In some embodiments, the audio module 170 may be coupled to the wireless communications module 160 through the PCM bus interface. In some embodiments, the audio module 170 may alternatively transmit an audio signal to the wireless communications module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using the Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI interface, to implement a shooting function of the electronic device 100. The processor 110 communicates with the display 194 through the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as the I2C interface, the I2S interface, the UART interface, the MIPI interface, or the like.

The USB interface 130 is an interface that complies with a USB standard specification, and may be specifically a mini USB interface, a micro USB interface, a USB Type-C interface, or the like. The USB interface 130 may be configured to connect to the charger to charge the electronic device 100, or may be configured to transmit data between the electronic device 100 and a peripheral device, or may be configured to connect to a headset to play audio by using the headset, or may be configured to connect to another electronic device such as an AR device.

It can be understood that an interface connection relationship between the modules shown in the embodiments of the present invention is merely an example for description, and does not constitute a limitation on the structure of the electronic device 100. In some other embodiments of this application, the electronic device 100 may alternatively use an interface connection manner that is different from that in the foregoing embodiment, or a combination of a plurality of interface connection manners.

The charging management module 140 is configured to receive a charging input from the charger. The charger may be a wireless charger or a wired charger. In some embodiments in which wired charging is used, the charging management module 140 may receive a charging input from the wired charger through the USB interface 130. In some embodiments in which wireless charging is used, the charging management module 140 may receive a wireless charging input through a wireless charging coil of the electronic device 100. The charging management module 140 may further supply power to the electronic device by using the power management module 141 while charging the battery 142.

The power management module 141 is configured to connect to the battery 142 and the charging management module 140 to the processor 110. The power management module 141 receives an input from the battery 142 and/or the charging management module 140, and supplies power to the processor 110, the internal memory 121, an external memory, the display 194, the camera 193, the wireless communications module 160, and the like. The power management module 141 may be further configured to monitor parameters such as battery power, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 each are configured to transmit and receive electromagnetic wave signals. Each antenna in the electronic device 100 may be configured to cover one or more communications frequency bands. Different antennas may be further multiplexed to improve antenna utilization. For example, the antenna 1 may be multiplexed as a diversity antenna in a wireless local area network. In some other embodiments, an antenna may be used in combination with a tuning switch.

The mobile communications module 150 may provide a solution that is for wireless communication including 2G/3G/4G/5G and the like and that is applied to the electronic device 100. The mobile communications module 150 may include at least one filter, a switch, a power amplifier, a low noise amplifier (LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules of the mobile communications module 150 and at least some modules of the processor 110 may be disposed in a same device.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through the demodulation to the baseband processor for processing. The low-frequency baseband signal is processed by the baseband processor, and then transmitted to the application processor. The application processor outputs a sound signal by using an audio device (not limited to the speaker 170A, the receiver 170B, and the like), or displays an image or a video by using the display 194. In some embodiments, the modem processor may be an independent component. In some other embodiments, the modem processor may be independent of the processor 110, and is disposed in a same device as the mobile communications module 150 or another function module.

The wireless communications module 160 may provide a wireless communication solution that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like and that is applied to the electronic device 100. The wireless communications module 160 may be one or more devices that integrate at least one communication processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 is coupled to the mobile communications module 150, and the antenna 2 is coupled to the wireless communications module 160, so that the electronic device 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or satellite based augmentation systems (SBAS).

The electronic device 100 implements a display function by using the GPU, the display 194, the application processor, and the like. The GPU is a microprocessor for image processing, and is connected to the display 194 and the application processor. The GPU is configured to perform mathematical and geometric calculation, and is used for graphics rendering. The processor 110 may include one or more GPUs that execute a program instruction to generate or change display information.

The display 194 is configured to display an image, a video, and the like. The display 194 includes a display panel. The display panel may use a liquid crystal display (LCD), an organic light-emitting diode (OLED), an active-matrix organic light emitting diode or an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device 100 may include one or N displays 194, where N is a positive integer greater than 1.

The electronic device 100 may implement a shooting function through the ISP, the camera 193, the video codec, the GPU, the display 194, the application processor, and the like.

The ISP is configured to process data fed back by the camera 193. For example, during shooting, a shutter is pressed, and light is transmitted to a photosensitive element of the camera through a lens. The photosensitive element of the camera converts an optical signal into an electrical signal, and transmits the electrical signal to the ISP for processing. The ISP converts the electrical signal into an image that is perceptible to the eye. The ISP may further perform algorithm optimization on noise, brightness, and complexion of the image. The ISP may further optimize parameters such as exposure and color temperature of a shooting scene. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, or the like. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy and the like.

The video codec is configured to compress or decompress a digital video. The electronic device 100 may support one or more video codecs. Therefore, the electronic device 100 may play or record videos in a plurality of encoding formats, for example, MPEG (moving picture experts group, MPEG)-1, MPEG-2, MPEG-3, and MPEG-4.

The NPU is a neural-network (NN) computing processor. The NPU quickly processes input information by referring to a biological neural network structure, for example, by referring to a mode of transfer between human brain neurons, and may further continuously perform self-learning. The electronic device 100 may implement intelligent cognition such as image recognition, facial recognition, speech recognition, and text understanding through the NPU.

The external memory interface 120 may be configured to connect to an external memory card such as a micro SD card, to extend a storage capability of the electronic device 100. The external storage card communicates with the processor 110 through the external memory interface 120, to implement a data storage function, for example, to store files such as music and a video in the external memory card.

The internal memory 121 may be configured to store computer-executable program code. The executable program code includes instructions. The processor 110 runs the instructions stored in the internal memory 121 to perform various function applications of the electronic device 100 and process data. The internal memory 121 may include a program storage area and a data storage area. The program storage area may store an operating system, an application required by at least one function (for example, a sound playing function and an image playing function), and the like. The data storage area may store data (for example, audio data, a phone book, and the like) created in a process of using the electronic device 100, and the like. In addition, the internal memory 121 may include a high-speed random access memory, or may include a nonvolatile memory, for example, at least one magnetic disk storage device, a flash memory device, or a universal flash storage (universal flash storage, UFS).

The electronic device 100 may implement audio functions, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to perform audio signal encoding and decoding. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The electronic device 100 may listen to music or answer a hands-free call by using the speaker 170A.

The receiver 170B, also referred to as an "earpiece", is configured to convert an audio electrical signal into a sound signal. When the electronic device 100 answers a call or receives voice information, the receiver 170B may be placed near a human ear to listen to a voice.

The microphone 170C, also referred to as a "mike" or a "microphone", is configured to convert a sound signal into an electrical signal. When making a call or sending a voice message, a user may make a sound near the microphone 170C, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, to implement a directional recording function and the like.

The headset jack 170D is configured to connect to a wired headset. The headset jack 170D may be the USB interface 130 or a 3.5 mm open mobile terminal platform (OMTP) standard interface or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A such as a resistive pressure sensor, an inductive pressure sensor, and a capacitive pressure sensor. The capacitive pressure sensor may include at least two parallel plates made of conductive materials. Capacitance between electrodes changes when force is applied to the pressure sensor 180A. The electronic device 100 determines pressure intensity based on a change of the capacitance. When a touch operation is performed on the display 194, the electronic device 100 detects a strength of the touch operation based on the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an icon of Messages, an instruction for viewing an SMS message is executed. When a touch operation whose touch operation intensity is greater than or equal to the first pressure threshold is performed on an icon of Messages, an instruction for creating an SMS message is executed.

The gyro sensor 180B may be configured to determine a motion posture of the electronic device 100. In some embodiments, an angular velocity of the electronic device 100 around three axes (namely, axes x, y, and z) may be determined by using the gyro sensor 180B. The gyro sensor 180B may be configured to perform image stabilization during photographing. For example, when the shutter is pressed, the gyro sensor 180B detects an angle at which the electronic device 100 jitters, and calculates, based on the angle, a distance for which a lens module needs to compensate, and allows the lens to eliminate the jitter of the electronic device 100 through a reverse motion, to implement image stabilization. The gyro sensor 180B may be further used in a navigation scenario and a somatic game scenario.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover by using the magnetic sensor 180D, to set a feature such as automatic unlocking through flipping based on a detected opening or closing state of the flip cover.

The acceleration sensor 180E may detect accelerations in various directions (usually on three axes) of the electronic device 100, and may detect magnitude and a direction of gravity when the electronic device 100 is still. The acceleration sensor 180E may be further configured to identify a posture of the electronic device, and is applied to applications such as a pedometer and switching between a landscape mode and a portrait mode.

The distance sensor 180F is configured to measure a distance. The electronic device 100 may measure the distance in an infrared or a laser manner. In some embodiments, in a shooting scenario, the electronic device 100 may measure a distance by using the distance sensor 180F to implement quick focusing.

The optical proximity sensor 180G may include, for example, a light-emitting diode (LED) and an optical detector such as a photodiode. The light-emitting diode may be an infrared light-emitting diode. The electronic device 100 emits infrared light by using the light emitting diode. The electronic device 100 detects infrared reflected light from a nearby object by using the photodiode. When detecting sufficient reflected light, the electronic device 100 may determine that there is an object near the electronic device 100. When detecting insufficient reflected light, the electronic device 100 may determine that there is no object near the electronic device 100. The electronic device 100 may detect, by using the optical proximity sensor 180G, that the user holds the electronic device 100 close to an ear to make a call, to automatically perform screen-off for power saving. The optical proximity sensor 180G may also be used in a smart cover mode or a pocket mode to automatically perform screen unlocking or locking.

The ambient light sensor 180L is configured to sense ambient light luminance. The electronic device 100 may adaptively adjust brightness of the display 194 based on the sensed ambient light brightness. The ambient light sensor 180L may be further configured to automatically adjust a white balance during shooting. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based shooting, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 degrades performance of a processor near the temperature sensor 180J, to reduce power consumption for thermal protection. In some other embodiments, when the temperature is lower than another threshold, the electronic device 100 heats up the battery 142, to avoid abnormal shutdown of the electronic device 100 caused by a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 form a touchscreen, which is also referred to as a "touchscreen". The touch sensor 180K is configured to detect a touch operation acting on or near the touch sensor 180K. The touch sensor may transfer the detected touch operation to the application processor, to determine a type of a touch event. The display 194 may provide a visual output related to the touch operation. In some other embodiments, the touch sensor 180K may also be disposed on a surface of the electronic device 100 in a position different from that of the display 194.

The bone conduction sensor 180M may obtain a vibration signal. In some embodiments, the bone conduction sensor 180M may obtain a vibration signal of a vibration bone of a human voice part. The bone conduction sensor 180M may also be in contact with a human pulse, and receive a blood pressure beating signal. In some embodiments, the bone conduction sensor 180M may alternatively be disposed in a headset, to obtain a bone conduction headset. The audio module 170 may obtain a voice signal through parsing based on the vibration signal that is of the vibration bone of the vocal part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to provide an incoming call vibration prompt or a touch vibration feedback. For example, touch operations performed on different applications (for example, shooting and audio playing) may correspond to different vibration feedback effects. The motor 191 may also correspond to different vibration feedback effects for touch operations performed on different areas of the display 194. Different application scenarios (for example, a time reminder scenario, an information receiving scenario, an alarm clock scenario, and a game scenario) may also correspond to different vibration feedback effects. A touch vibration feedback effect may alternatively be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted in a same SIM card interface 195. The plurality of cards may be of a same type, or may be of different types. The SIM card interface 195 may be further compatible with different types of SIM cards. The SIM card interface 195 may also be compatible with the external storage card. The electronic device 100 interacts with a network by using the SIM card, to implement functions such as calling and data communication. In some embodiments, the electronic device 100 uses an eSIM, namely, an embedded SIM card. The eSIM card may be embedded into the electronic device 100, and cannot be separated from the electronic device 100.

A software system of the electronic device 100 may use a layered architecture, an event-driven architecture, a microkernel architecture, a micro service architecture, or a cloud architecture. In the embodiments of the present invention, an Android system of a layered architecture is used as an example to describe a software structure of the electronic device 100.

Figure 2:
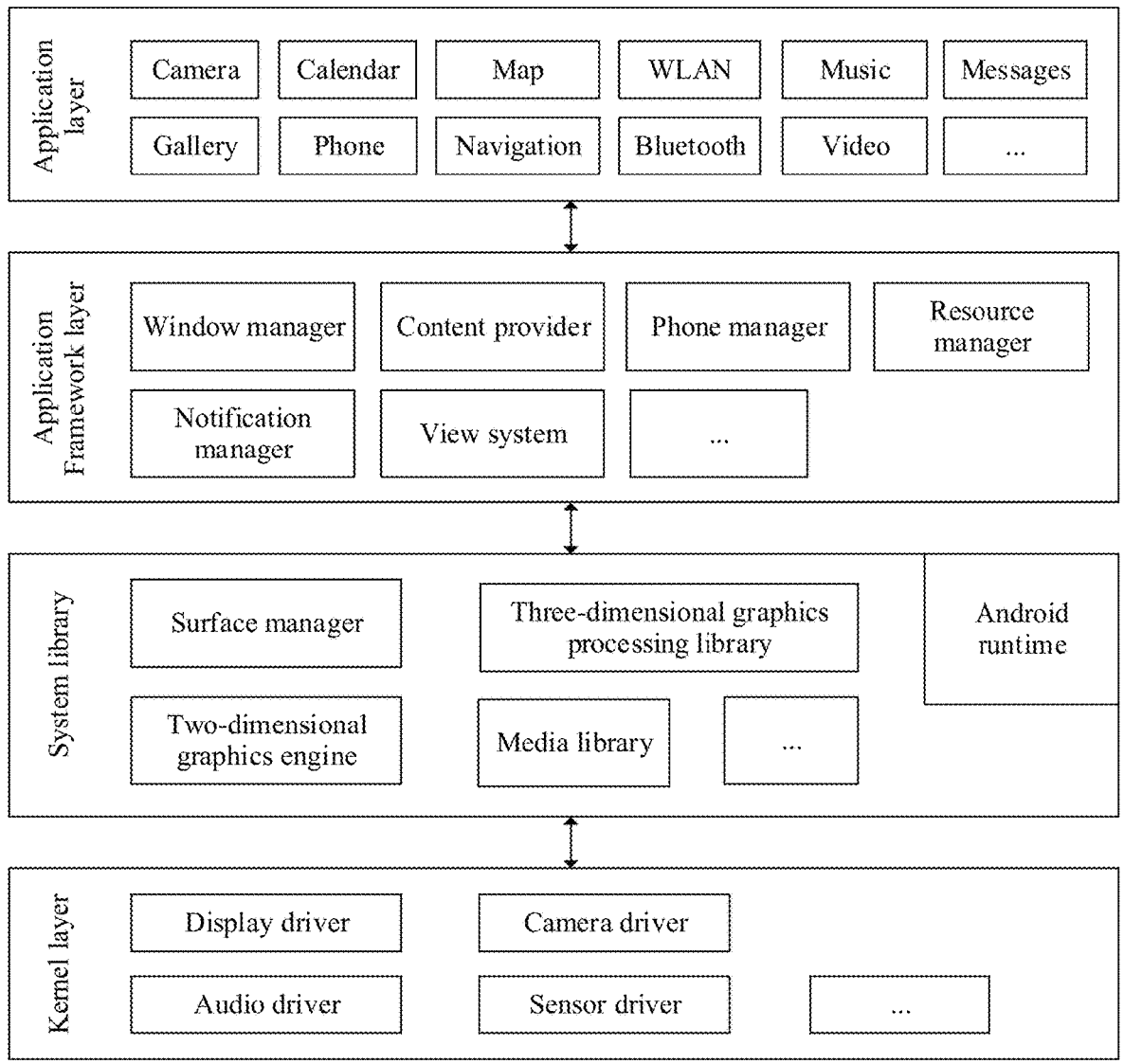
FIG. 2 is a schematic diagram of a software architecture according to an embodiment of this application.

FIG. 2 is a block diagram of the software structure of the electronic device 100 according to an embodiment of the present invention.

In the layered architecture, software is divided into several layers, and each layer has a clear role and task. The layers communicate with each other through a software interface. In some embodiments, the Android system is divided into four layers: an application layer, an application framework layer, an Android runtime and system library, and a kernel layer from top to bottom.

The application layer may include a series of application packages.

As shown in FIG. 2, the application packages may include applications such as Camera, Gallery, Calendar, Phone, Map, Navigation, WLAN, Bluetooth, Music, Video, and Messages.

The application framework layer provides an application programming interface (API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to store and obtain data, and enable the data to be accessed by an application. The data may include a video, an image, audio, calls that are made and received, a browsing history and a bookmark, a phone book, and the like.

The view system includes visual controls such as a control for displaying text and a control for displaying a picture. The view system may be configured to construct an application. A display interface may include one or more views. For example, a display interface including a Messages notification icon may include a text display view and a picture display view.

The phone manager is configured to provide a communications function of the electronic device 100, for example, management of a call status (including answering, declining, or the like).

The resource manager provides various resources for an application, such as a localized character string, an icon, an image, a layout file, and a video file.

The notification manager enables an application to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application program running on a background or a notification that appears on the interface in a form of a dialog window. For example, text information is prompted in the status bar, a prompt tone is produced, the electronic device vibrates, or an indicator blinks.

The Android runtime includes a kernel library and a virtual machine. The Android runtime is responsible for scheduling and management of the Android system.

The kernel library includes two parts: a function that needs to be invoked in java language and a kernel library of Android.

The application layer and the application framework layer run on the virtual machine. The virtual machine executes java files of the application layer and the application framework layer as binary files. The virtual machine is configured to perform functions such as object lifecycle management, stack management, thread management, security and exception management, and garbage collection.

The system library may include a plurality of functional modules, for example, a surface manager (surface manager), a media library, a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playing and recording of a plurality of commonly used audio and video formats, static image files, and the like. The media library may support a plurality of audio and video coding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a working process of software and hardware of the electronic device 100 with reference to a photographing scenario.

When the touch sensor 180K receives a touch operation, a corresponding hardware interrupt is sent to the kernel layer. The kernel layer processes the touch operation into an original input event (including information such as touch coordinates and a time stamp of the touch operation). The original input event is stored at the kernel layer. The application program framework layer obtains the original input event from the kernel layer, and identifies a control corresponding to the input event. An example in which the touch operation is a touch tap operation, and a control corresponding to the tap operation is a control of a camera application icon is used. The camera application invokes an interface at the application framework layer to enable the camera application, then enables a camera driver by invoking the kernel layer, and captures a static image or a video by using the camera 193.

Figure 3:
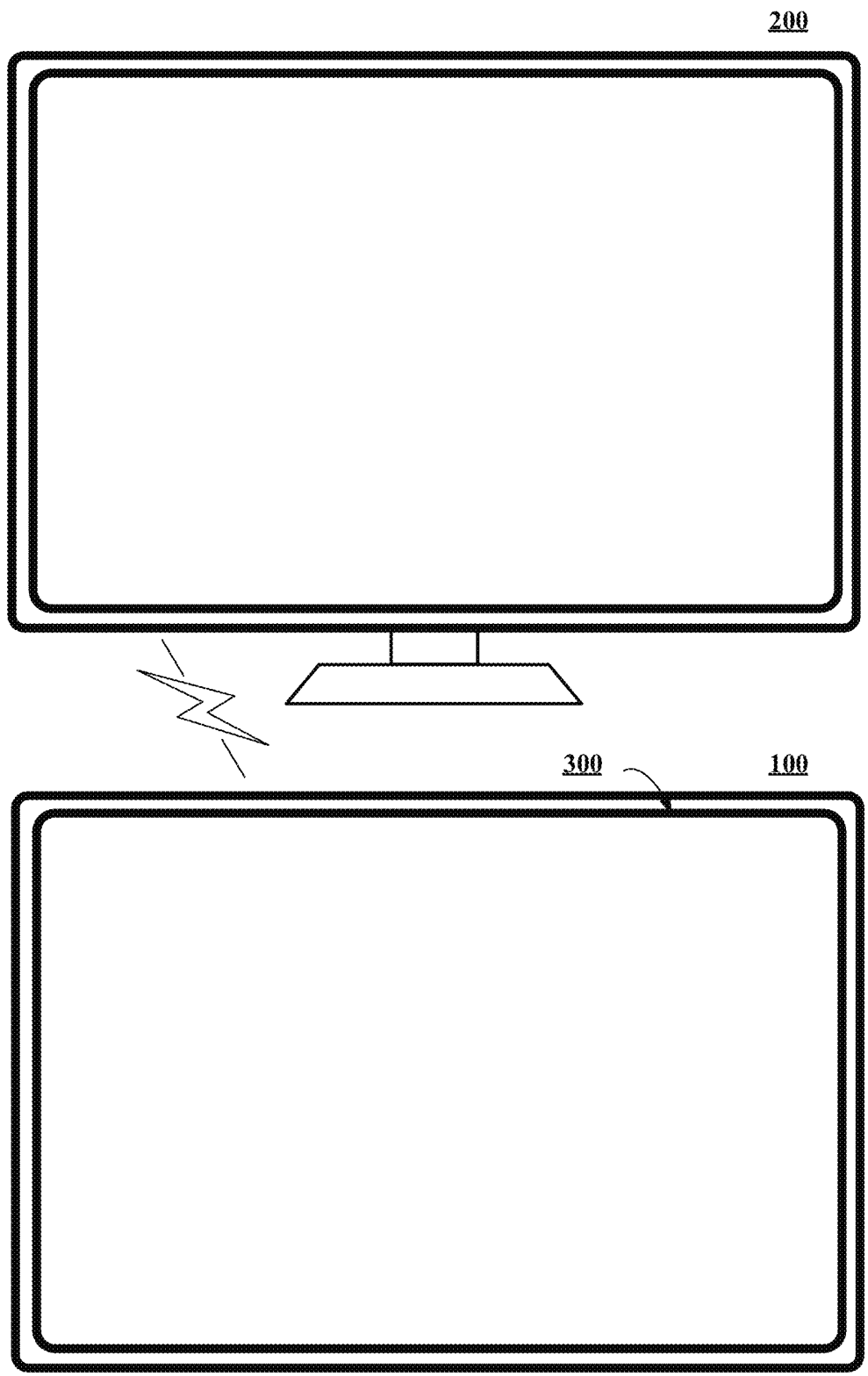
FIG. 3 is a schematic diagram of a structure of a system according to an embodiment of this application.

The embodiments of this application provide a screen projection method. The method may be applied to mobile office and another application scenario in which display data on a terminal needs to be displayed on a plurality of displays. For example, as shown in FIG. 3, an electronic device 100 may be a mobile phone, a tablet computer, a wearable device, an augmented reality (AR)/virtual reality (VR) device, a notebook computer, an ultra-mobile personal computer (UMPC), a netbook, a personal digital assistant (PDA), or the like. This is not limited in the embodiments of this application. An external display device 200 in the embodiments of this application may be any display apparatus such as a display of a PC, a television, a tablet computer, or a projector.

As shown in FIG. 3, the electronic device 100 may establish a wireless connection to the external display device 200 in wireless communication manner (for example, Wi-Fi or Bluetooth). Alternatively, the electronic device 100 may establish a connection to the external display device 200 in a wired manner (for example, a data cable).

In the embodiments of this application, the electronic device 100 may be further connected to the external display device 200 through a transit device. The transit device may be plugged into a universal serial bus (USB) interface of a data cable, and a Type-C interface of the data cable is plugged into the electronic device 100. The transit device may be further connected to the external display device 200 through an adapter cable. The adapter cable may include any one of a high definition multimedia interface (HDMI) adapter cable, a video graphics array (VGA) adapter cable, a digital visual interface (DVI) adapter cable, and the like.

The transit device in the embodiments of this application may be a mobile high-definition link (MHL) device. The MHL device may simultaneously transmit an audio signal and a video signal in the electronic device 100 (for example, a mobile phone) to the external display device 200 for displaying.

The electronic device 100 may be used as a master device, and the external display device 200 may be used as a slave device of the electronic device 100. After the electronic device 100 establishes a connection to the external display device 200, the electronic device 100 has two displays. One is a touchscreen 300 of the electronic device 100, and the other is a display of the external display device 200 connected to the electronic device 100.

Currently, the electronic device 100 may enable a multi-application split-screen function, and display interfaces of a plurality of applications in different areas on the touchscreen 300. When the electronic device 100 enables a screen projection mode and establishes a connection to the external display device 200, the electronic device 100 may send display content displayed on the touchscreen 300 and to-be-output audio content to the external display device 200. After receiving the display content and the audio content, the external display device 200 may display the received display content on the display of the external display device 200, and play the audio content by using an audio output apparatus of the external display device. The display content on the display of the external display device 200 is consistent with the display content on the touchscreen 300 of the electronic device 100. For example, the electronic device 100 may display an application interface of Video, an application interface of Settings, an application interface of Music, an application interface of Gallery, and an application interface of Messages in different areas on the touchscreen 300. When the electronic device 100 projects, onto the external display device 200, the display content on the touchscreen 300, the external display device 200 also displays an application interface of Video, an application interface of Settings, an application interface of Music, an application interface of Gallery, and an application interface of Messages in different areas on the display.

A plurality of application interfaces (for example, the application interface of Video, the application interface of Settings, the application interface of Music, the application interface of Gallery, and the application interface of Messages) are displayed in different areas on the touchscreen 300 of the electronic device 100, and some application interfaces (for example, the application interface of Gallery and the application interface of Messages) may involve user privacy. If these application interfaces involving user privacy are projected onto the external display device 200, these application interfaces are easy to be seen by another person. This cases leakage of user privacy, and brings bad experience to the user.

Therefore, the embodiments of this application provide a screen projection method. When the plurality of application interfaces are split-screen displayed on the touchscreen 300 of the electronic device 100, and when the electronic device 100 enables the screen projection function and establishes a connection to the external display device 300, the electronic device 100 may receive a selection operation of a user. The selection operation of the user is selection on the plurality of application interfaces split-screen displayed on the touchscreen 300. In response to the selection operation, the electronic device 100 may project one or more application interfaces selected by the user onto the display of the external display device 200 for displaying. In this way, the electronic device 100 can project, based on the selection operation of the user onto the display of the external display device 200 for displaying, the one or more application interfaces selected by the user on the touchscreen 300. This ensures that an application interface involving user privacy is projected only after the user agrees and confirms, to ensure user privacy and improve user experience.

The following describes the screen projection method provided in the embodiments of this application in detail with reference to the accompanying drawings.

In some application scenarios, a user needs to simultaneously process a plurality of application tasks on the electronic device 100. To meet such a requirement of the user, the electronic device 100 may display a plurality of application interfaces (for example, an application interface of Video, an application interface of Settings, an application interface of Music, an application interface of Gallery, and an application interface of Messages) in different areas on the touchscreen 300. When the plurality of application interfaces are displayed in different areas on the touchscreen 300 of the electronic device 100, and when the electronic device 100 receives an input operation of the user and enables a screen projection function, the electronic device 100 may establish a connection (for example, a Wi-Fi connection or a wired connection) to the external display device 200, and display a projection add control in a display area of each application interface on the touchscreen 300. The electronic device 100 may receive an input operation on the projection add control. In response to the input operation, the electronic device may project the application interface corresponding to the projection add control onto the external display device 200. After the application interface on the touchscreen 300 is projected onto the display of the external display device 200, a projection cancel control is displayed in the display area of the application interface. The electronic device 100 may receive an input operation on the projection cancel control. In response to the input operation on the projection cancel control, the electronic device 100 may cancel projection of the application interface onto the display of the external display device 200. In this way, the electronic device 100 can select, based on the input operation of the user, the one or more application interfaces from the plurality of application interfaces split-screen displayed on the touchscreen 300, and project the one or more application interfaces onto the display of the external display device 200, to ensure that an application interface involving user privacy is projected only after the user agrees and confirms. This ensures user privacy.

Figures 1, 2, 4A:
Figures 2, 4A:
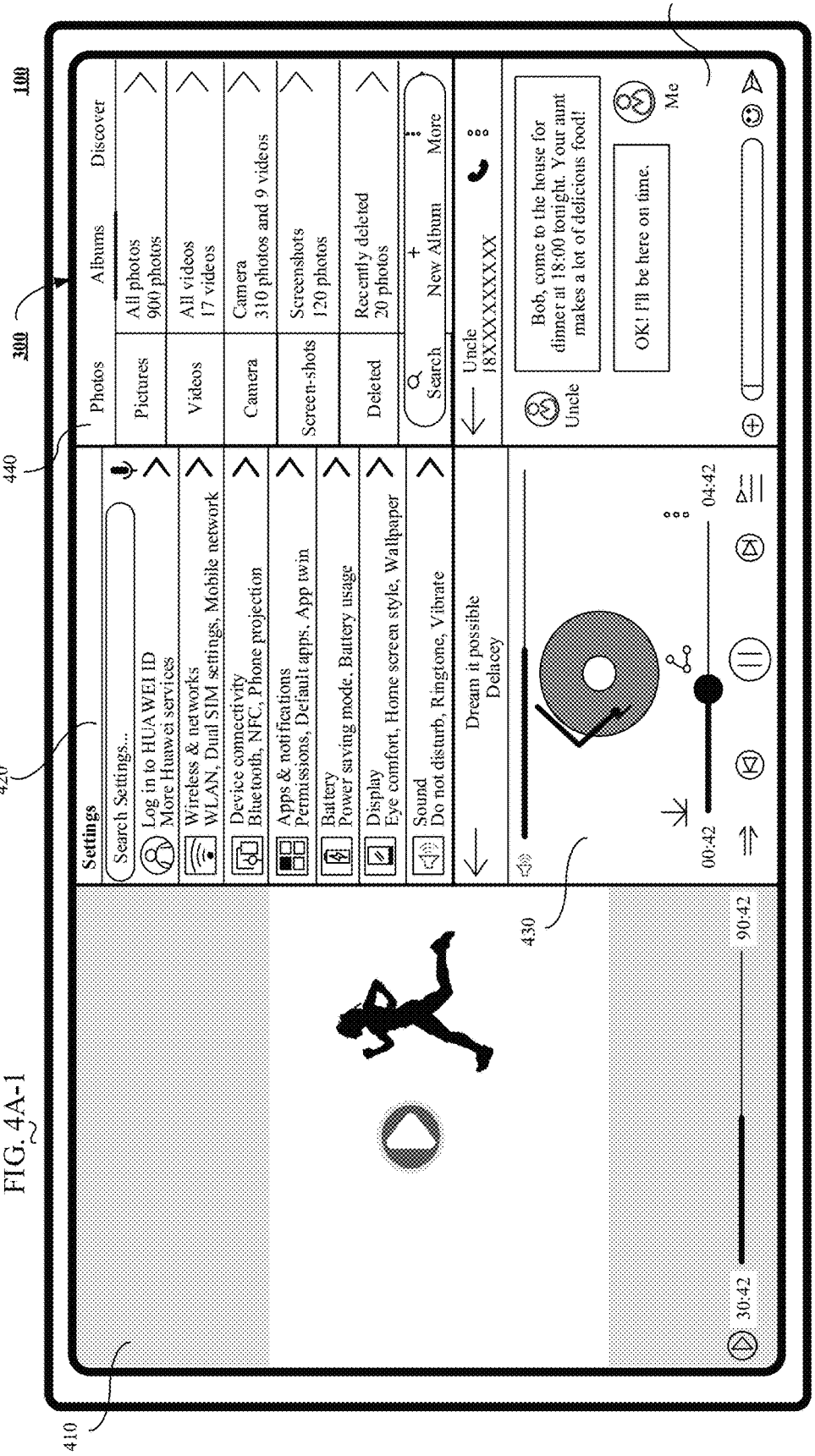

For example, as shown in FIG. 4A-1 and FIG. 4A-2, the electronic device 100 displays an application interface 410 of Video, an application interface 420 of Settings, an application interface 430 of Music, an application interface 440 of Gallery, and an application interface 450 of Messages in different areas on the touchscreen 300. The application interface 410 of Video includes a video play screen, a play/pause button, a play progress bar, and the like. The application interface 420 of Settings includes a setting item search box, an account login option, one or more setting options, and the like (for example, a wireless and network settings option, a device connectivity settings option, applications and notifications settings option, a battery settings option, a display settings option, and a sound settings option). The application interface 430 of Music includes a song name and a singer, a volume adjustment button, a song download button, a song share button, a more function button, a play progress bar, a play mode switching button, a previous song button, a play/pause button, a next song button, a playlist button, and the like. The application interface 440 of Gallery includes a photo control, an album control, a discover control, and the like. When the user taps the album control, the electronic device 100 displays, in the application interface 440 of Gallery, a page corresponding to the album control. The page corresponding to the album control includes one or more album options (for example, an all-photos option, an all videos option, a camera option, a screenshots option, a recently deleted option, a favorite option). The application interface 450 of Messages includes a name and contact information of a contact, and a message chat window, and further includes a picture or video add button, a text enter box, an emoji enter button, a message sending button, and the like below the message chat window. The message chat window includes chat information between the user and the contact (for example, "uncle").

The electronic device 100 may receive an input operation of the user, enable the screen projection function, and establish a connection (for example, a wireless connection such as Wi-Fi or a wired connection via an HDMI data cable) between the electronic device 100 and the external display device 200. The following provides descriptions by using an example in which the electronic device 100 establishes a wireless connection to the external display device 200, to perform wireless projection.

Figures 1, 2, 4B:
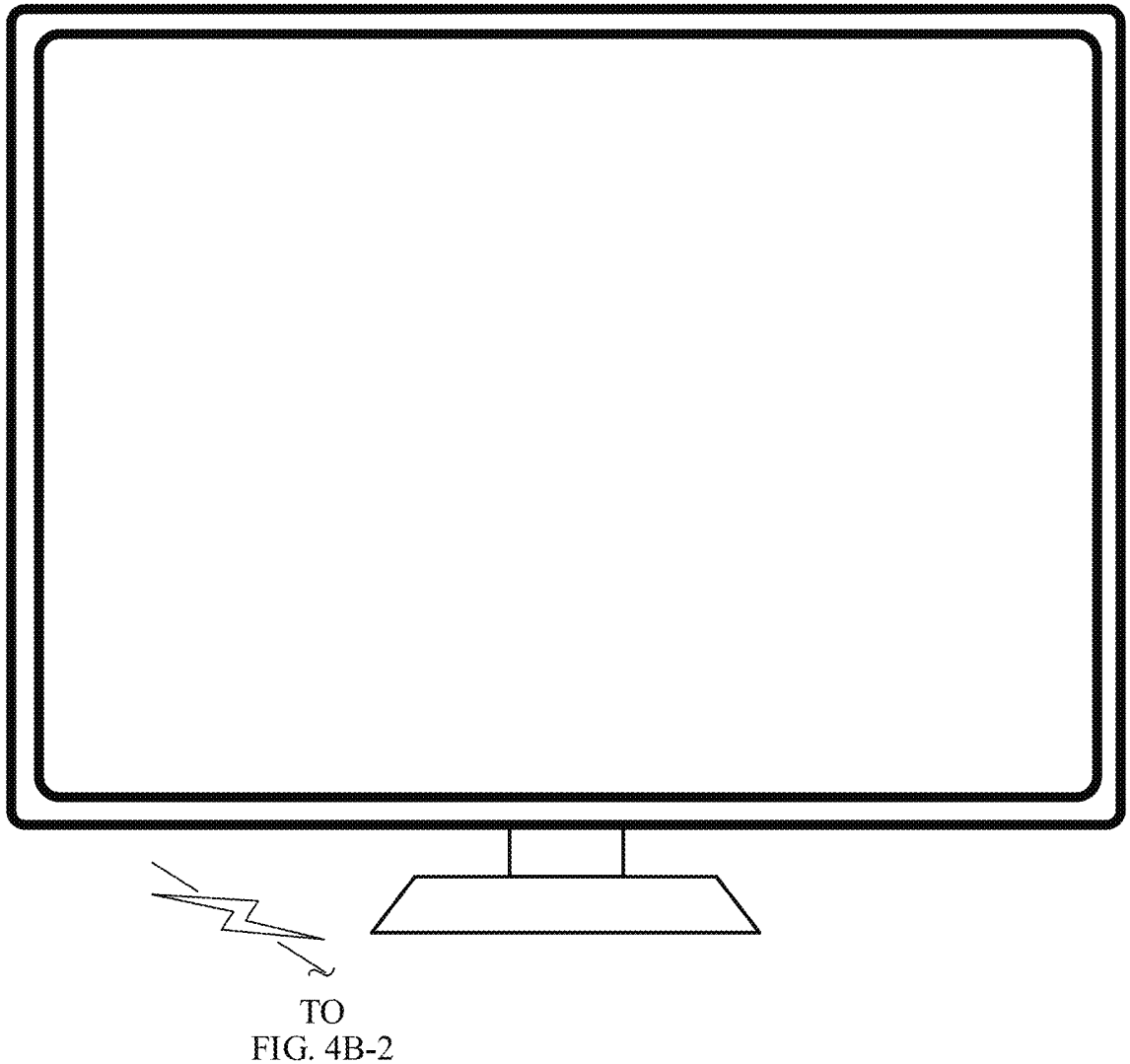
Figures 2, 4B:
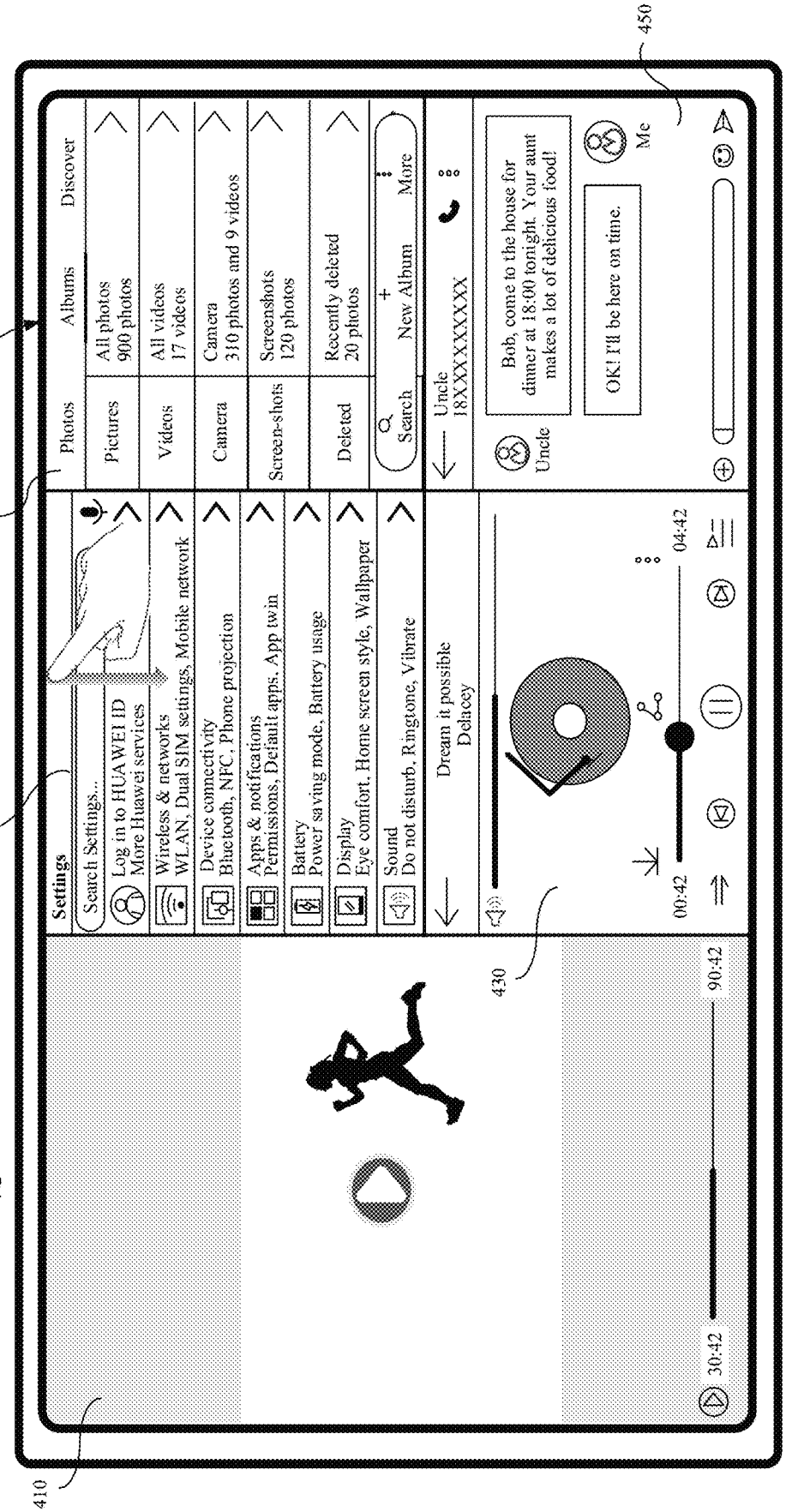

For example, as shown in FIG. 4B-1 and FIG. 4B-2, the electronic device 100 may receive an input operation 426 (for example, swiping down from the top of the touchscreen 300) on the top of the touchscreen 300. In response to the input operation 426, the electronic device 100 may display a window 460 shown in FIG. 4C-1 and FIG. 4C-2.

Figures 1, 2, 4C:
Figures 2, 4C:
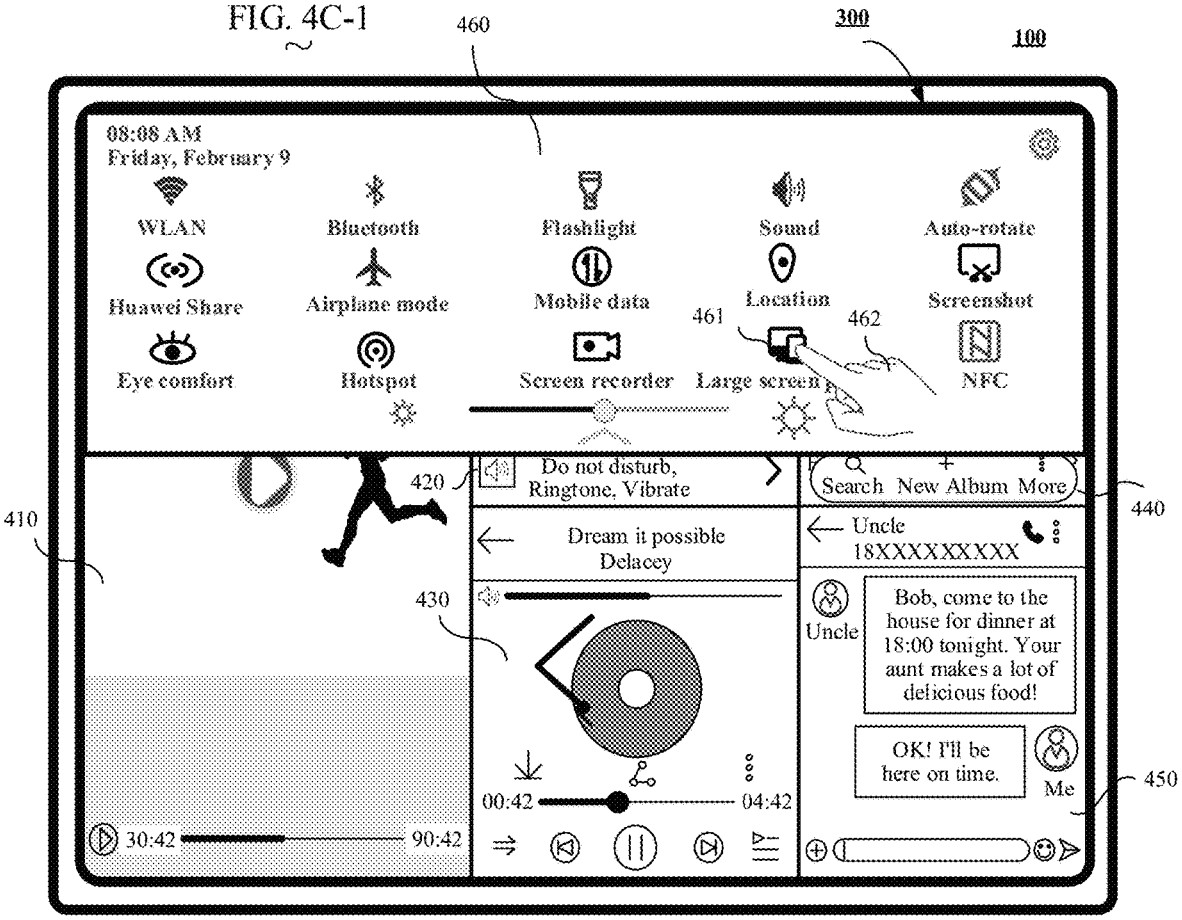

As shown in FIG. 4C-1 and FIG. 4C-2, some function controls (for example, a WLAN on/off control, a Bluetooth on/off control, a flashlight on/off control, a ringing type switch control, an auto-rotate on/off control, a Huawei share (Huawei share) on/off control, an airplane mode on/off control, a mobile data on/off control, a location on/off control, a screenshot on/off control, an eye comfort mode on/off control, a hotspot on/off control, a screen recorder on/off control, a large-screen projection on/off control 461, and an NFC on/off control) may be displayed in the window 460. The electronic device 100 may receive an input operation 462 (for example, tapping) by the user on the large-screen projection on/off control 461. In response to the input operation 462, the electronic device 100 may display a wireless projection selection window 470 shown in FIG. 4D-1 and FIG. 4D-2 on the touchscreen 300.

As shown in FIG. 4D-1 and FIG. 4D-2, the wireless projection selection window 470 may display a projection device option 471, a help view button, and a cancel button. A name (for example, "AC200") of a projection device is displayed in the projection device option 471, and the electronic device 100 may find a name (for example, AC200) of the projection device by using a wireless technology such as Wi-Fi. The name "AC200" may be used to refer to the external display device 200. The electronic device 100 may receive an input operation 472 (for example, tapping) by the user on the projection device option 471. In response to the input operation 472, the electronic device 100 may establish a connection to the external display device 200 by using a wireless technology such as Wi-Fi, and display a projection add button in each application interface displayed on the touchscreen 300, as shown in FIG. 4E-1 and FIG. 4E-2.

Figures 1, 2, 4E:
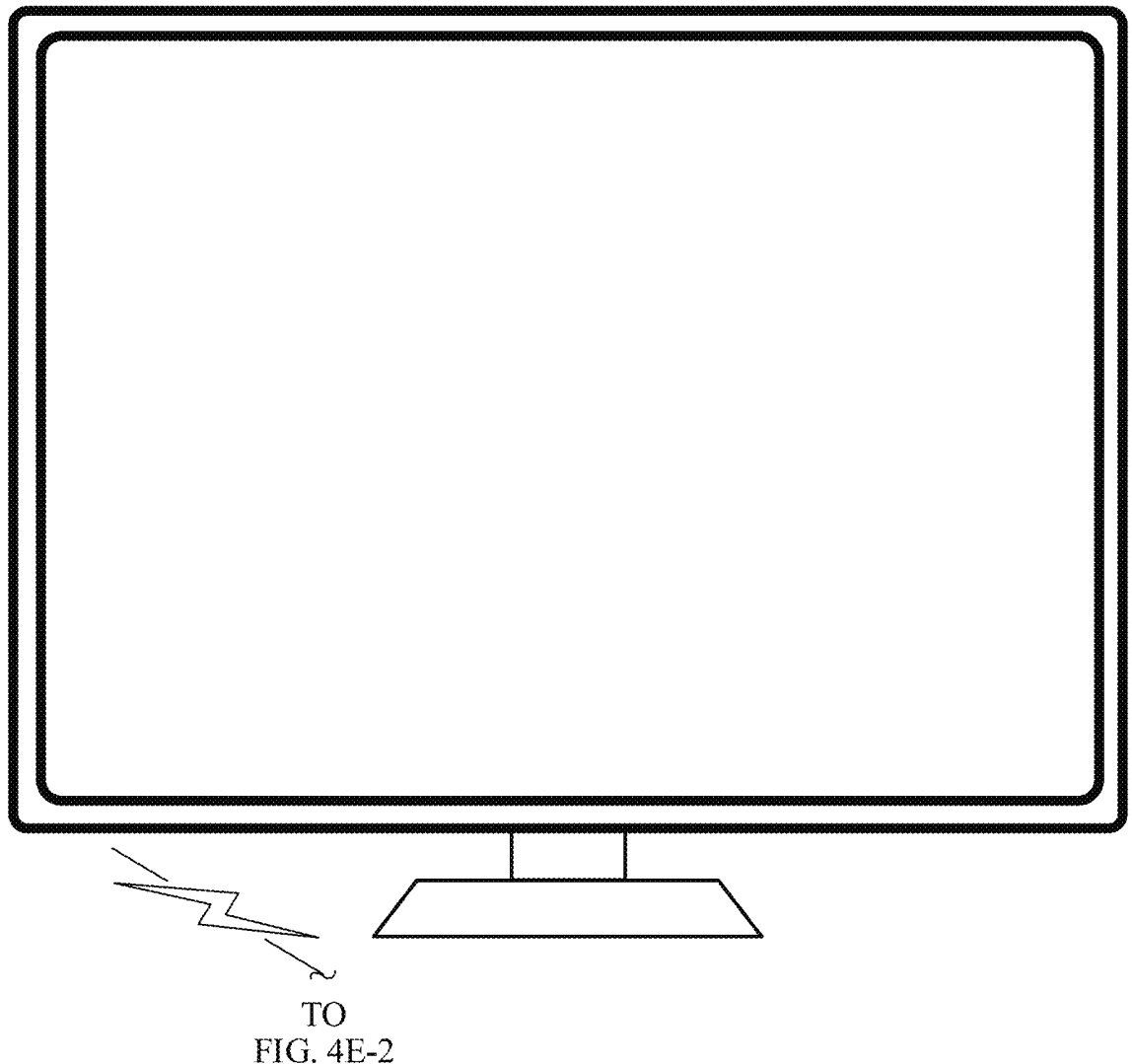
Figures 2, 4E:
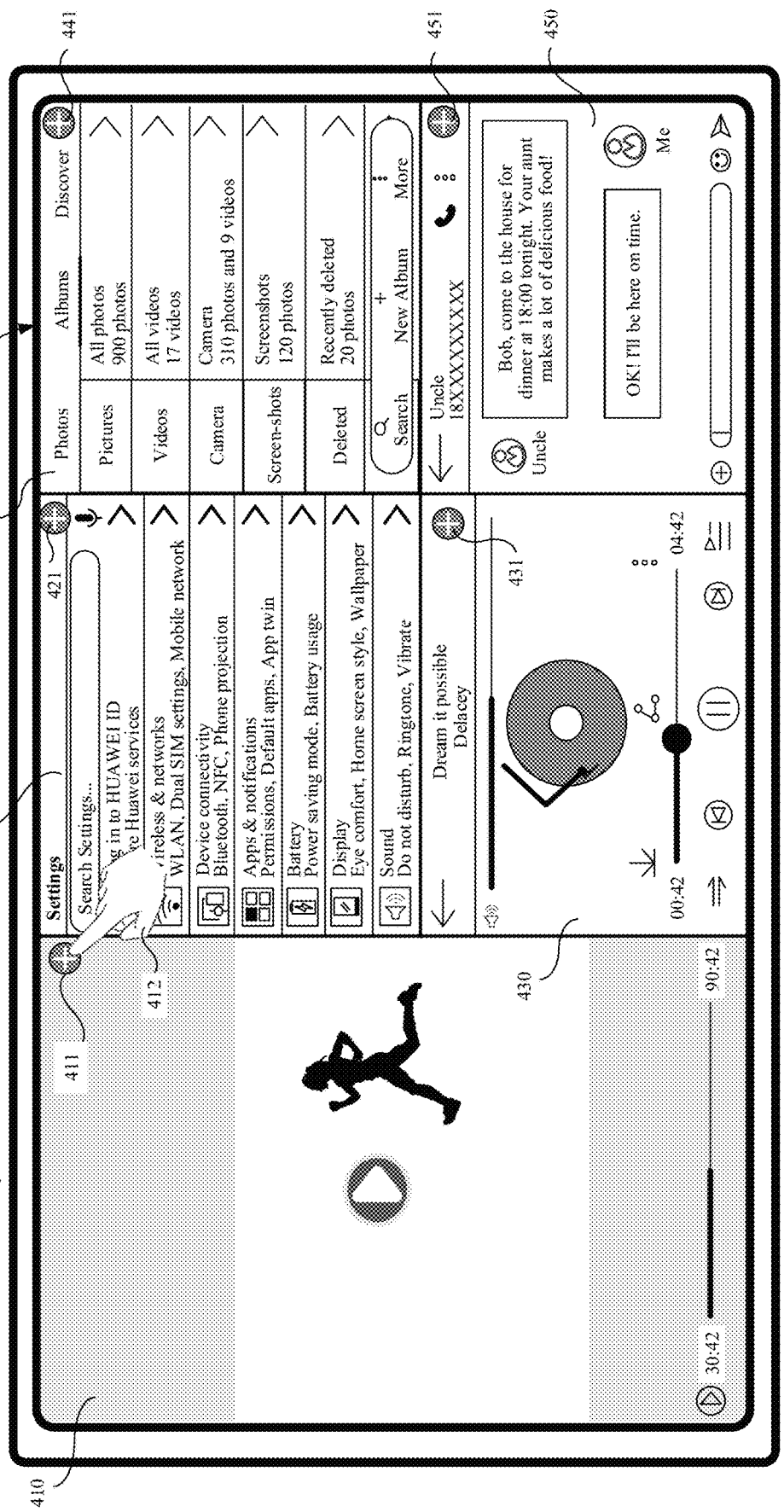

As shown in FIG. 4E-1 and FIG. 4E-2, the electronic device 100 may display a projection add button 411 in an upper right corner of the application interface 410 of Video on the touchscreen 300, the electronic device 100 may display a projection add button 421 in an upper right corner of the application interface 420 of Settings on the touchscreen 300, the electronic device 100 may display a projection add button 431 in an upper right corner of the application interface 430 of Music on the touchscreen 300, the electronic device 100 may display a projection add button 441 in an upper right corner of the application interface 440 of Gallery on the touchscreen 300, and the electronic device 100 may display a projection add button 451 in an upper right corner of the application interface 450 of Messages on the touchscreen 300. The projection add buttons (for example, the projection add button 411, the projection add button 421, the projection add button 431, the projection add button 441, and the projection add button 451) each are not limited to being displayed in the upper right corner of the application interface, or may be displayed in another position in the application interface. This is not limited herein.

After a projection add button is triggered by the user, the electronic device may project an application interface corresponding to the projection add button onto the external display device 200 for displaying. An interface element in the application interface corresponding to the projection add button is the same as an interface element in an application interface displayed on the external display device 200, and the two application interfaces may be considered as a same application interface. When a same application interface is displayed on different devices, a display ratio is adaptively adjusted. For example, because the touchscreen of the electronic device and the display of the external display device are different in size, a display ratio of an application interface of Video on the touchscreen of the electronic device is different from a display ratio of the same application interface of Video on the display of the external display device.

The projection add button 411 may be used to receive an input operation (for example, tapping) by the user. In response to the input operation (for example, tapping) on the projection add button 411, the electronic device 100 may project, onto the display of the external display device 200, the application interface 410 of Video displayed on the touchscreen 300. The projection add button 421 may be used to receive an input operation (for example, tapping) by the user. In response to the input operation (for example, tapping) on the projection add button 421, the electronic device 100 may project, onto the display of the external display device 200, the application interface 420 of Settings displayed on the touchscreen 300. The projection add button 431 may be used to receive an input operation (for example, tapping) by the user. In response to the input operation (for example, tapping) on the projection add button 431, the electronic device 100 may project, onto the display of the external display device 200, the application interface 430 of Music displayed on the touchscreen 300. The projection add button 441 may be used to receive an input operation (for example, tapping) by the user. In response to the input operation (for example, tapping) on the projection add button 441, the electronic device 100 may project, onto the display of the external display device 200, the application interface 440 of Gallery displayed on the touchscreen 300. The projection add button 451 may be used to receive an input operation (for example, tapping) by the user. In response to the input operation (for example, tapping) on the projection add button 451, the electronic device 100 may project, onto the display of the external display device 200, the application interface 450 of Messages displayed on the touchscreen 300.

For example, as shown in FIG. 4E-1 and FIG. 4E-2, the electronic device 100 may receive an input operation 412 (for example, tapping) by the user on the projection add button 411 on the touchscreen 300. In response to the input operation 412, as shown in FIG. 4F-1 and FIG. 4F-2, the electronic device 100 may project, onto the display of the external display device 200, the application interface 410 of Video displayed on the touchscreen 300.

Figures 1, 4F:
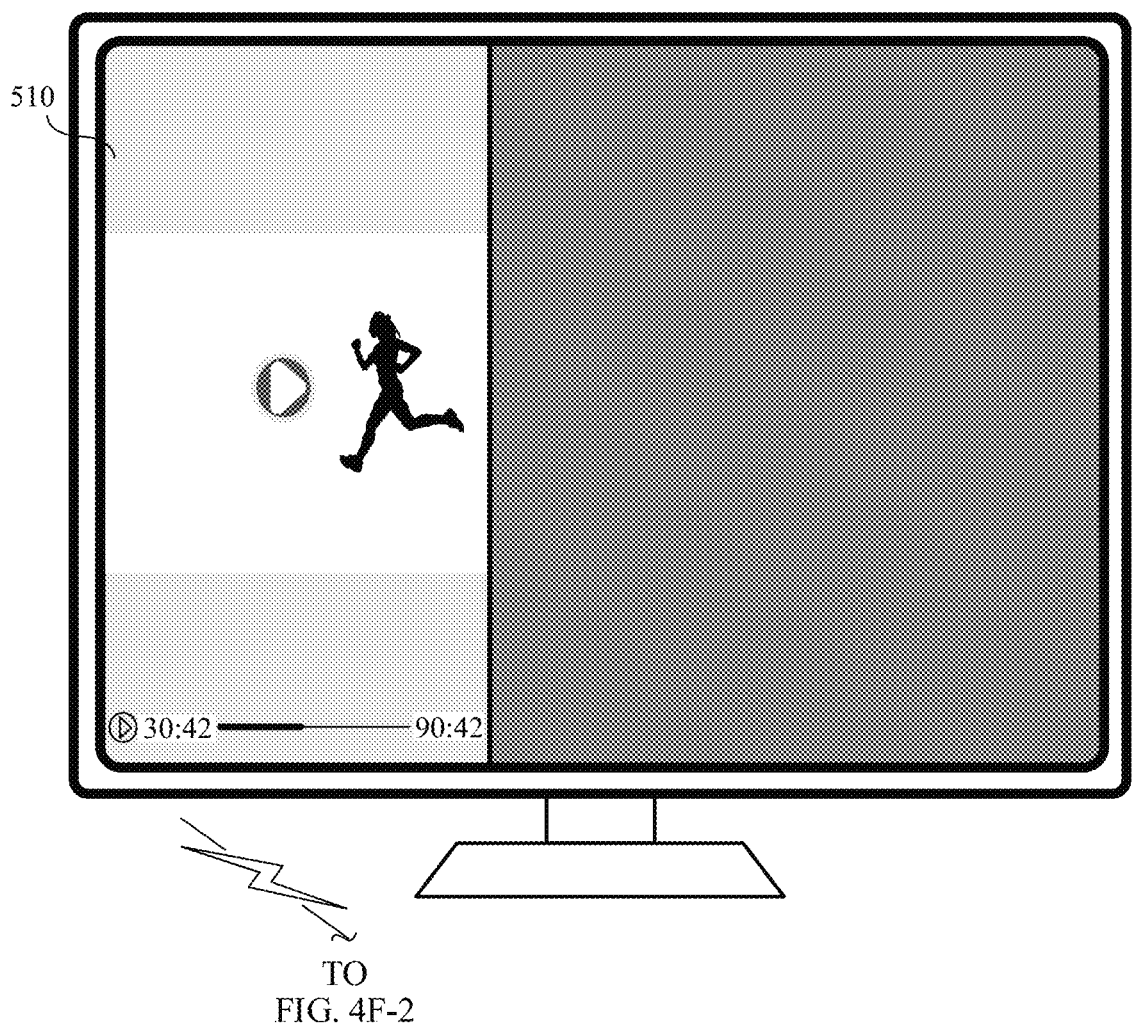

As shown in FIG. 4F-1 and FIG. 4F-2, an application interface 510 of Video is displayed on the display of the external display device 200. Display content in the application interface 510 of Video displayed on the display of the external display device 200 is the same as display content in the application interface 410 of Video displayed on the touchscreen 300 of the electronic device 100.

In a possible implementation, a layout of the plurality of application interfaces on the touchscreen 300 of the electronic device 100 is the same as a layout of a plurality of application interfaces on the display of the external display device 200.

After the user selects one or more application interfaces on the electronic device 100 to be projected onto the external display device 200 and the electronic device 100 has performed projection display, the user may further continue to trigger a projection add button in an interface that is not projected and that is on the electronic device 100, and the application interface is additionally projected onto the external display device 200.

For example, as shown in FIG. 4F-1 and FIG. 4F-2, the application interface 410 of Video is displayed in a left display area of the touchscreen 300, and similarly, the application interface 510 of Video is displayed in a left display area of the display of the external display device 200. After projecting, onto the display of the external display device 200, the application interface 410 of Video displayed on the touchscreen 300, the electronic device 100 may further receive an input operation 422 (for example, tapping) by the user on the projection add button 421 in the application interface 420 of Settings. In response to the input operation 422, as shown in FIG. 4G-1 and FIG. 4G-2, the electronic device 100 may further project the application interface 420 of Settings onto the display of the external display device 200 for displaying while projecting the application interface 410 of Video onto the display of the external display device 200 for displaying.

As shown in FIG. 4G-1 and FIG. 4G-2, the application interface 510 of Video and an application interface 520 of Settings are displayed on the display of the external display device 200. Display content in the application interface 520 of Settings is the same as display content in the application interface 420 of Settings displayed on the touchscreen 300 of the electronic device 100. Relative positions of the application interface 510 of Video and the application interface 520 of Settings that are displayed on the display of the external display device 200 are the same as relative positions of the application interface 410 of Video and the application interface 420 of Settings that are displayed on the touchscreen 300. The application interface 420 of Settings is displayed in an upper middle display area of the touchscreen 200. Similarly, the application interface 520 of Settings is displayed in an upper middle display area of the display of the external display device 200.

After projecting, onto the display of the external display device 200, the application interface 410 of Video and the application interface 420 of Settings that are displayed on the touchscreen 300, the electronic device 100 may further receive an input operation 432 (for example, tapping) by the user on the projection add button 431 in the application interface 430 of Music. In response to the input operation 432, as shown in FIG. 4H-1 and FIG. 4H-2, the electronic device 100 may further project the application interface 430 of Music onto the display of the external display device 200 for displaying while projecting the application interface 410 of Video and the application interface 420 of Settings onto the display of the external display device 200 for displaying.

Figures 1, 4H:
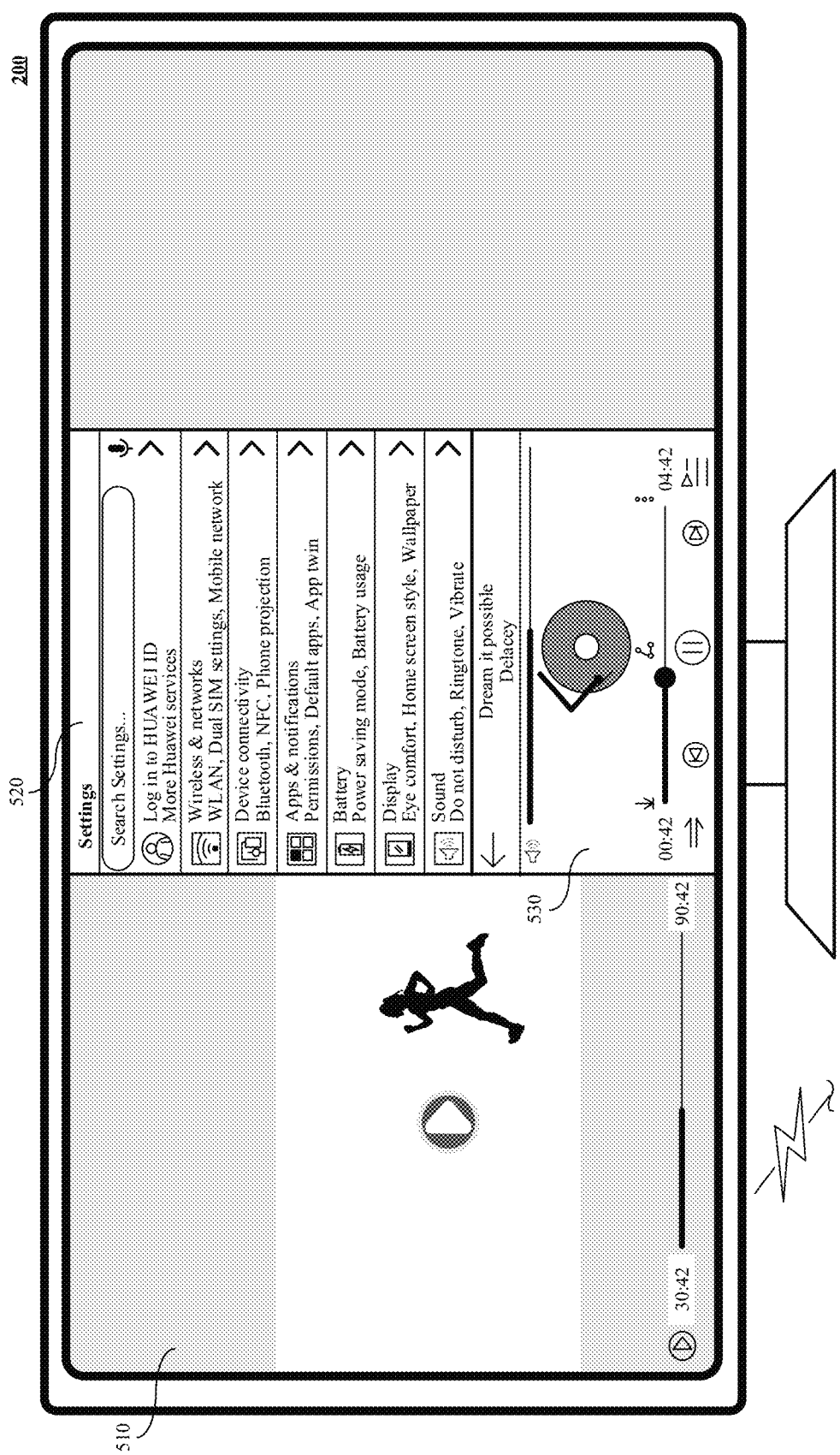
Figures 2, 4H:
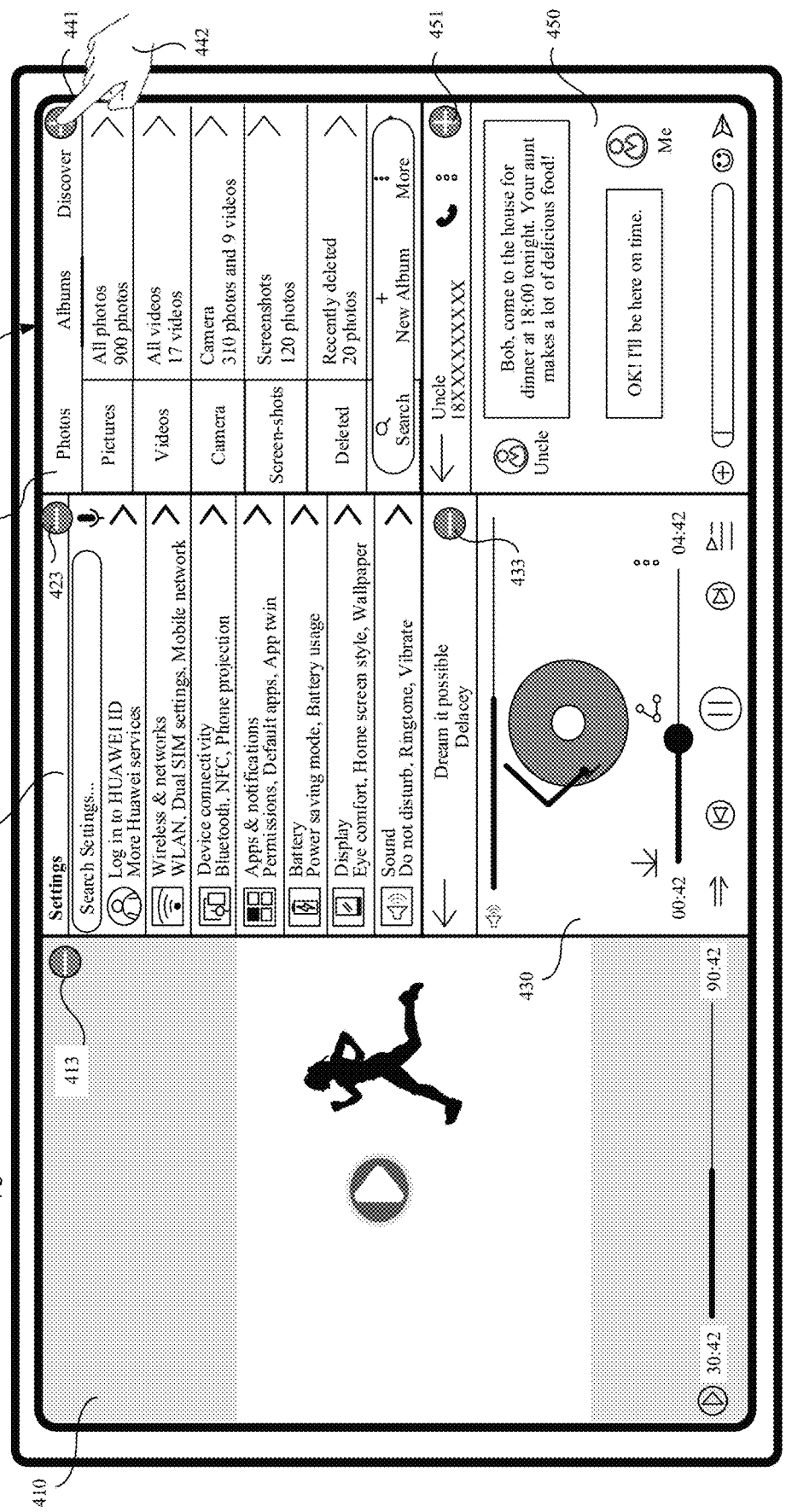

As shown in FIG. 4H-1 and FIG. 4H-2, the application interface 510 of Video, the application interface 520 of Settings, and an application interface 530 of Music are displayed on the display of the external display device 200. Display content in the application interface 530 of Music is the same as display content in the application interface 430 of Music displayed on the touchscreen 300 of the electronic device 100. Relative positions of the application interface 510 of Video, the application interface 520 of Settings, and the application interface 530 of Music that are displayed on the display of the external display device 200 are the same as relative positions of the application interface 410 of Video, the application interface 420 of Settings, and the application interface 430 of Music that are displayed on the touchscreen 300. The application interface 430 of Music is displayed in a lower middle display area of the touchscreen 200. Similarly, the application interface 530 of Music is displayed in a lower middle display area of the display of the external display device 200.

After projecting, onto the display of the external display device 200, the application interface 410 of Video, the application interface 420 of Settings, and the application interface 430 of Music that are displayed on the touchscreen 300, the electronic device 100 may further receive an input operation 442 (for example, tapping) by the user on the projection add button 441 in the application interface 440 of Gallery. In response to the input operation 442, as shown in FIG. 4I-1 and FIG. 4I-2, the electronic device 100 may further project the application interface 440 of Gallery onto the display of the external display device 300 for displaying while projecting the application interface 410 of Video, the application interface 420 of Settings, and the application interface 430 of Music onto the display of the external display device 200 for displaying.

Figures 1, 4I:
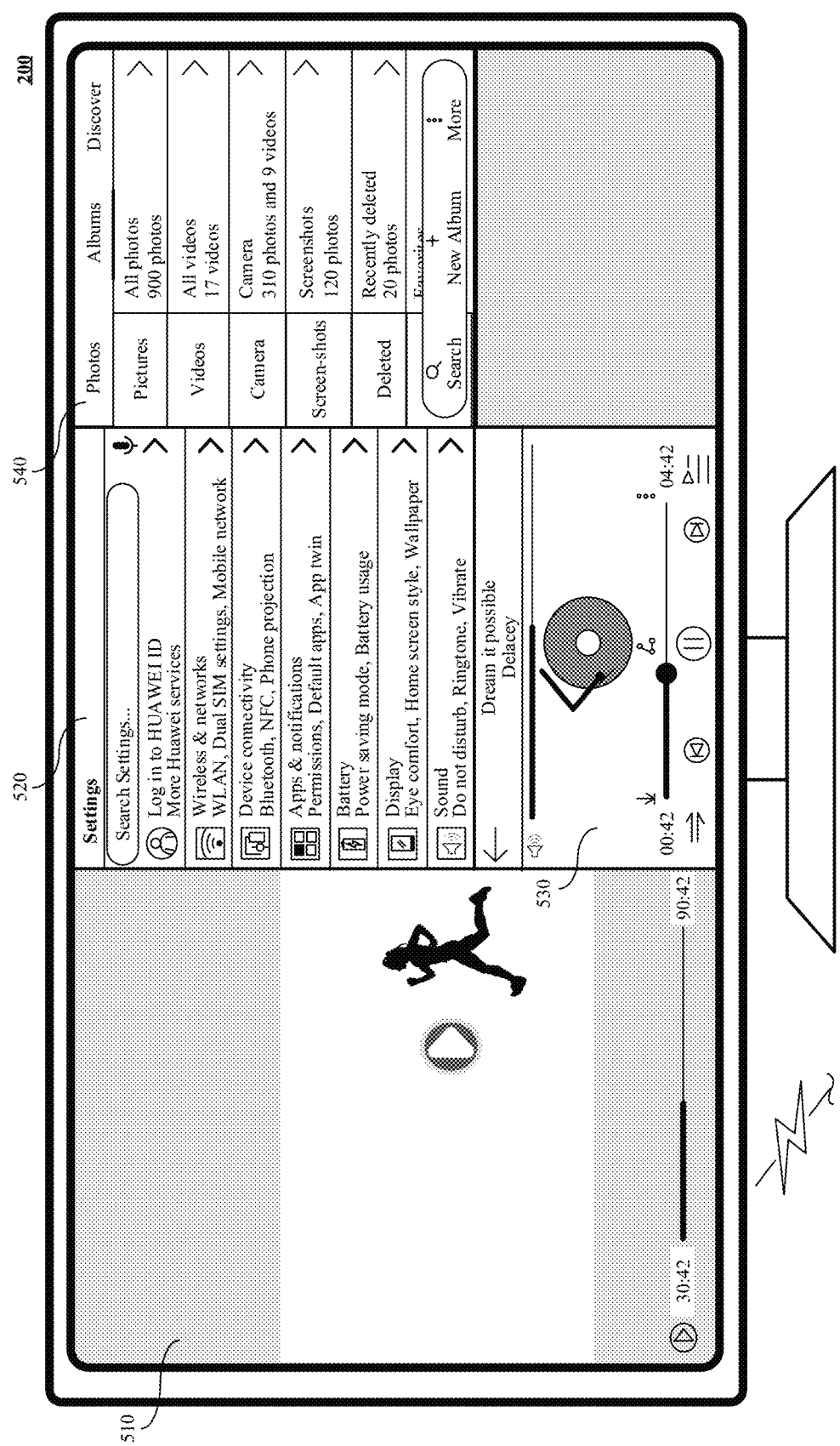
Figures 2, 4I:
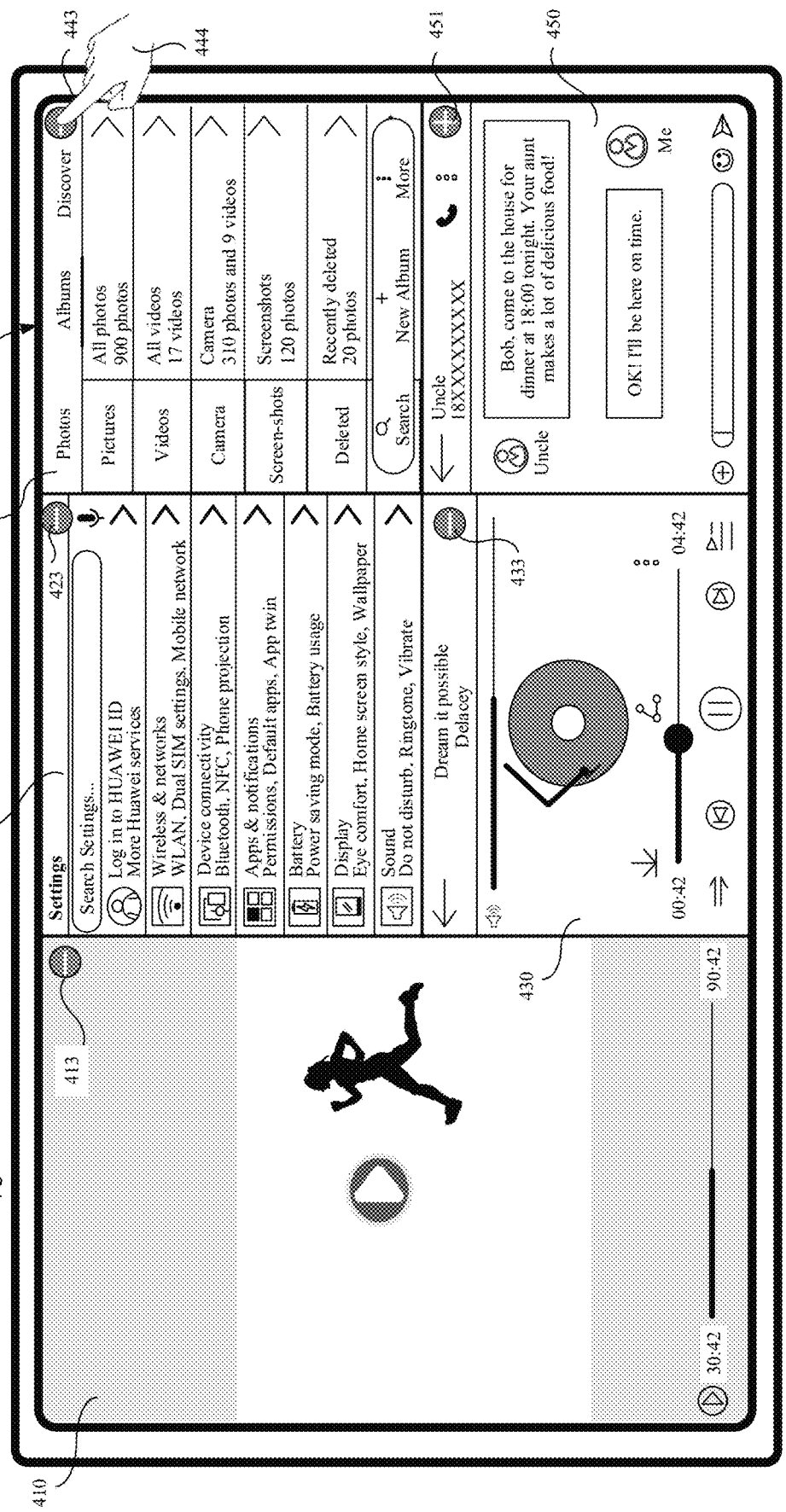

As shown in FIG. 4I-1 and FIG. 4I-2, the application interface 510 of Video, the application interface 520 of Settings, the application interface 530 of Music, and an application interface 540 of Gallery are displayed on the display of the external display device 200. Display content in the application interface 540 of Gallery is the same as display content in the application interface 440 of Gallery displayed on the touchscreen 300 of the electronic device 100. Relative positions of the application interface 510 of Video, the application interface 520 of Settings, the application interface 540 of Music, and the application interface 540 of Gallery that are displayed on the display of the external display device 200 are the same as relative positions of the application interface 410 of Video, the application interface 420 of Settings, the application interface 430 of Music, and the application interface 440 of Gallery that are displayed on the touchscreen 300. The application interface 440 of Gallery is displayed in an upper right display area of the touchscreen 200. Similarly, the application interface 540 of Gallery is displayed in an upper right display area of the display of the external display device 200.

In a possible implementation, when the electronic device 100 projects an application interface displayed on the touchscreen 300 to the display of the external display device 200, the electronic device 100 may switch a projection add button displayed in the application interface on the touchscreen 300 to a projection cancel button. The projection cancel button may be used to receive an input operation (for example, tapping) by the user. In response to the input operation on the projection cancel button, the electronic device 100 may cancel projection of the application interface corresponding to the projection cancel button onto the display of the external display device 200 for displaying.

For example, as shown in FIG. 4F-1 and FIG. 4F-2, after the electronic device 100 projects, onto the display of the external display device 200 for displaying, the application interface 410 of Video on the touchscreen 300, the electronic device 100 may replace the projection add button 411 displayed in the application interface 410 of Video with a projection cancel button 413. As shown in FIG. 4G-1 and FIG. 4G-2, after the electronic device 100 projects, onto the display of the external display device 200 for displaying, the application interface 420 of Settings on the touchscreen 300, the electronic device 100 may replace the projection add button 421 displayed in the application interface 420 of Settings with a projection cancel button 423. As shown in FIG. 4H-1 and FIG. 4H-2, after the electronic device 100 projects, onto the display of the external display device 200 for displaying, the application interface 430 of Music on the touchscreen 300, the electronic device 100 may replace the projection add button 431 displayed in the application interface 430 of Music with a projection cancel button 433. As shown in FIG. 4I-1 and FIG. 4I-2, after the electronic device 100 projects, onto the display of the external display device 200 for displaying, the application interface 440 of Gallery on the touchscreen 300, the electronic device 100 may replace the projection add button 441 displayed in the application interface 440 of Gallery with a projection cancel button 443.

The projection cancel button 413 may be used to receive an input operation (for example, tapping) by the user. In response to the input operation (for example, tapping) on the projection cancel button 413, the electronic device 100 may cancel projection, onto the display of the external display device 200, of the application interface 410 of Video displayed on the touchscreen 300. Similarly, the user triggers the projection cancel button 423, 433, or 443, so that the electronic device 100 cancels projection of the application interface 420 of Settings, the application interface 430 of Music, or the application interface 440 of Gallery onto the external display device 200 for displaying.

For example, as shown in FIG. 4I-1 and FIG. 4I-2, the electronic device 100 may receive an input operation 444 (for example, tapping) by the user on the projection cancel button 443 displayed in the application interface 440 of Gallery. In response to the input operation 444, as shown in FIG. 4J-1 and FIG. 4J-2, the electronic device 100 may cancel projection of the application interface 440 of Gallery onto the display of the external display device 200 for displaying.

Figures 1, 2, 4J:
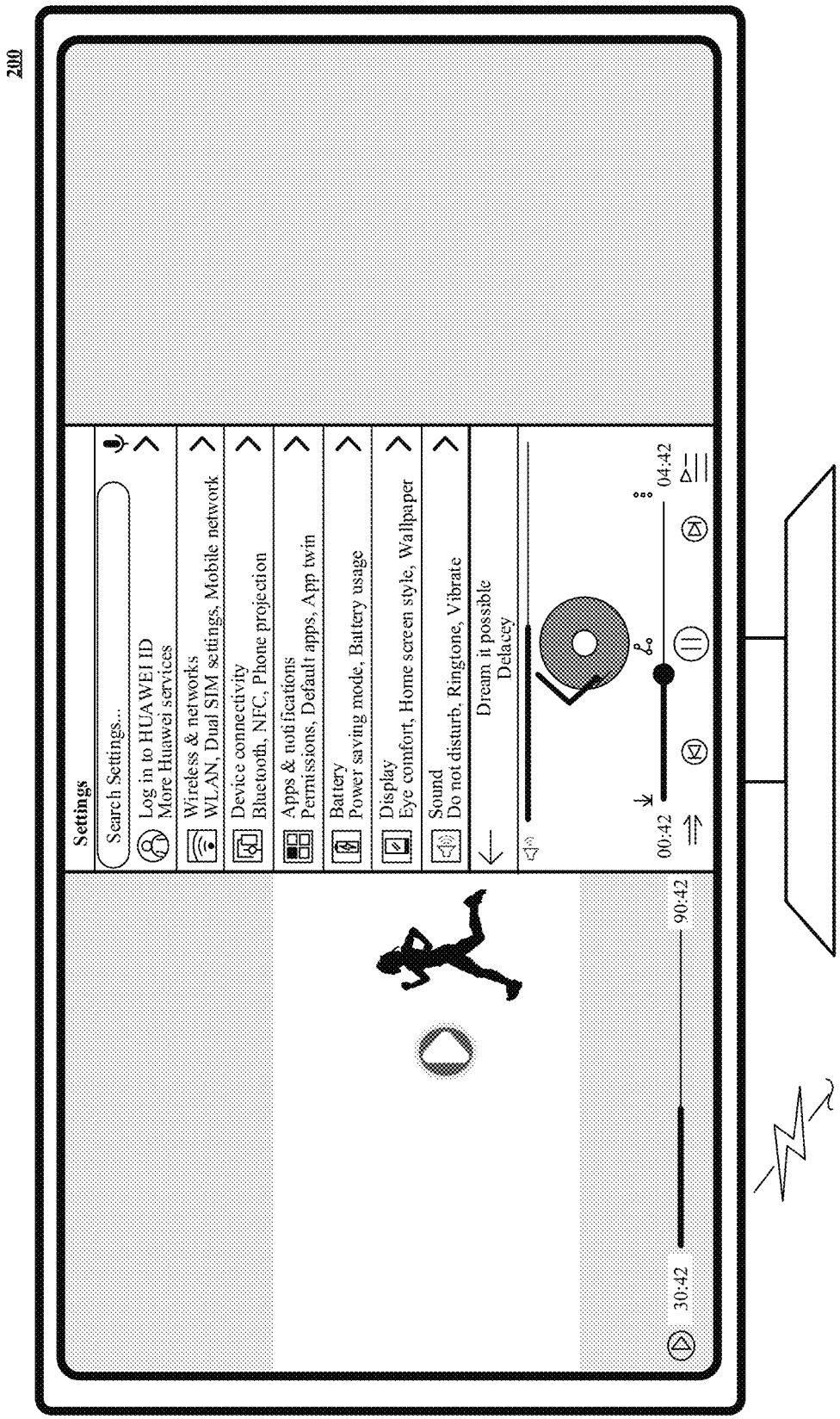
Figures 2, 4J:
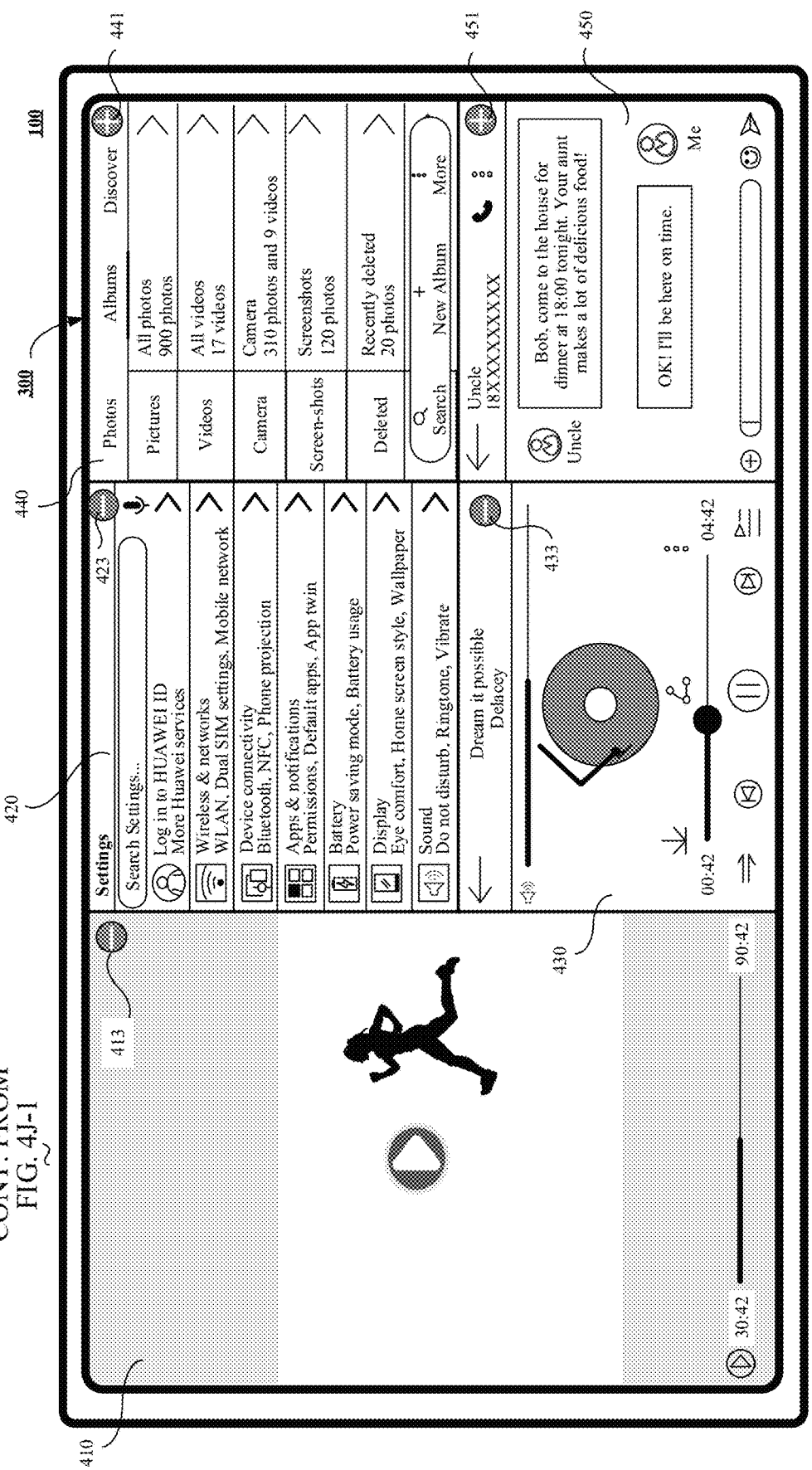

As shown in FIG. 4J-1 and FIG. 4J-2, the application interface 510 of Video, the application interface 520 of Settings, and the application interface 530 of Music are displayed on the display of the external display device 200. The display content in the application interface 530 of Music is the same as the display content in the application interface 430 of Music displayed on the touchscreen 300 of the electronic device 100. The relative positions of the application interface 510 of Video, the application interface 520 of Settings, and the application interface 540 of Music that are displayed on the display of the external display device 200 are the same as the relative positions of the application interface 410 of Video, the application interface 420 of Settings, and the application interface 430 of Music that are displayed on the touchscreen 300. After the electronic device 100 cancels projection of the application interface 440 of Gallery onto the display of the external display device 200 for displaying, the electronic device 100 may replace the projection cancel button 443 displayed in the application interface 440 of Gallery with the projection add button 441.

In a possible implementation, after establishing the connection to the external display device 200, the electronic device 100 may determine whether the external display device 200 has an audio output apparatus. If the external display device 200 has an audio output apparatus, the electronic device 100 may send to-be-played audio data to the external display device 200, and the audio output apparatus of the external display device 200 plays the to-be-played audio data. If the external display device 200 has no audio output apparatus, the electronic device 100 may play the audio data by using an audio output apparatus on the electronic device 100.

For example, as shown in FIG. 4E-1 and FIG. 4E-2, the external display device 200 has an audio output apparatus. After the electronic device 100 establishes the connection to the external display device 200, the electronic device 100 may receive the input operation 412 (for example, tapping) by the user on the projection add button 411 on the touchscreen 300. In response to the input operation 412, the electronic device 100 may project the application interface 410 of Video onto the display of the external display device 200 for displaying, and send, to the external display device 200, audio data that is being played by Video. The external display device 200 may display the application interface 510 of Video on the display, and play the audio data by using the audio output apparatus.

In a possible implementation, when the electronic device 100 projects, onto the display of the external display device 200 for displaying, the one or more application interfaces displayed on the touchscreen 300, a layout of the one or more application interfaces displayed on the display of the external display device 200 is different from a layout of the one or more application interfaces displayed on the touchscreen 300. In other words, before projecting, onto the external display device 200, the one or more application interfaces displayed on the touchscreen 300, the electronic device 100 may change relative positions of the one or more application interfaces displayed on the display of the external display device 200, splice, into one image, the one or more application interfaces obtained after the layout is changed, and send the image to the external display device 200. The external display device 200 displays, on the display, the one or more application interfaces obtained after the layout is changed. In another possible implementation, the electronic device 100 sends, to the external display device 200, image data of the one or more application interfaces displayed on the touchscreen 300. After receiving the image data of the one or more application interfaces, the external display device 200 may allocate a display area to each application interface on the display, and may display the one or more application interfaces in respective display areas. In this way, when the electronic device 100 projects some application interfaces on the touchscreen 300 onto the external display device 200, the external display device 200 may display some application interfaces by using all display areas of the display, to fully utilize the display areas of the display of the external display device 200.

Figures 1, 5A:
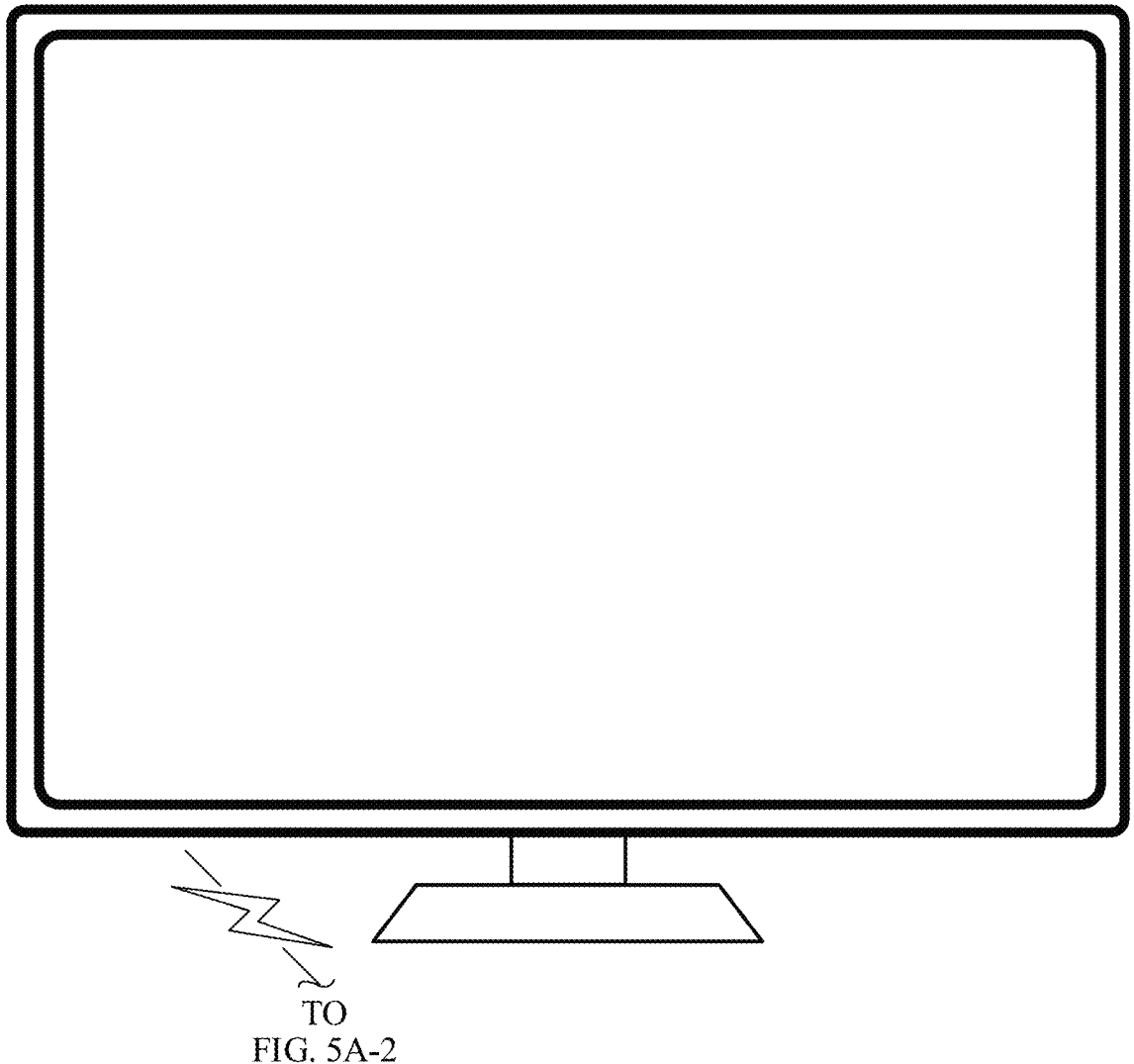
Figures 2, 5A:
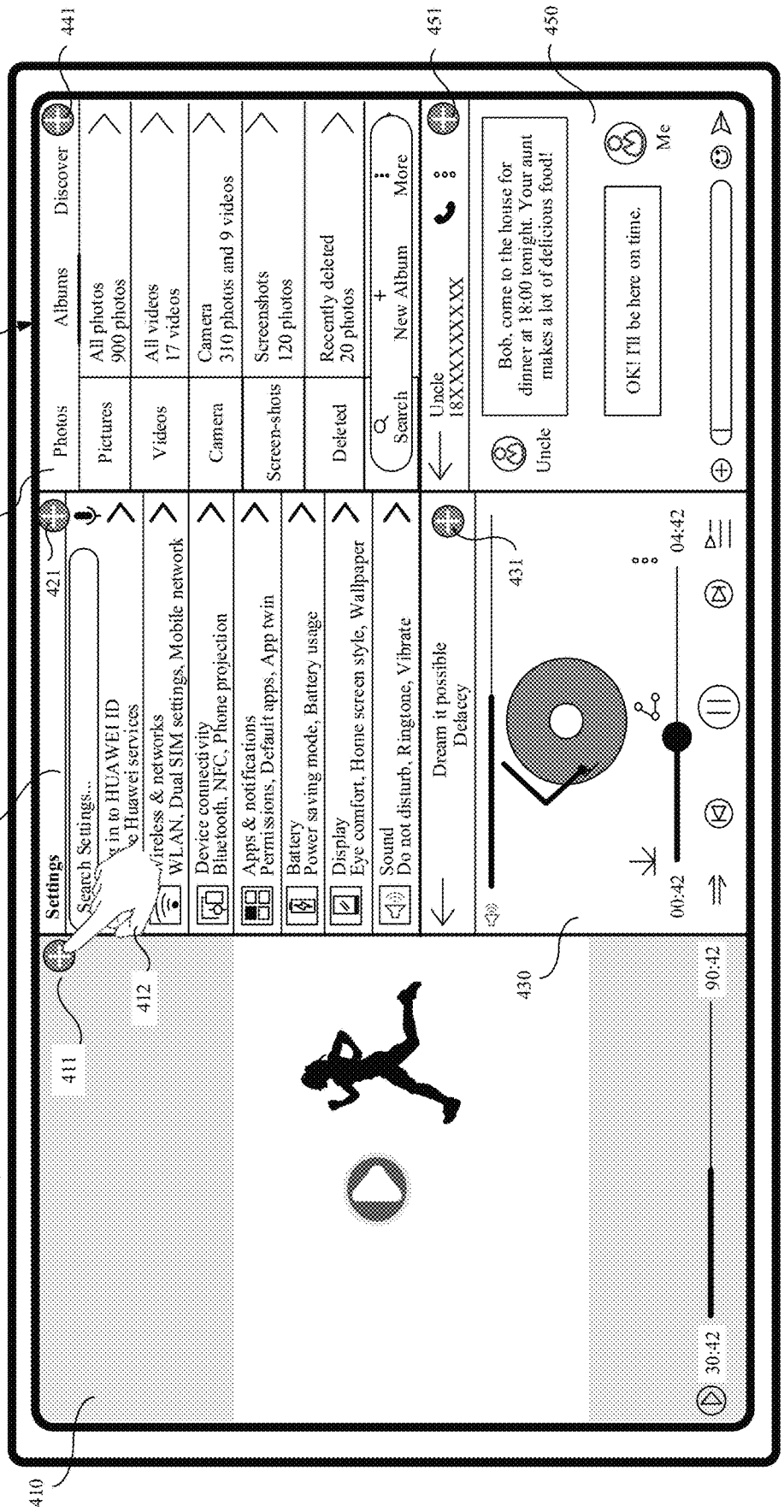
Figures 1, 5B:
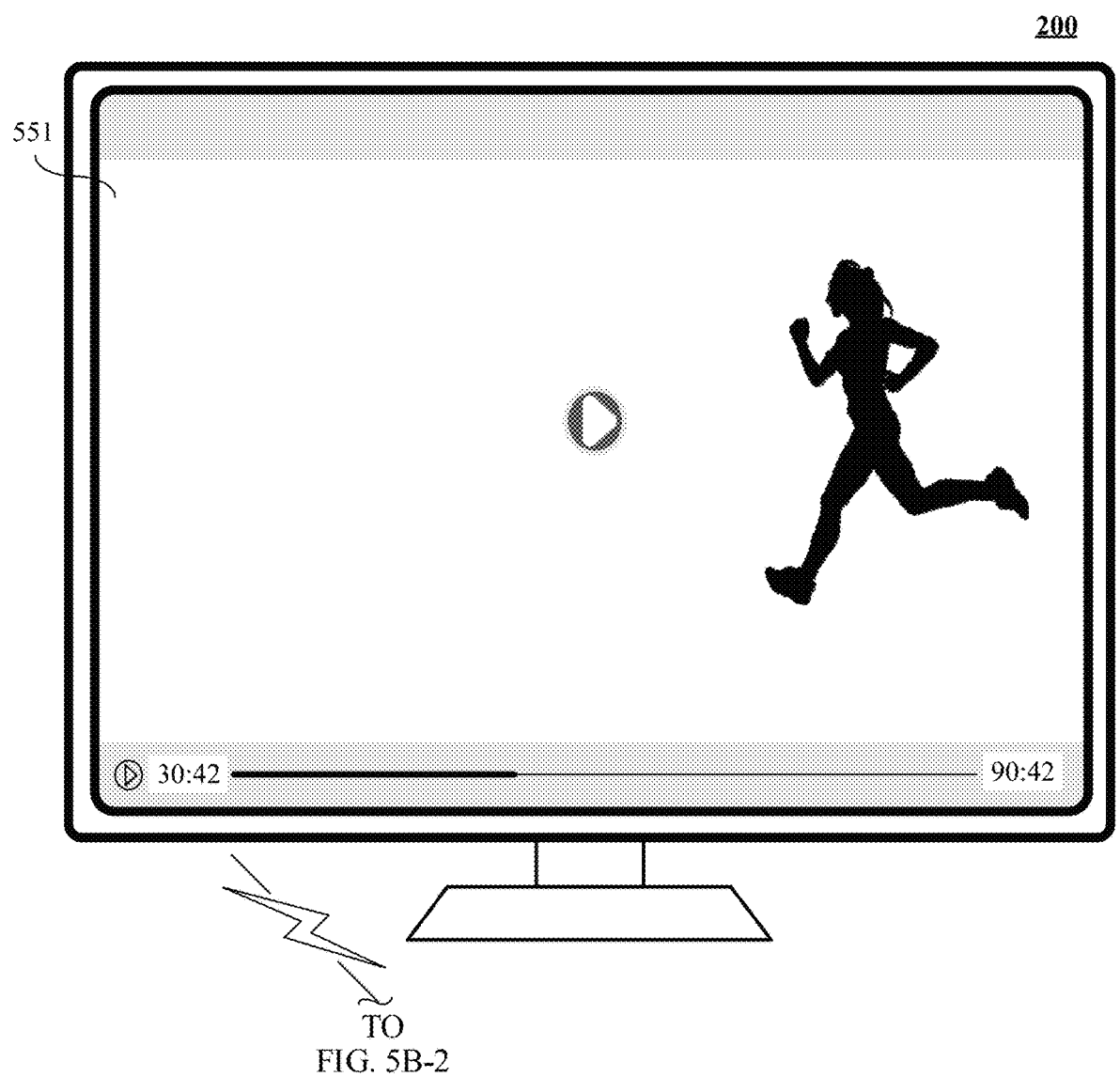
Figures 2, 5B:
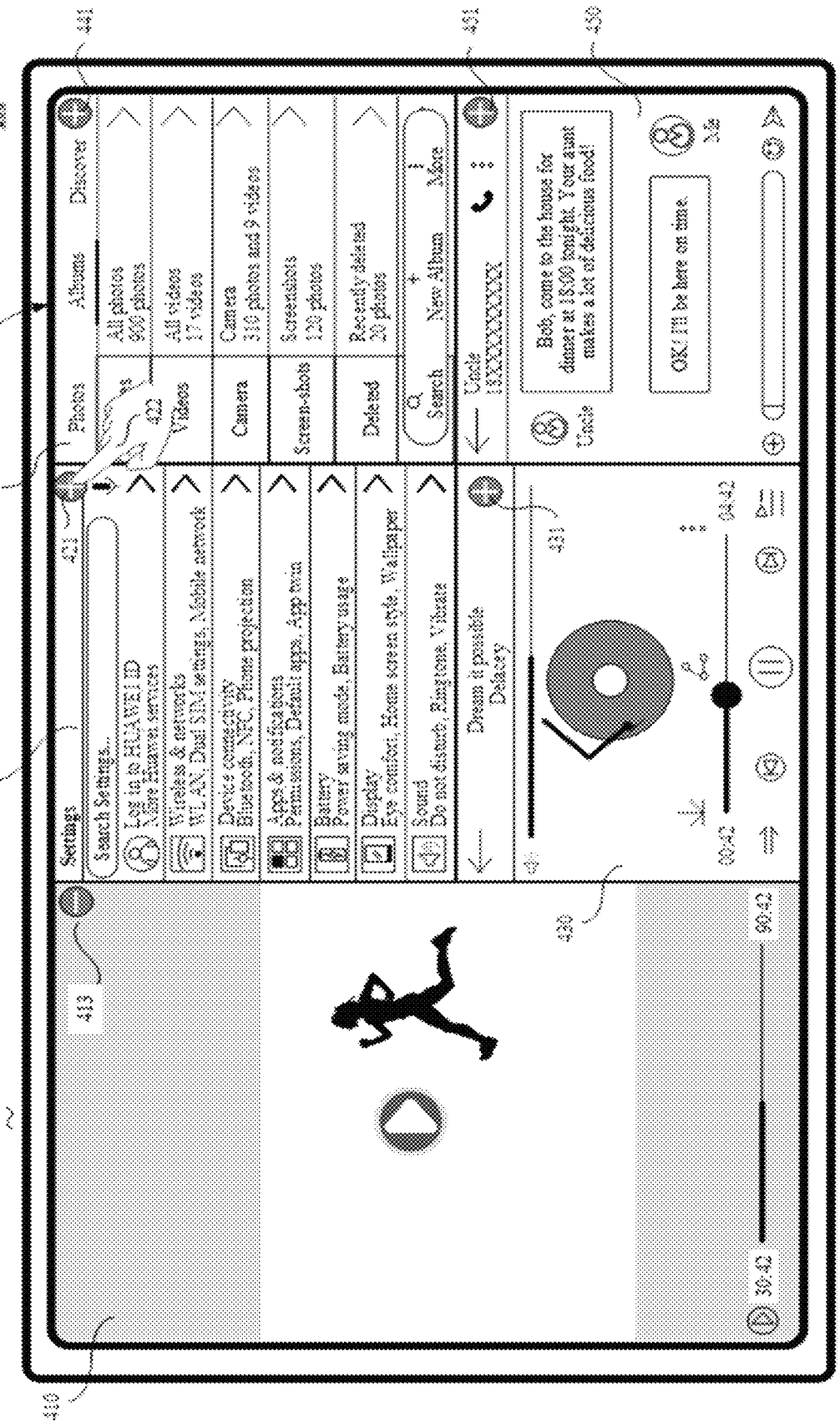

For example, as shown in FIG. 5A-1 and FIG. 5A-2, the electronic device 100 may receive an input operation 412 (for example, tapping) by the user on the projection add button 411 on the touchscreen 300. In response to the input operation 412, as shown in FIG. 5B-1 and FIG. 5B-2, the electronic device 100 may project, onto the display of the external display device 200, the application interface 410 of Video displayed on the touchscreen 300. Because only one application interface (for example, the application interface 410 of Video) is selected for projection, the external display device 100 may display an application interface 551 of Video in full screen on the display. Display content in the application interface 551 of Video is the same as the display content in the application interface 410 of Video displayed on the touchscreen 300, but a proportion of the application interface 551 of Video is different from a proportion of the application interface 410 of Video.

After projecting, onto the display of the external display device 200, the application interface 410 of Video displayed on the touchscreen 300, the electronic device 100 may further receive an input operation 422 (for example, tapping) by the user on the projection add button 421 on the touchscreen 300. In response to the input operation 422, as shown in FIG. 5C-1 and FIG. 5C-2, the electronic device 100 may further project the application interface 420 of Settings onto the display of the external display device 200 for displaying while projecting the application interface 410 of Video onto the display of the external display device 200 for displaying.

Figures 1, 5C:
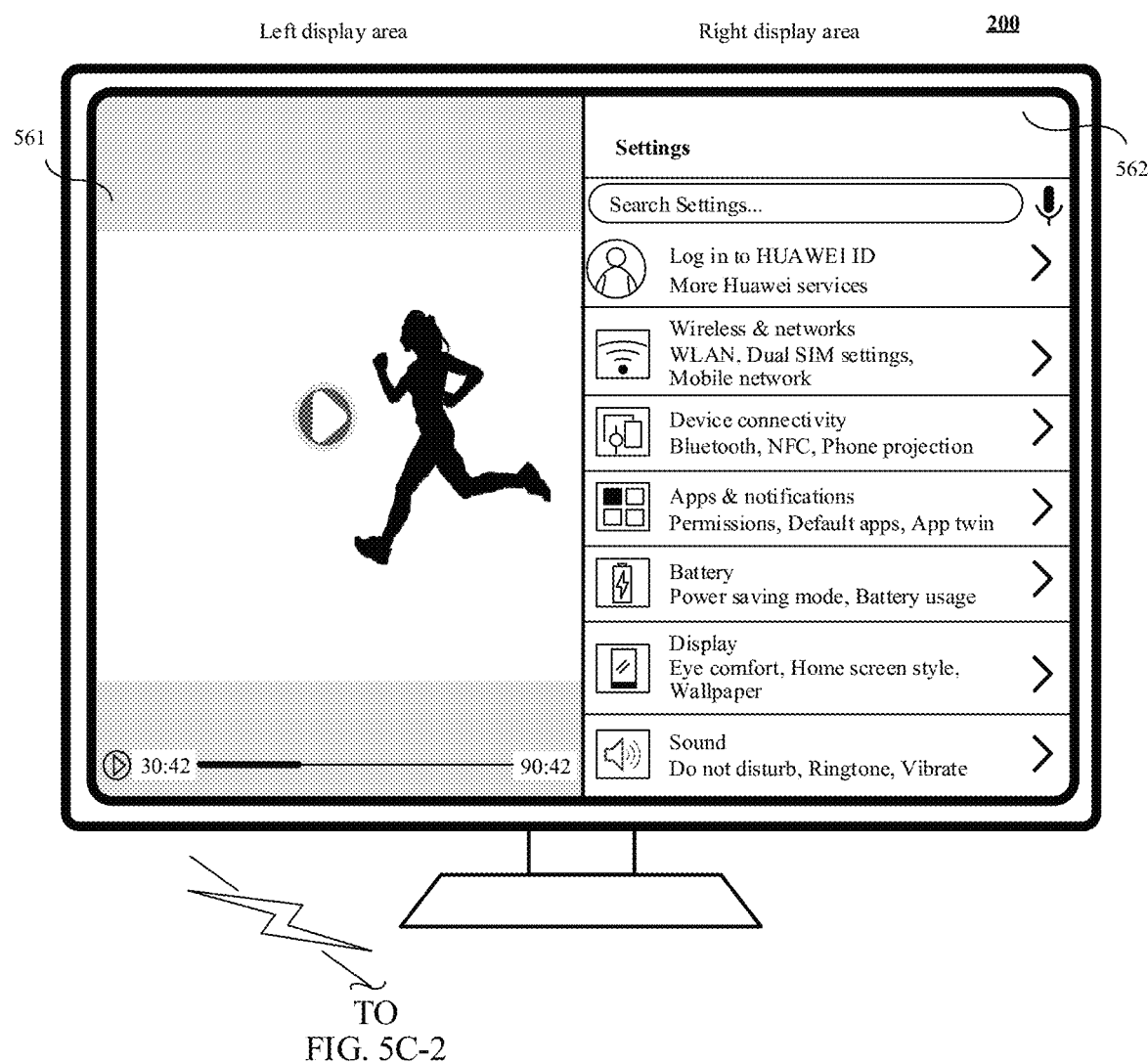

As shown in FIG. 5C-1 and FIG. 5C-2, because the user selects two application interfaces (for example, the application interface 410 of Video and the application interface 420 of Settings) for projection, the external display device 100 may divide a display area of the display into two display areas (for example, a left display area and a right display area), may display an application interface 561 of Video in the left display area, and may display an application interface 562 of Settings in the right display area. Display content in the application interface 561 of Video is the same as the display content in the application interface 410 of Video displayed on the touchscreen 300, but a proportion of the application interface 561 of Video is different from a proportion of the application interface 410 of Video. Display content in the application interface 562 of Settings is the same as the display content in the application interface 420 of Settings displayed on the touchscreen 300, but a proportion of the application interface 562 of Settings is different from a proportion of the application interface 420 of Settings.

After projecting, onto the display of the external display device 200, the application interface 410 of Video and the application interface 420 of Settings that are displayed on the touchscreen 300, the electronic device 100 may further receive an input operation 432 (for example, tapping) by the user on the projection add button 431 on the touchscreen 300. In response to the input operation 432, as shown in FIG. 5D-1 and FIG. 5D-2, the electronic device 100 may further project the application interface 430 of Music onto the display of the external display device 200 for displaying while projecting the application interface 410 of Video and the application interface 420 of Settings onto the display of the external display device 200 for displaying.

Figures 1, 5D:
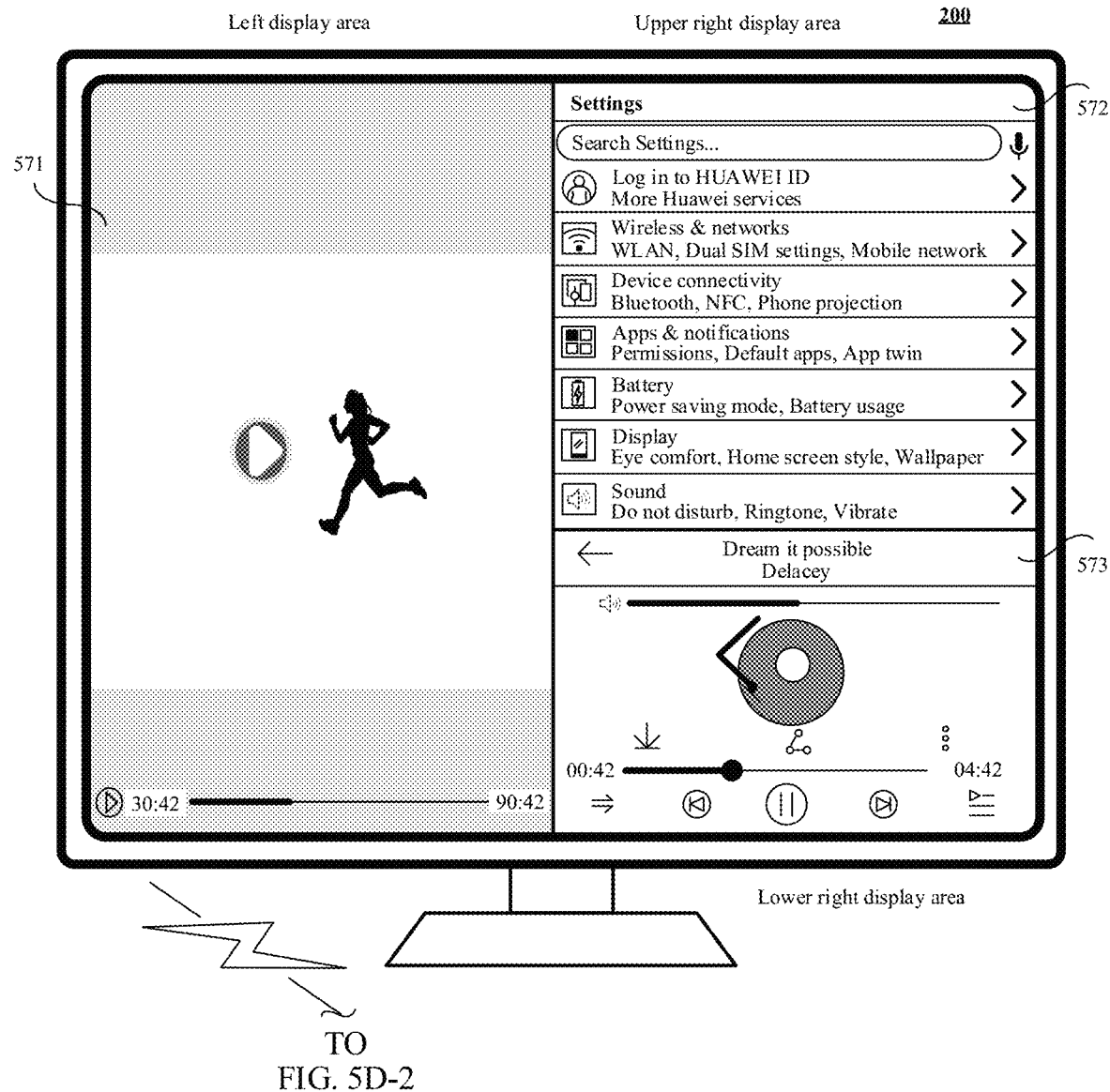

As shown in FIG. 5D-1 and FIG. 5D-2, because the user selects three application interfaces (for example, the application interface 410 of Video, the application interface 420 of Settings, and the application interface 430 of Music) for projection, the external display device 100 may divide the display area of the display into three display areas (for example, a left display area, an upper right display area, and a lower right display area), may display an application interface 571 of Video in the left display area, may display an application interface 572 of Settings in the upper right display area, and may display an application interface 573 of Music in the lower right display area. Display content in the application interface 571 of Video is the same as the display content in the application interface 410 of Video displayed on the touchscreen 300, but a proportion of the application interface 571 of Video is different from a proportion of the application interface 410 of Video. Display content in the application interface 572 of Settings is the same as the display content in the application interface 420 of Settings displayed on the touchscreen 300, but a proportion of the application interface 572 of Settings is different from a proportion of the application interface 430 of Settings. Display content in the application interface 573 of Music is the same as the display content in the application interface 430 of Music displayed on the touchscreen 300, but a proportion of the application interface 573 of Music is different from a proportion of the application interface 430 of Music.

After projecting, onto the display of the external display device 200, the application interface 410 of Video, the application interface 420 of Settings, and the application interface 430 of Music that are displayed on the touchscreen 300, the electronic device 100 may further receive an input operation 442 (for example, tapping) by the user on the projection add button 441 on the touchscreen 300. In response to the input operation 442, as shown in FIG. 5E-1 and FIG. 5E-2, the electronic device 100 may further project the application interface 440 of Gallery onto the display of the external display device 200 for displaying while projecting the application interface 410 of Video, the application interface 420 of Settings, and the application interface 430 of Music onto the display of the external display device 200 for displaying.

Figures 1, 5E:
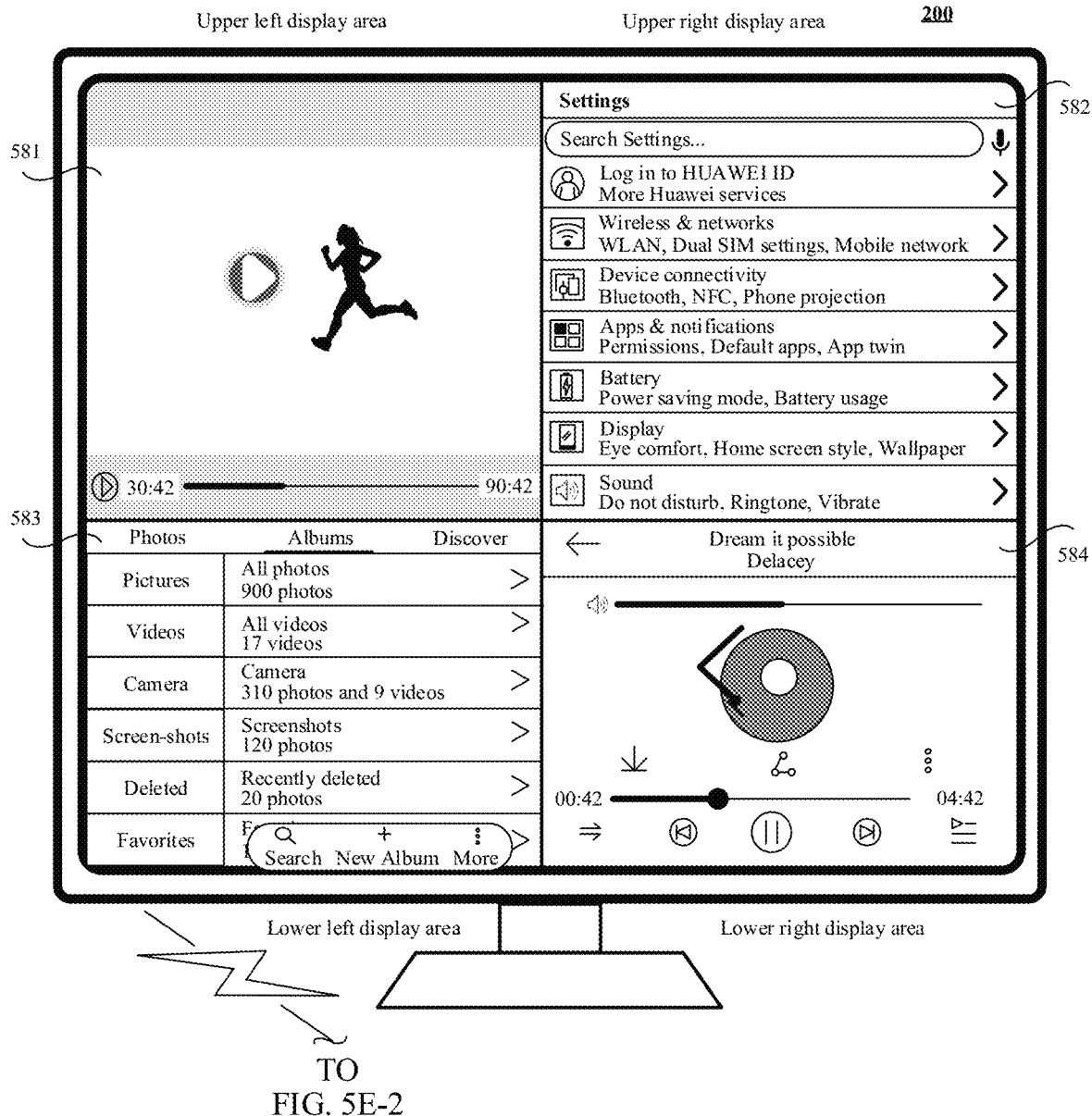

As shown in FIG. 5E-1 and FIG. 5E-2, because the user selects four application interfaces (for example, the application interface 410 of Video, the application interface 420 of Settings, the application interface 430 of Music, and the application interface 440 of Gallery) for projection, the external display device 100 may divide the display area of the display into four display areas (for example, an upper left display area, a lower left display area, an upper right display area, and a lower right display area), may display an application interface 581 of Video in the upper left display area, may display an application interface 582 of Settings in the upper right display area, may display an application interface 583 of Music in the lower right display area, and may display an application interface 584 of Gallery in the lower left display area. Display content in the application interface 581 of Video is the same as the display content in the application interface 410 of Video displayed on the touchscreen 300, but a proportion of the application interface 581 of Video is different from a proportion of the application interface 410 of Video. Display content in the application interface 582 of Settings is the same as the display content in the application interface 420 of Settings displayed on the touchscreen 300, but a proportion of the application interface 582 of Settings is different from a proportion of the application interface 430 of Settings. Display content in the application interface 583 of Music is the same as the display content in the application interface 430 of Music displayed on the touchscreen 300, but a proportion of the application interface 583 of Music is different from a proportion of the application interface 430 of Music. Display content in the application interface 584 of Gallery is the same as the display content in the application interface 440 of Gallery displayed on the touchscreen 300, but a proportion of the application interface 584 of Gallery is different from a proportion of the application interface 440 of Gallery.

After projecting, onto the display of the external display device 200, the application interface 410 of Video, the application interface 420 of Settings, the application interface 430 of Music, and the application interface 440 of Gallery that are displayed on the touchscreen 300, the electronic device 100 may further receive an input operation 452 (for example, tapping) by the user on the projection add button 451 on the touchscreen 300. In response to the input operation 452, as shown in FIG. 5F-1 and FIG. 5F-2, the electronic device 100 may further project the application interface 450 of Messages onto the display of the external display device 200 for displaying while projecting the application interface 410 of Video, the application interface 420 of Settings, the application interface 430 of Music, and the application interface 440 of Gallery onto the display of the external display device 200 for displaying.

Figures 1, 5F:
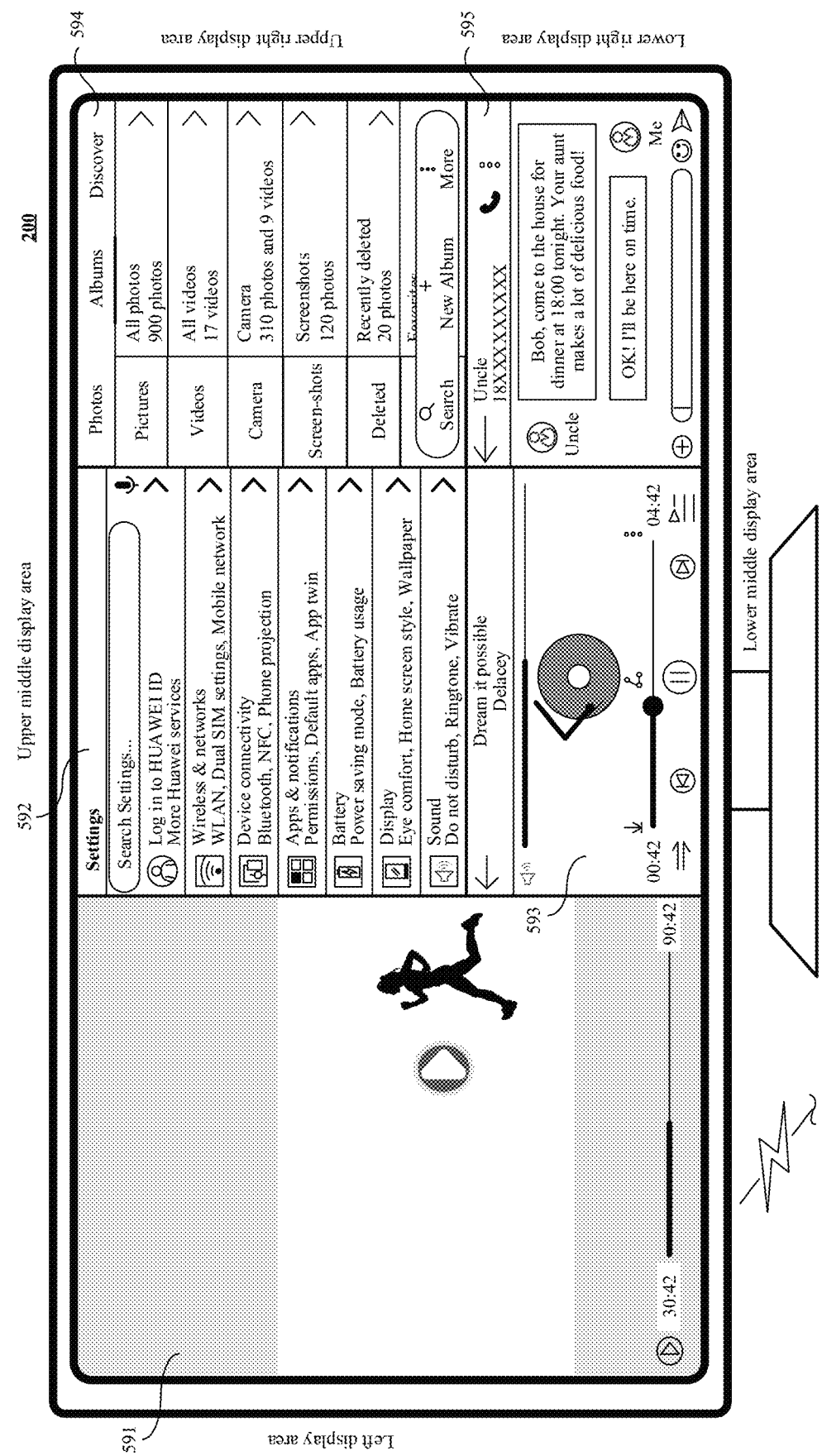
Figures 2, 5F:
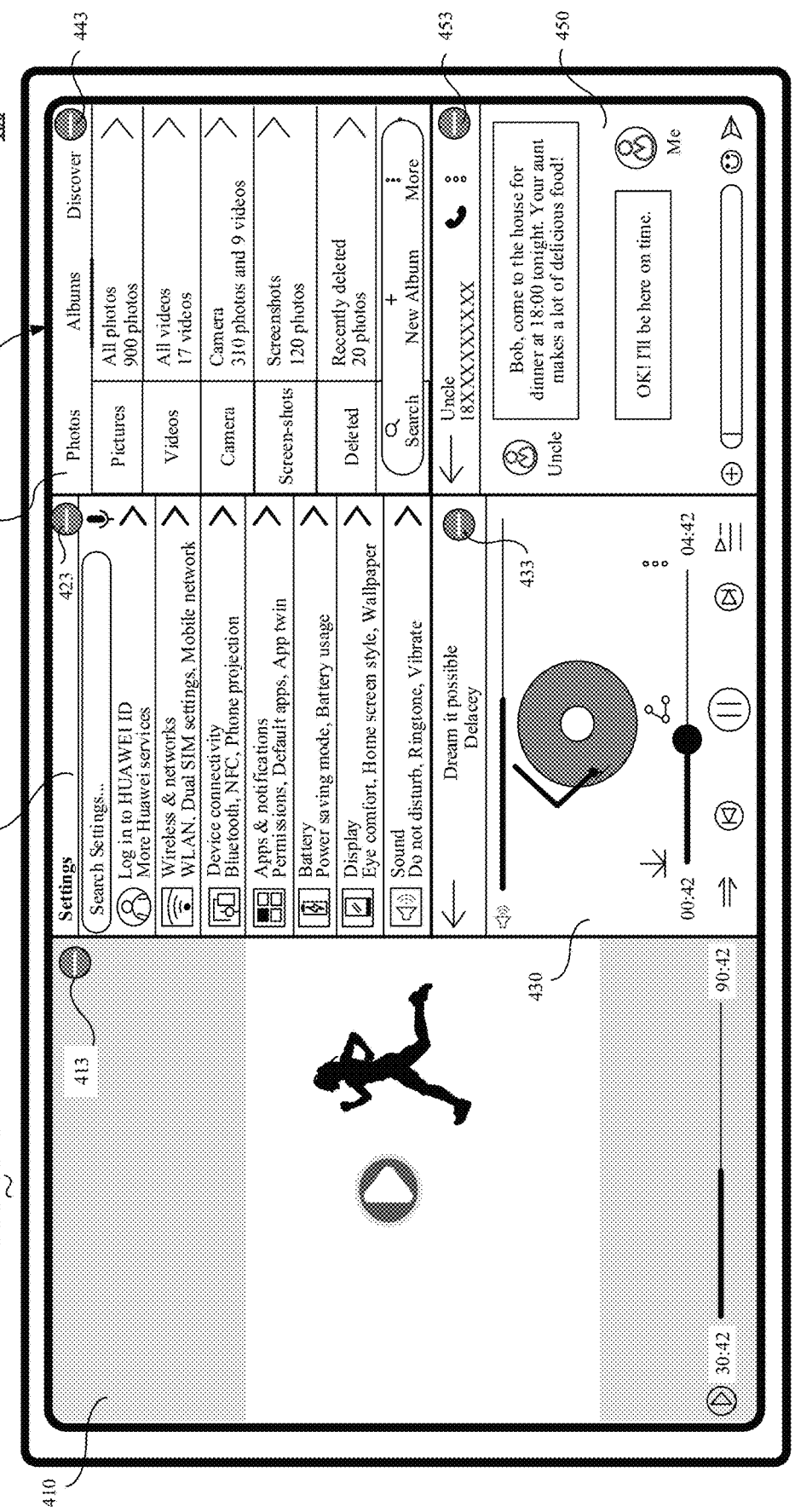

As shown in FIG. 5F-1 and FIG. 5F-2, because the user selects all the application interfaces (for example, the application interface 410 of Video, the application interface 420 of Settings, the application interface 430 of Music, the application interface 440 of Gallery, and the application interface 450 of Messages) on the touchscreen 300 of the electronic device 100 for projection, the external display device 100 may divide the display area of the display into five display areas (for example, a left display area, an upper middle display area, a lower middle display area, an upper right display area, and a lower right display area). The electronic device 100 may display an application interface 591 of Video in the left display area, may display an application interface 592 of Settings in the upper middle display area, may display an application interface 593 of Music in the lower middle display area, may display an application interface 594 of Gallery in an upper left display area, and may display an application interface 595 of Messages in a lower left display area. Display content in the application interface 591 of Video is the same as the display content in the application interface 410 of Video displayed on the touchscreen 300, but a proportion of the application interface 591 of Video is different from a proportion of the application interface 410 of Video. Display content in the application interface 592 of Settings is the same as the display content in the application interface 420 of Settings displayed on the touchscreen 300, but a proportion of the application interface 592 of Settings is different from a proportion of the application interface 430 of Settings. Display content in the application interface 593 of Music is the same as the display content in the application interface 430 of Music displayed on the touchscreen 300, but a proportion of the application interface 593 of Music is different from a proportion of the application interface 430 of Music. Display content in the application interface 594 of Gallery is the same as the display content in the application interface 440 of Gallery displayed on the touchscreen 300, but a proportion of the application interface 594 of Gallery is different from a proportion of the application interface 440 of Gallery. Display content in the application interface 595 of Gallery is the same as the display content in the application interface 450 of Messages displayed on the touchscreen 300, but a proportion of the application interface 595 of Gallery is different from a proportion of the application interface 450 of Messages.

In some application scenarios, a user needs to simultaneously process a plurality of application tasks on the electronic device 100. To meet such requirement of the user, the electronic device 100 may display a plurality of application interfaces (for example, an application interface of Video, an application interface of Settings, an application interface of Music, an application interface of Gallery, and an application interface of Messages) in different areas on the touchscreen 300. When the plurality of application interfaces are displayed in different areas on the touchscreen 300 of the electronic device 100, when the electronic device 100 receives an input operation of the user and enables a screen projection function, the electronic device 100 may establish a connection (for example, a wireless connection such as Wi-Fi or a wired connection) to the external display device 200, and display an application selection window on the touchscreen 300. The application selection window includes a plurality of application options, and the plurality of application options may be options of an icon type (for example, an application icon of Video, an application icon of Settings, an application icon of Music, an application icon of Gallery, an application icon of Messages) or may be options of a text type. This is not limited herein. Each of the plurality of application interfaces displayed in different areas on the touchscreen 300 corresponds to an application option in the application selection window. The electronic device 100 may receive a selection operation that is performed by the user on the plurality of application options in the application selection window. In response to the selection operation, the electronic device 100 may project, onto the display of the external display device 200, one or more application interfaces corresponding to one or more application options selected by the user. In this way, the electronic device 100 can select, based on the input operation of the user, the one or more application interfaces from the plurality of application interfaces split-screen displayed on the touchscreen 300, and project the one or more application interfaces onto the display of the external display device 200, to ensure that an application interface involving user privacy is projected only after the user agrees and confirms. This ensures user privacy.

For example, the electronic device 100 receives the input operation (for example, the input operation 472 on the projection device option 471 in FIG. 4D-1 and FIG. 4D-2) by the user. In response to the input operation of the user, the electronic device 100 establishes a connection to the external display device 200, and displays an application selection window 610 shown in FIG. 6A-1 and FIG. 6A-2 on the touchscreen 300.

Figures 1, 2, 6A:
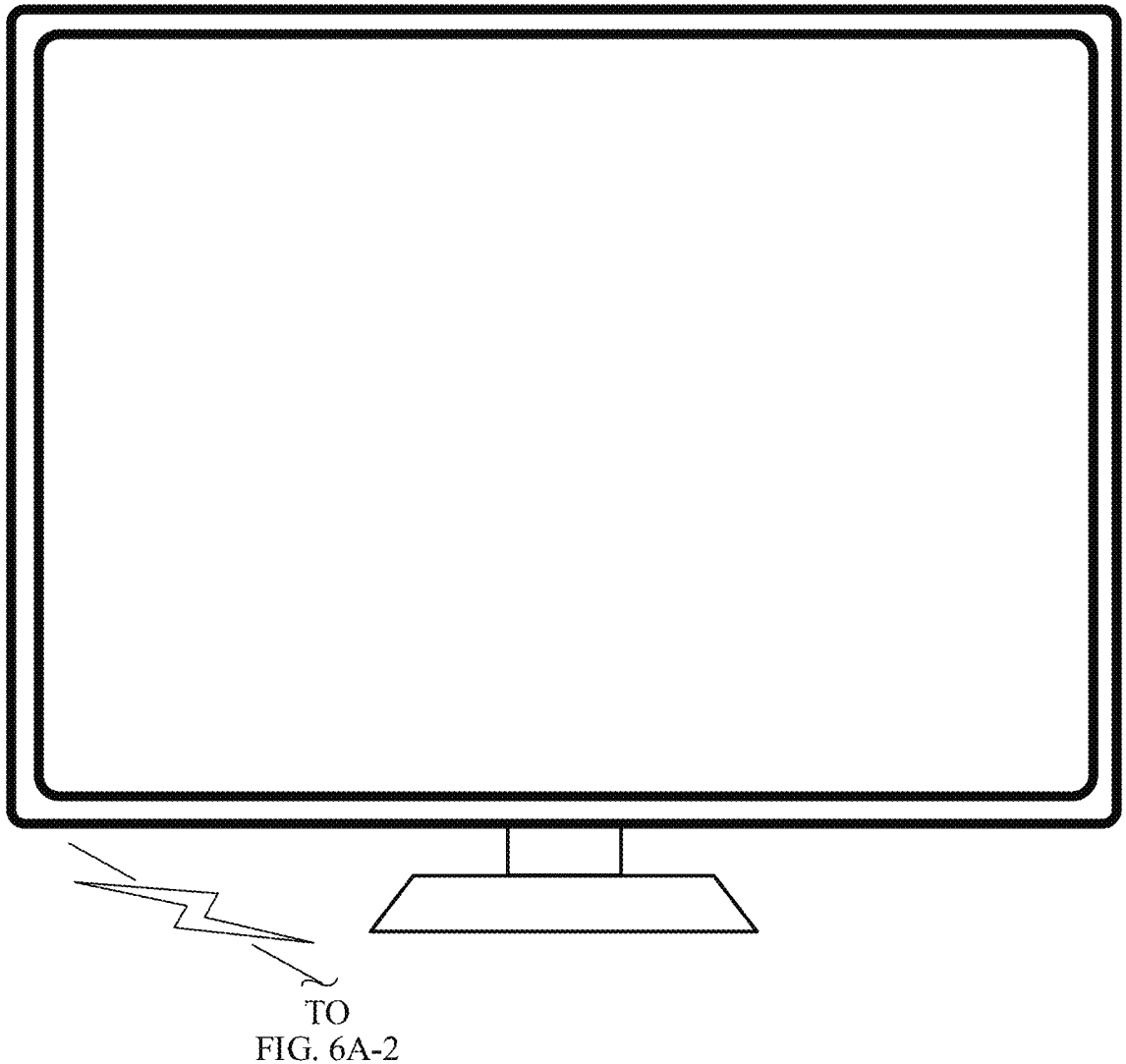

As shown in FIG. 6A-1 and FIG. 6A-2, the application selection window 610 includes a plurality of application options, an OK button 616, a cancel button 617, and a window close button 618. For example, the application selection window 610 includes an application option 611 of Video, an application option 612 of Settings, an application option 613 of Music, an application option 614 of Gallery, and an application option 615 of Messages. The application option 611 of Video corresponds to an application interface 410 of Video displayed on the touchscreen 300, the application option 612 of Settings corresponds to an application interface 420 of Settings displayed on the touchscreen 300, the application option 613 of Music corresponds to an application interface 430 of Music displayed on the touchscreen 300, the application option 614 of Gallery corresponds to an application interface 440 of Gallery displayed on the touchscreen 300, and the application option 615 of Messages corresponds to an application interface 450 of Messages displayed on the touchscreen 300. The OK button 616 may be used to receive an input operation (for example, tapping) by the user. In response to the input operation, the electronic device 100 may project an application interface selected by the user onto the display of the external display device 200. The cancel button 617 may be used to receive an input operation (for example, tapping) by the user. In response to the input operation, the electronic device 100 may cancel projection of an application interface selected by the user onto the display of the external display device 200 for displaying. The window close button 618 may be used to receive an input operation (for example, tapping) by the user. In response to the input operation, the electronic device 100 may close the application selection window 610.

Each application option has a marker, and the marker may be used to prompt the user whether the application option is selected. When the marker is in a disabled state, the application option is not selected, and when the marker is in an enabled state, the application option is selected. For example, as shown in FIG. 6A-1 and FIG. 6A-2, there is a marker 621 on the application option 611 of Video, a marker 622 on the application option 612 of Settings, a marker 623 on the application option 613 of Music, a marker 624 on the application option 614 of Gallery, and a marker 625 on the application option 615 of Messages. None of the application option 611 of Video, the application option 612 of Settings, the application option 613 of Music, the application option 614 of Gallery, and the application option 615 of Messages is selected. Therefore, the marker 621, the marker 622, the marker 623, the marker 624, and the marker 625 are all in a disabled state.

Figures 1, 2, 6B:
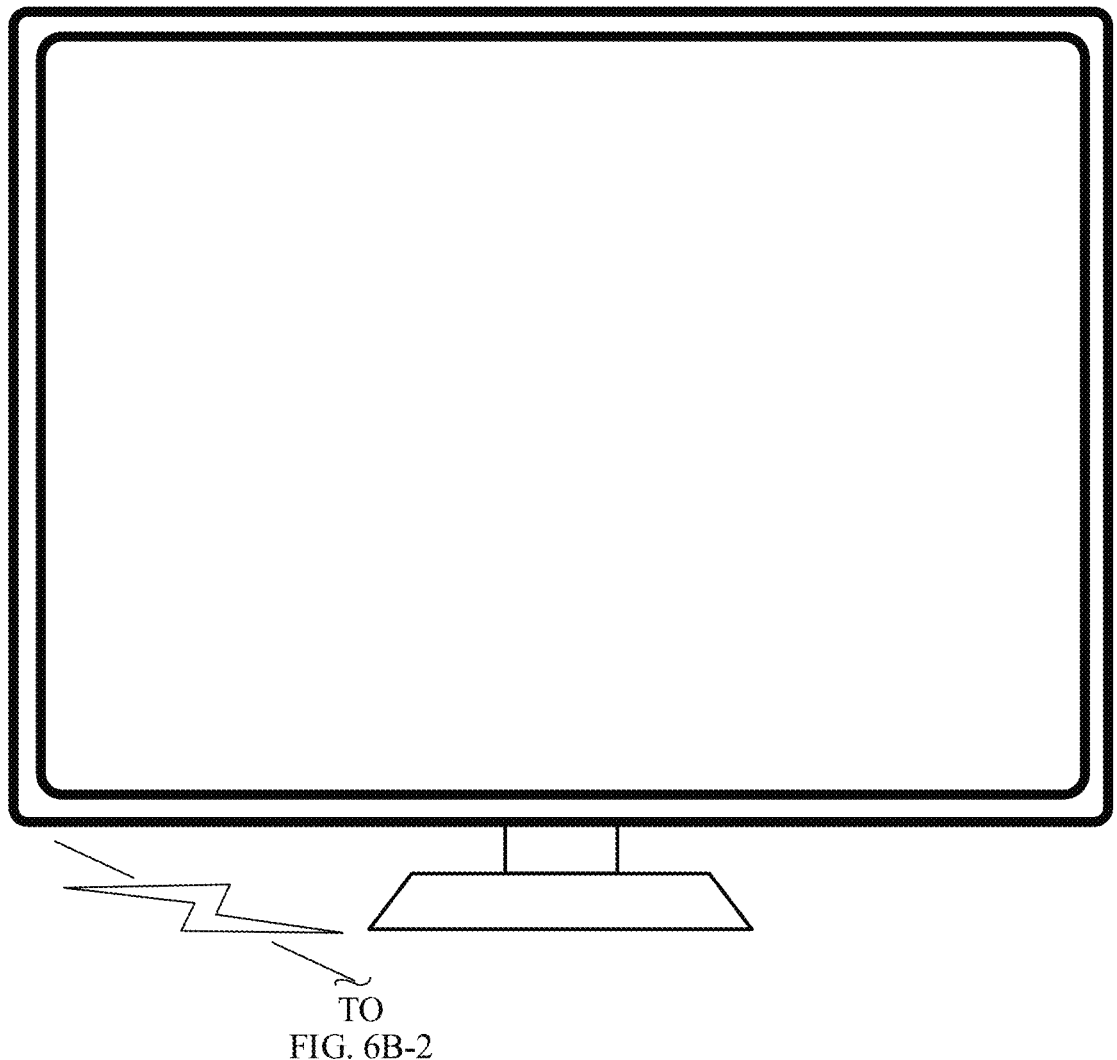
Figures 2, 6B:
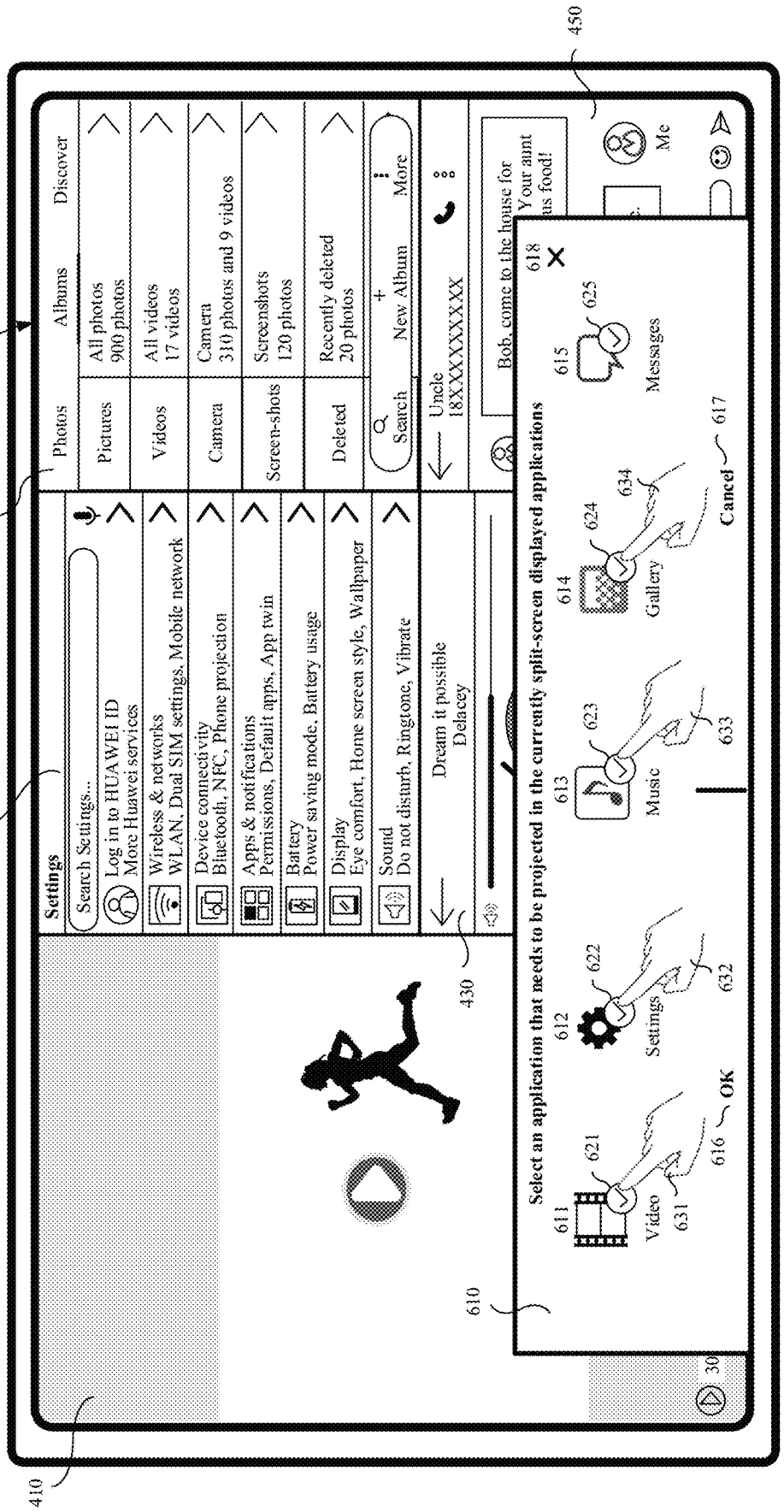
Figures 1, 6C:
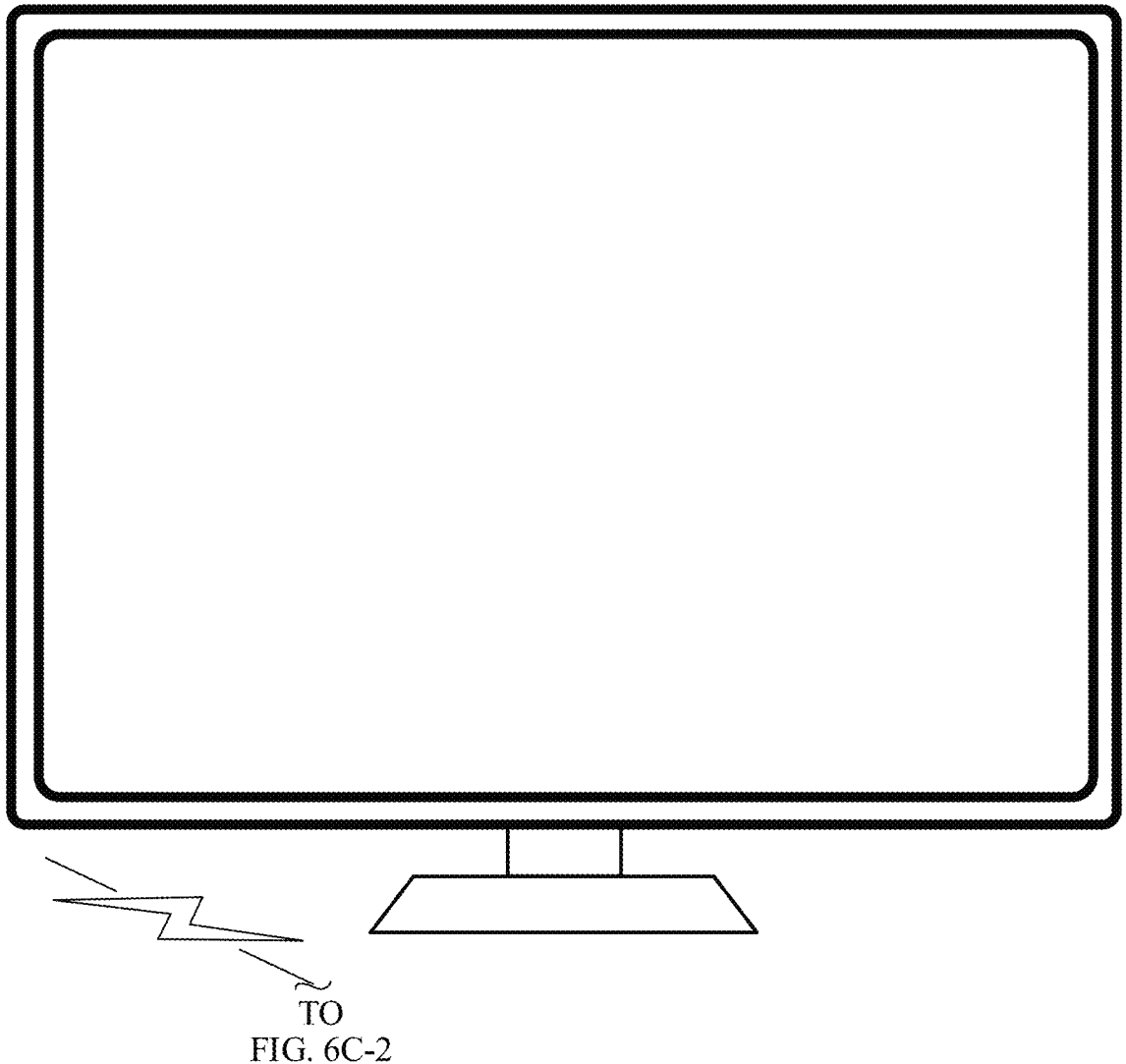

As shown in FIG. 6B-1 and FIG. 6B-2, the electronic device 100 may receive a selection operation 631 by the user on the application option 611 of Video, and in response to the input operation 631, the electronic device 100 may switch the marker 621 on the application option 611 of Video to an enabled state shown in FIG. 6C-1 and FIG. 6C-2. The electronic device 100 may receive a selection operation 632 by the user on the application icon 612 of Settings, and in response to the input operation 632, the electronic device 100 may switch the marker 622 on the application option 612 of Settings to an enabled state shown in FIG. 6C-1 and FIG. 6C-2. The electronic device 100 may receive a selection operation 633 by the user on the application option 613 of Music, and in response to the input operation 633, the electronic device 100 may switch the marker 623 on the application option 613 of Music to an enabled state shown in FIG. 6C-1 and FIG. 6C-2. The electronic device 100 may receive a selection operation 634 by the user on the application option 614 of Gallery, and in response to the input operation 634, the electronic device 100 may switch the marker 624 on the application option 614 of Gallery to an enabled state shown in FIG. 6C-1 and FIG. 6C-2.

As shown in FIG. 6C-1 and FIG. 6C-2, the electronic device 100 may receive an input operation 636 (for example, tapping) by the user on the OK button 616. In response to the input operation 636, the electronic device 100 may project application interfaces corresponding to application options selected by the user onto the display of the external display device 200. For example, as shown in FIG. 6C-1 and FIG. 6C-2, the application options selected by the user include the application option 611 of Video, the application option 612 of Settings, the application option 613 of Music, and the application option 614 of Gallery. Therefore, in response to the input operation 636 on the OK button 616, the electronic device 100 may project the application interface 410 of Video, the application interface 420 of Settings, the application interface 430 of Music, and the application interface 440 of Gallery onto the display of the external display device 200 for displaying.

Figures 1, 2, 6D:
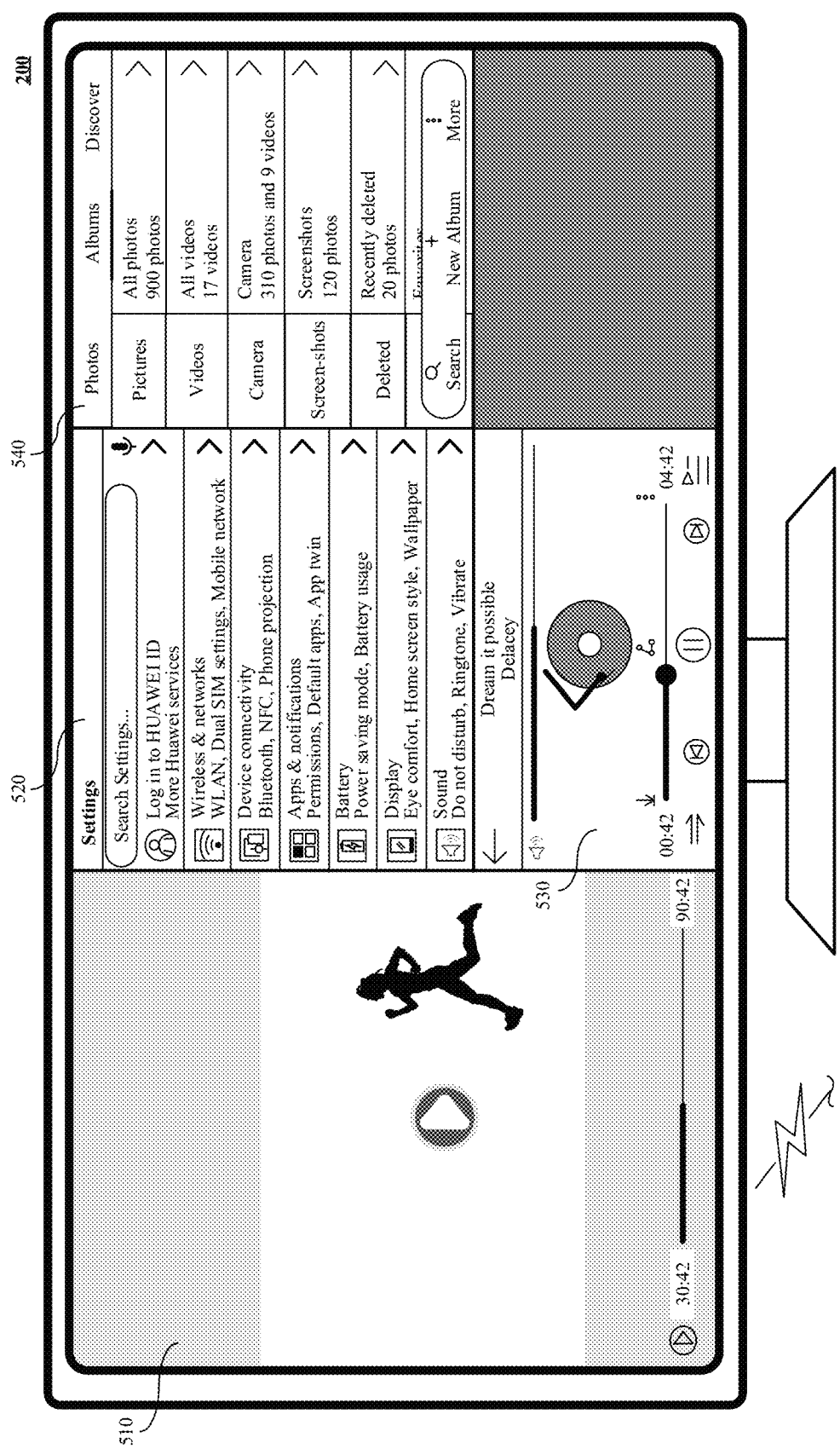

As shown in FIG. 6D-1 and FIG. 6D-2, an application interface 510 of Video, an application interface 520 of Settings, an application interface 530 of Music, and an application interface 540 of Gallery are displayed on the display of the external display device 200. Display content in the application interface 510 of Video is the same as display content in the application interface 410 of Video displayed on the touchscreen 300 of the electronic device 100. Display content in the application interface 520 of Settings is the same as display content in the application interface 420 of Settings displayed on the touchscreen 300 of the electronic device 100. Display content in the application interface 530 of Music is the same as display content in the application interface 430 of Music displayed on the touchscreen 300 of the electronic device 100. Display content in the application interface 540 of Gallery is the same as display content in the application interface 440 of Video displayed on the touchscreen 300 of the electronic device 100. Relative positions of the application interface 510 of Video, the application interface 520 of Settings, the application interface 530 of Music, and the application interface 540 of Gallery that are displayed on the display of the external display device 200 are the same as relative positions of the application interface 410 of Video, the application interface 420 of Settings, the application interface 430 of Music, and the application interface 440 of Gallery that are displayed on the touchscreen 300.

In a possible implementation, a layout of the one or more application interfaces displayed on the display of the external display device 200 is different from a layout of the one or more application interfaces displayed on the touchscreen 300. For details, refer to the embodiments shown in FIG. 5B-1 and FIG. 5B-2 to FIG. 5F-1 and FIG. 5F-2. Details are not described herein again.

As shown in FIG. 6D-1 and FIG. 6D-2, the electronic device 100 may receive an input operation 638 (for example, tapping) by the user on the window close button 618 in the application selection window 610, and in response to the input operation 638, the electronic device 100 may close the application selection window 610, and display a shortcut button 641 on the touchscreen 300. The shortcut button 641 may be in an upper left corner of the touchscreen 300, or may be in another position on the touchscreen 300. This is not limited herein.

Figures 2, 6E:
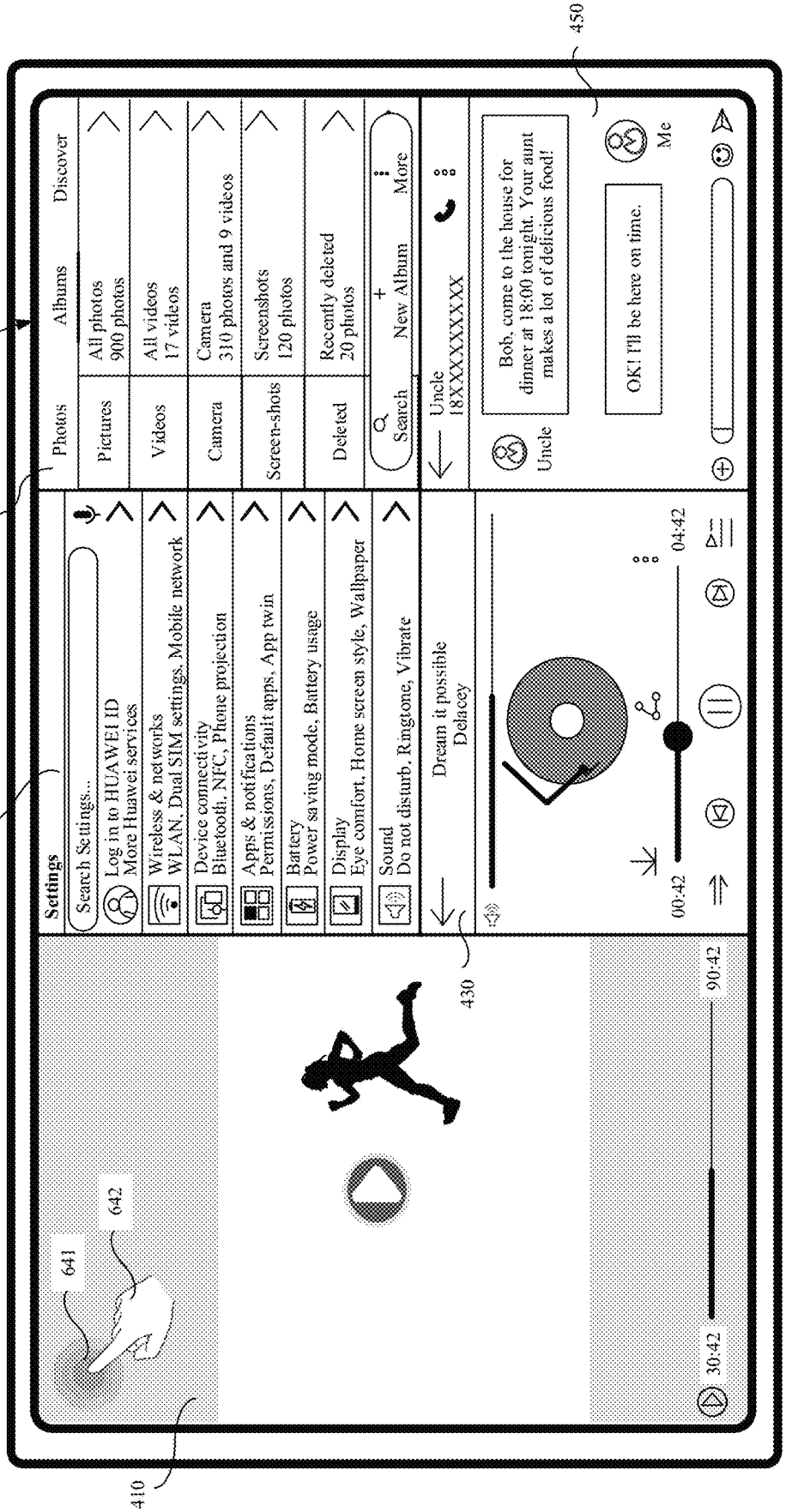
Figures 1, 2, 6F:
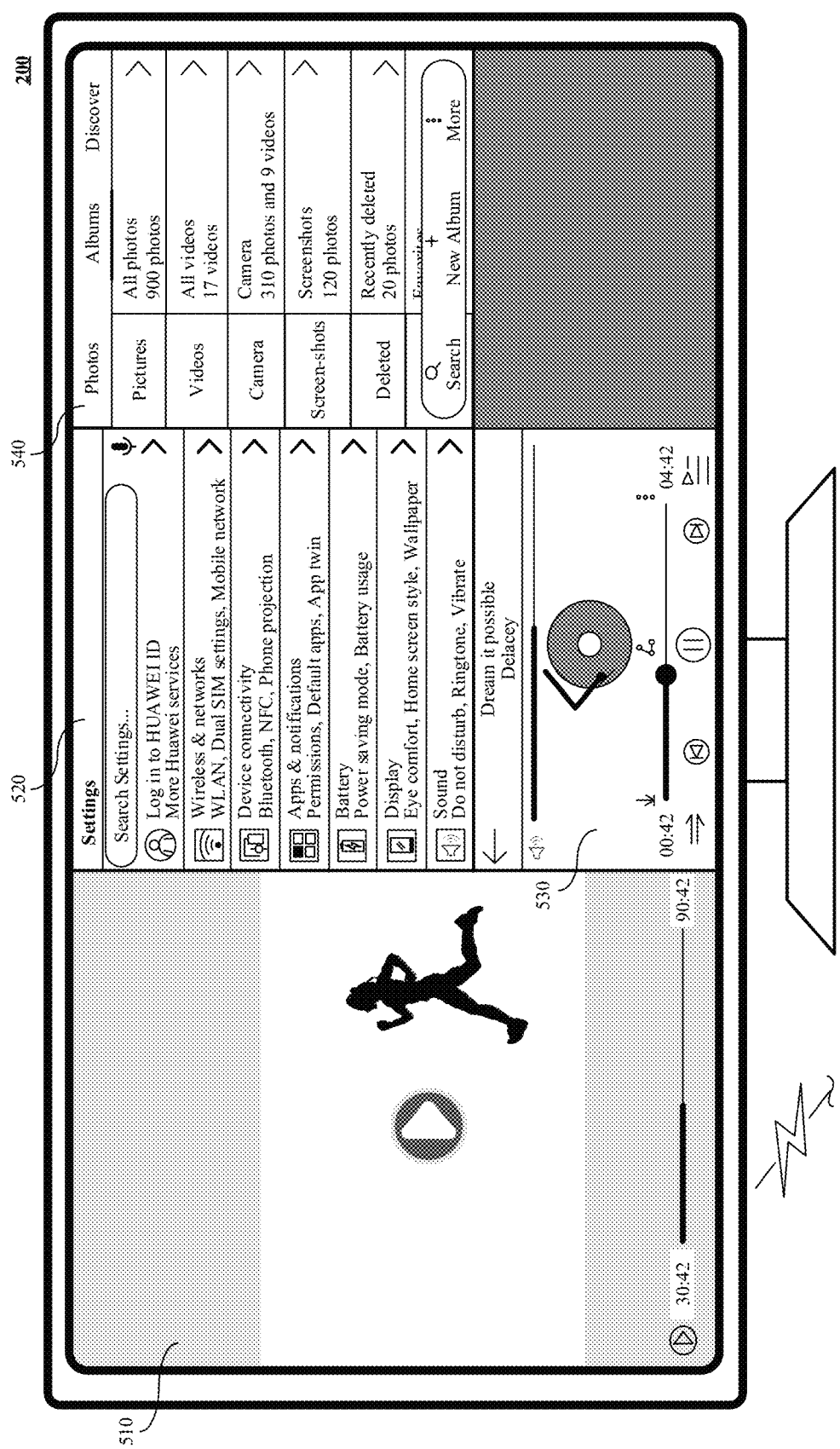

As shown in FIG. 6E-1 and FIG. 6E-2, the electronic device 100 may receive an input operation 642 (for example, tapping) by the user on the shortcut button 641, and in response to the input operation 642, as shown in FIG. 6F-1 and FIG. 6F-2, the electronic device 100 may display the application selection window 610 on the touchscreen 300.

In a possible implementation, after the electronic device 100 projects, onto the display of the external display device 200 for displaying, the one or more application interfaces on the touchscreen 300, the electronic device 100 may receive an input operation of the user, to cancel projection of one or more application interfaces onto the display of the external display device 200 for displaying.

As shown in FIG. 6F-1 and FIG. 6F-2, the application interface 410 of Video, the application interface 420 of Settings, the application interface 430 of Music, and the application interface 440 of Gallery are selected by the user and are projected onto the display of the external display device 200 for displaying. Therefore, the marker 621 on the application option 611 of Video, the marker 622 on the application option 612 of Settings, the marker 623 on the application option 613 of Music, and the marker 624 on the application option 614 of Gallery are all in an enabled state. The electronic device 100 may receive an input operation 644 (for example, tapping) by the user on the application option 614 of Gallery, and in response to the input operation 644, the electronic device 100 may switch the marker 624 on the application option 614 of Gallery from the enabled state to a disabled state.

Figures 1, 2, 6G:
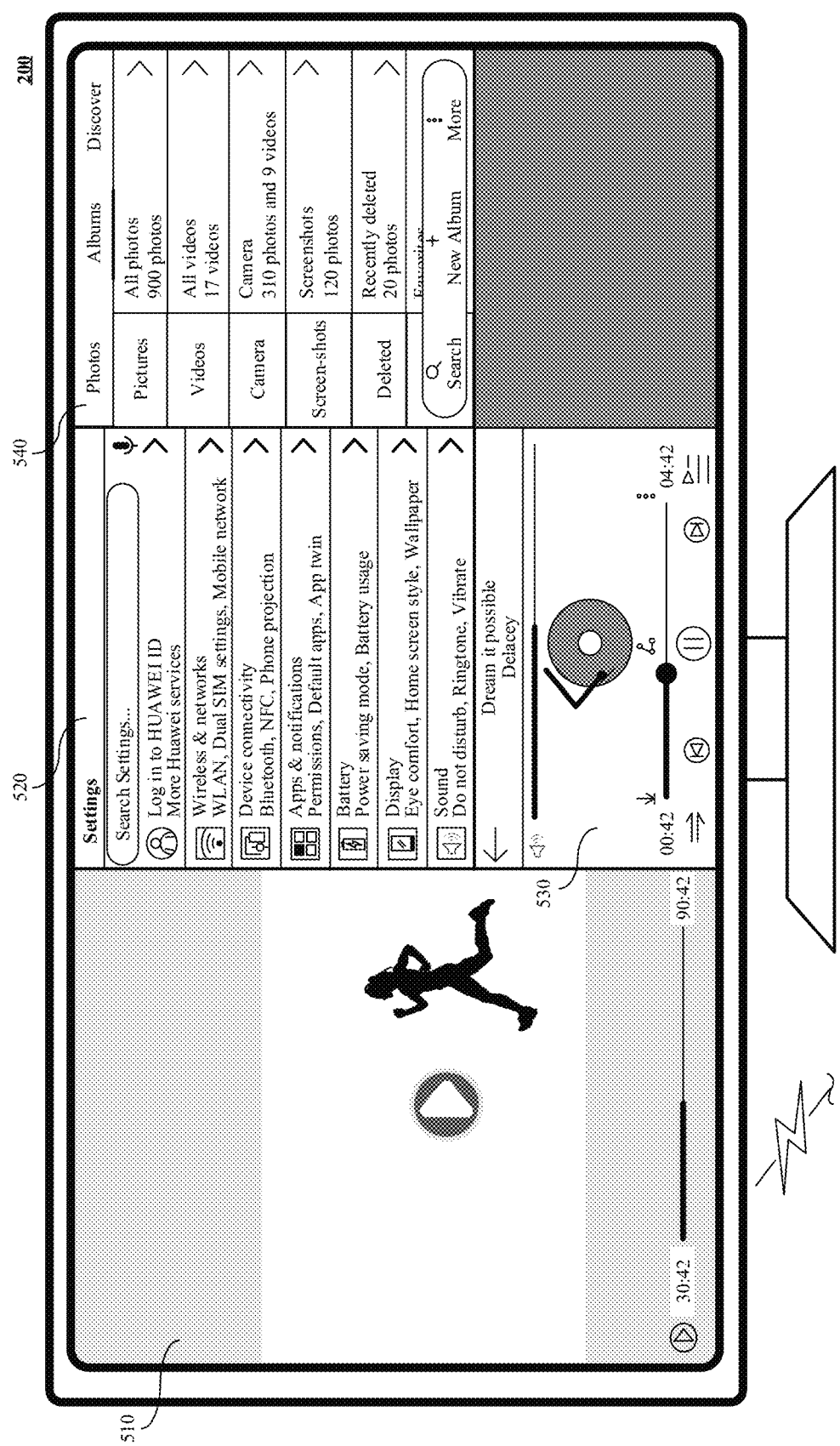

As shown in FIG. 6G-1 and FIG. 6G-2, the electronic device 100 may receive an input operation 646 (for example, tapping) by the user on the OK button 616 in the application selection window 610. In response to the input operation 646, as shown in FIG. 6H-1 and FIG. 6H-2, the electronic device 100 may cancel projection of the application interface 440 of Gallery onto the display of the external display device 200 for displaying.

As shown in FIG. 6H-1 and FIG. 6H-2, the application interface 510 of Video, the application interface 520 of Settings, and the application interface 530 of Music are displayed on the display of the external display device 200. The display content in the application interface 510 of Video is the same as the display content in the application interface 410 of Video displayed on the touchscreen 300 of the electronic device 100. The display content in the application interface 520 of Settings is the same as the display content in the application interface 420 of Settings displayed on the touchscreen 300 of the electronic device 100. The display content in the application interface 530 of Music is the same as display content in the application interface 430 of Music displayed on the touchscreen 300 of the electronic device 100. Relative positions of the application interface 510 of Video, the application interface 520 of Settings, and the application interface 530 of Music that are displayed on the display of the external display device 200 are the same as relative positions of the application interface 410 of Video, the application interface 420 of Settings, and the application interface 430 of Music that are displayed on the touchscreen 300.

In a possible implementation, a layout of the one or more application interfaces displayed on the display of the external display device 200 is different from a layout of the one or more application interfaces displayed on the touchscreen 300. For details, refer to the embodiments shown in FIG. 5B-1 and FIG. 5B-2 to FIG. 5F-1 and FIG. 5F-2. Details are not described herein again.

In some application scenarios, a user needs to simultaneously process a plurality of application tasks on the electronic device 100. To meet such a requirement of the user, the electronic device 100 may display a plurality of application interfaces (for example, an application interface of Video, an application interface of Settings, an application interface of Music, an application interface of Gallery, and an application interface of Messages) in different areas on the touchscreen 300. When the plurality of application interfaces are displayed in different areas on the touchscreen 300 of the electronic device 100, when the electronic device 100 receives an input operation of the user and enables a screen projection function, the electronic device 100 may establish a connection (for example, a wireless connection such as Wi-Fi or a wired connection) to the external display device 200, and display a projection notification window on the touchscreen 300. The projection notification window may be displayed by using a gesture operation (for example, swiping down from the top of the touchscreen 300) by the user. The projection notification window includes a plurality of application options, and the plurality of application options may be options of an icon type (for example, an application icon of Video, an application icon of Settings, an application icon of Music, an application icon of Gallery, an application icon of Messages) or may be options of a text type. This is not limited herein. Each of the plurality of application interfaces displayed in different areas on the touchscreen 300 corresponds to an application option in the projection notification window. The electronic device 100 may receive a selection operation that is performed by the user on the plurality of application options in the projection notification window. In response to the selection operation, the electronic device 100 may project, onto the display of the external display device 200, one or more application interfaces corresponding to one or more application options selected by the user. In this way, the electronic device 100 can select, based on the input operation of the user, some application interfaces from the plurality of application interfaces split-screen displayed on the touchscreen 300, and project the some application interfaces onto the display of the external display device 200, to ensure that an application interface involving user privacy is projected only after the user agrees and confirms. This ensures user privacy.

For example, the electronic device 100 receives the input operation (for example, the input operation 472 on the projection device option 471 in FIG. 4D-1 and FIG. 4D-2) by the user. In response to the input operation of the user, the electronic device 100 may establish a connection to the external display device 200, and display a window 460 and a projection notification window 710 shown in FIG. 7A-1 and FIG. 7A-2 on the touchscreen 300. For text descriptions of the window 460, refer to the embodiment shown in FIG. 4C-1 and FIG. 4C-2. Details are not described herein again.

Figures 1, 7A:
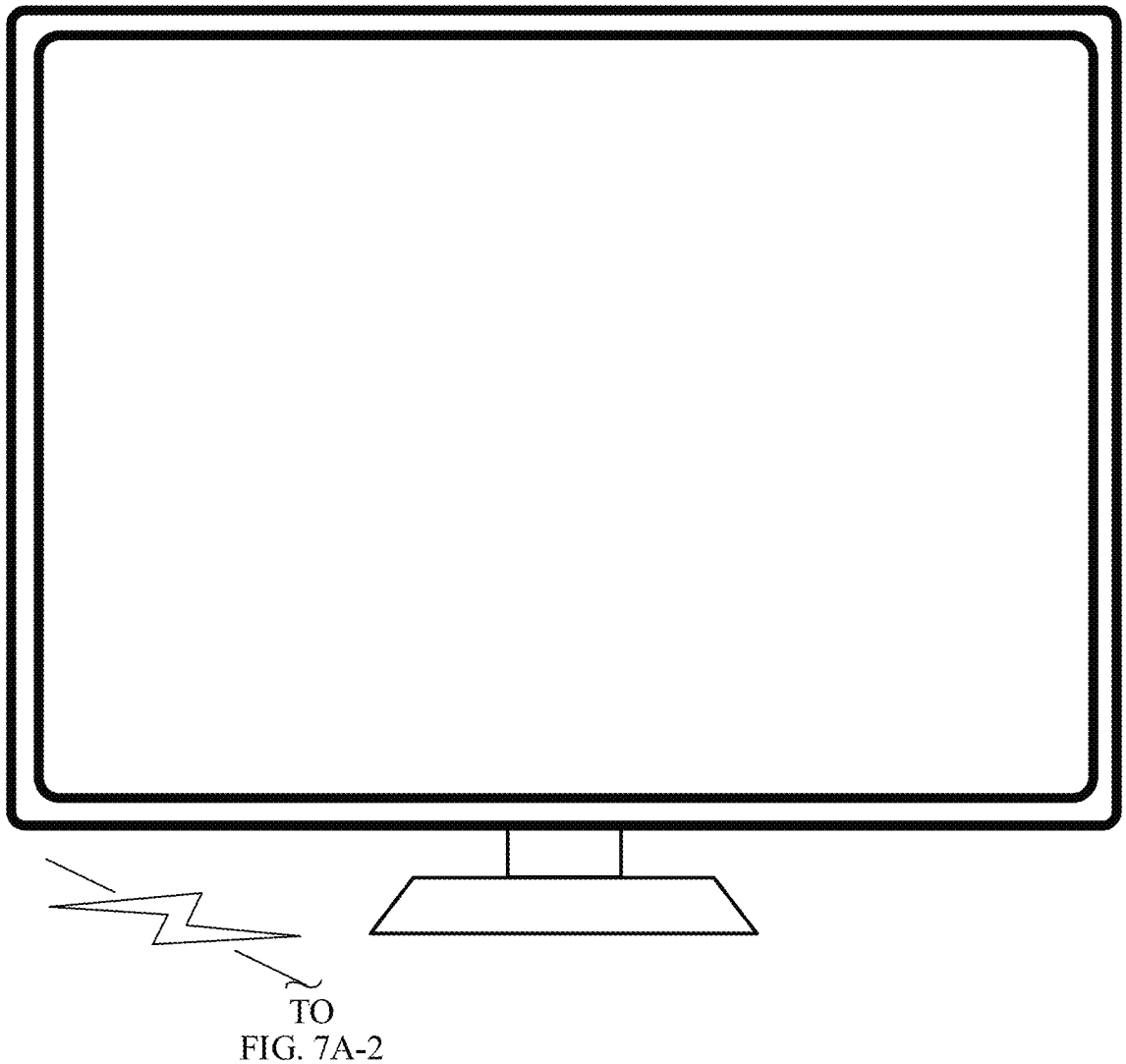
Figures 2, 7A:
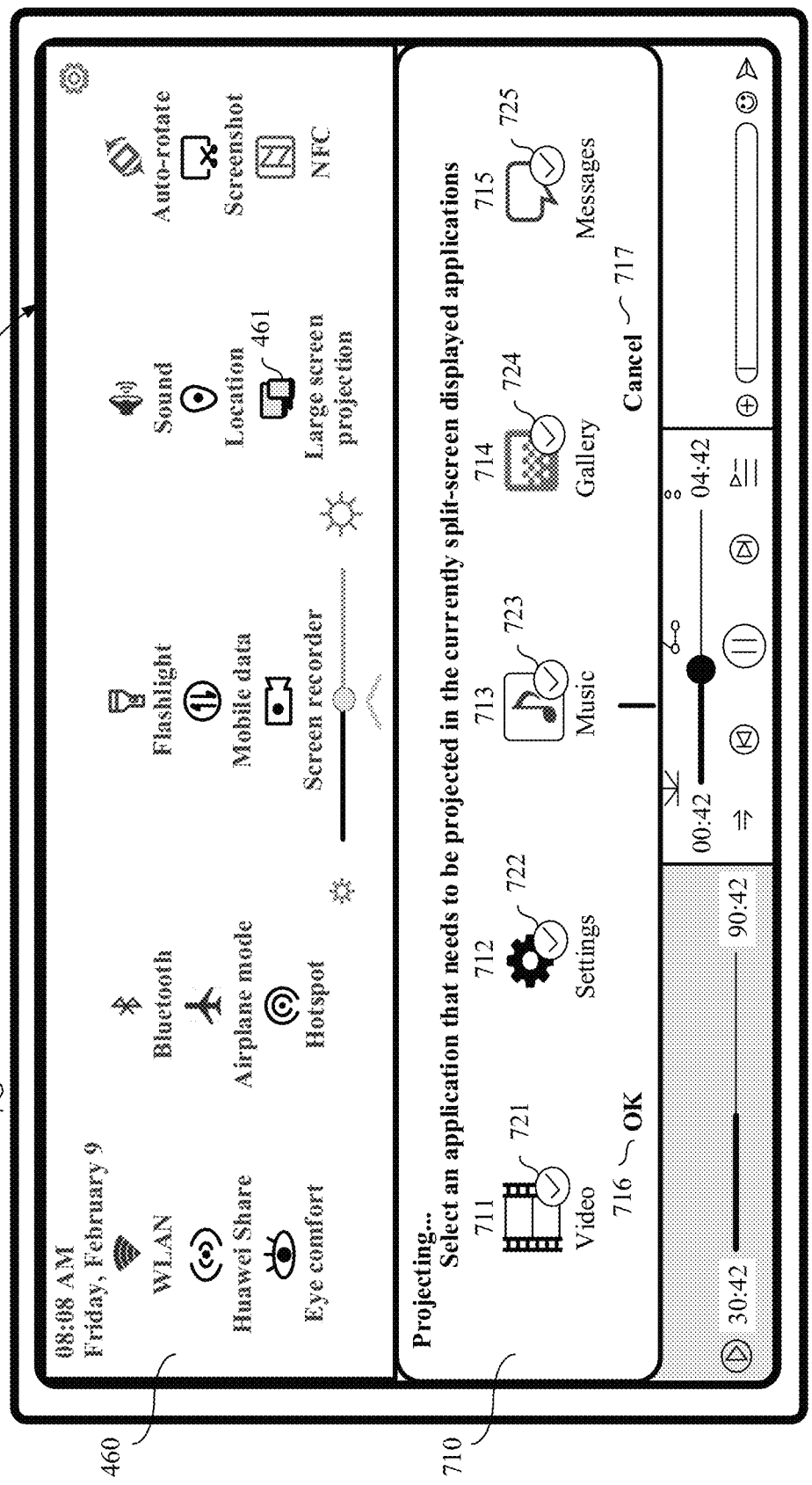

As shown in FIG. 7A-1 and FIG. 7A-2, the projection notification window 710 includes a plurality of application options, an OK button 716, and a cancel button 717. For example, the projection notification window 710 includes an application option 711 of Video, an application option 712 of Settings, an application option 713 of Music, an application option 714 of Gallery, and an application option 715 of Messages. The application option 711 of Video corresponds to an application interface 410 of Video displayed on the touchscreen 300, the application option 712 of Settings corresponds to an application interface 420 of Settings displayed on the touchscreen 300, the application option 713 of Music corresponds to an application interface 430 of Music displayed on the touchscreen 300, the application option 714 of Gallery corresponds to an application interface 440 of Gallery displayed on the touchscreen 300, and the application option 715 of Messages corresponds to an application interface 450 of Messages displayed on the touchscreen 300. The OK button 716 may be used to receive an input operation (for example, tapping) by the user. In response to the input operation, the electronic device 100 may project an application interface selected by the user onto the display of the external display device 200. The cancel button 717 may be used to receive an input operation (for example, tapping) by the user. In response to the input operation, the electronic device 100 may cancel projection of an application interface selected by the user onto the display of the external display device 200 for displaying.

Figures 1, 7B:
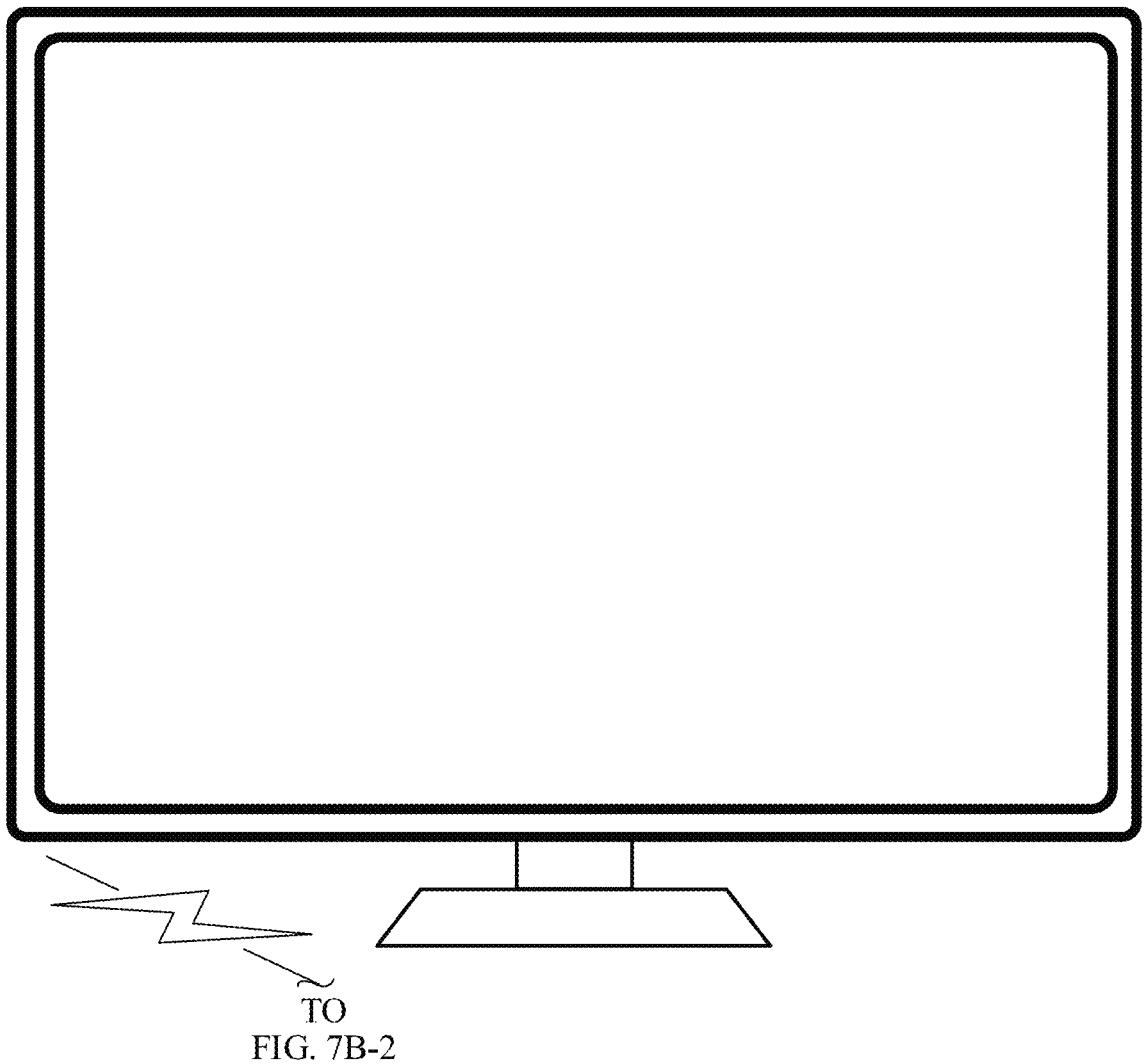
Figures 2, 7B:
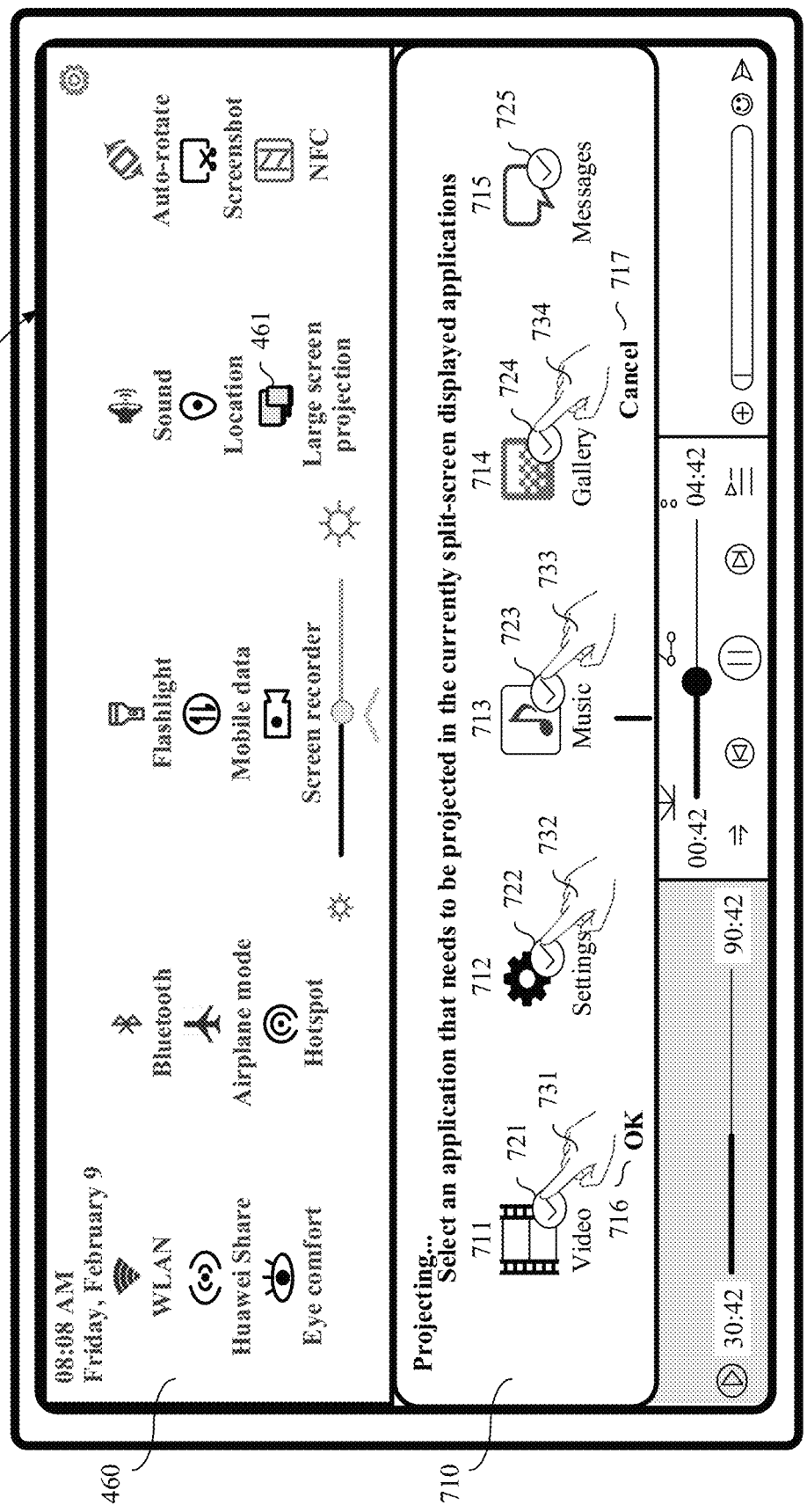

Each application option has a marker, and the marker may be used to prompt the user whether the application option is selected. When the marker is in a disabled state, the application option is not selected, and when the marker is in an enabled state, the application option is selected. For example, as shown in FIG. 7B-1 and FIG. 7B-2, there is a marker 721 on the application option 711 of Video, a marker 722 on the application option 712 of Settings, a marker 723 on the application option 713 of Music, a marker 724 on the application option 714 of Gallery, and a marker 725 on the application option 715 of Messages. None of the application option 711 of Video, the application option 712 of Settings, the application option 713 of Music, the application option 714 of Gallery, and the application option 715 of Messages is selected. Therefore, the marker 721, the marker 722, the marker 723, the marker 724, and the marker 725 are all in a disabled state.

Figures 1, 7C:
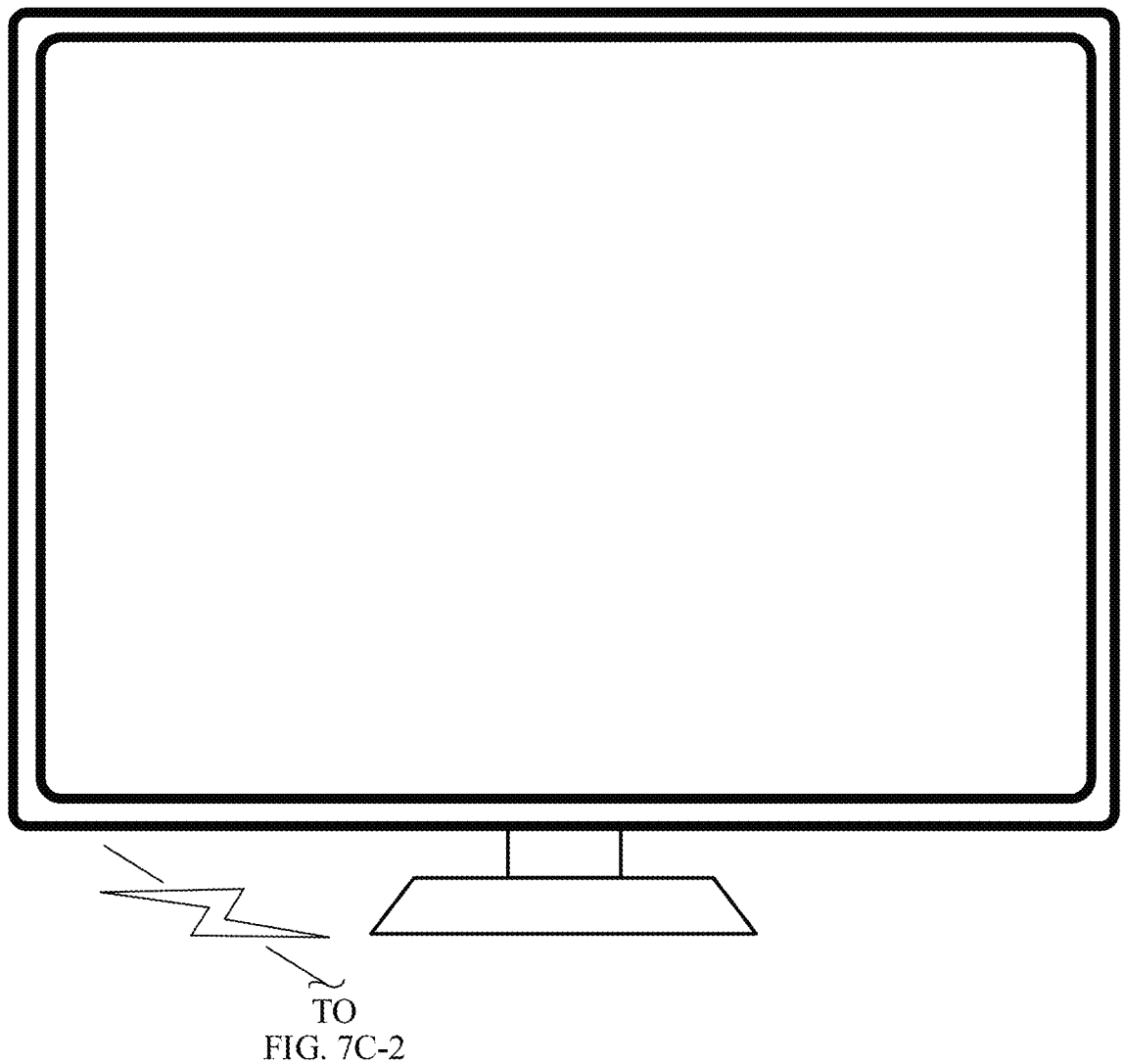

As shown in FIG. 7B-1 and FIG. 7B-2, the electronic device 100 may receive a selection operation 731 by the user on the application option 711 of Video, and in response to the input operation 731, the electronic device 100 may switch the marker 721 on the application option 711 of Video to an enabled state shown in FIG. 7C-1 and FIG. 7C-2. The electronic device 100 may receive a selection operation 732 by the user on the application icon 712 of Settings, and in response to the input operation 732, the electronic device 100 may switch the marker 722 on the application option 712 of Settings to an enabled state shown in FIG. 7C-1 and FIG. 7C-2. The electronic device 100 may receive a selection operation 733 by the user on the application option 713 of Music, and in response to the input operation 733, the electronic device 100 may switch the marker 723 on the application option 713 of Music to an enabled state shown in FIG. 7C-1 and FIG. 7C-2. The electronic device 100 may receive a selection operation 734 by the user on the application option 714 of Gallery, and in response to the input operation 734, the electronic device 100 may switch the marker 724 on the application option 714 of Gallery to an enabled state shown in FIG. 7C-1 and FIG. 7C-2.

As shown in FIG. 7C-1 and FIG. 7C-2, the electronic device 100 may receive an input operation 736 (for example, tapping) by the user on the OK button 716. In response to the input operation 736, the electronic device 100 may project application interfaces corresponding to application options selected by the user onto the display of the external display device 200. For example, as shown in FIG. 7C-1 and FIG. 7C-2, the application options selected by the user include the application option 711 of Video, the application option 712 of Settings, the application option 713 of Music, and the application option 714 of Gallery. Therefore, in response to the input operation 736 on the OK button 716, the electronic device 100 may project the application interface 410 of Video, the application interface 420 of Settings, the application interface 430 of Music, and the application interface 440 of Gallery onto the display of the external display device 200 for displaying.

Figures 2, 7D:
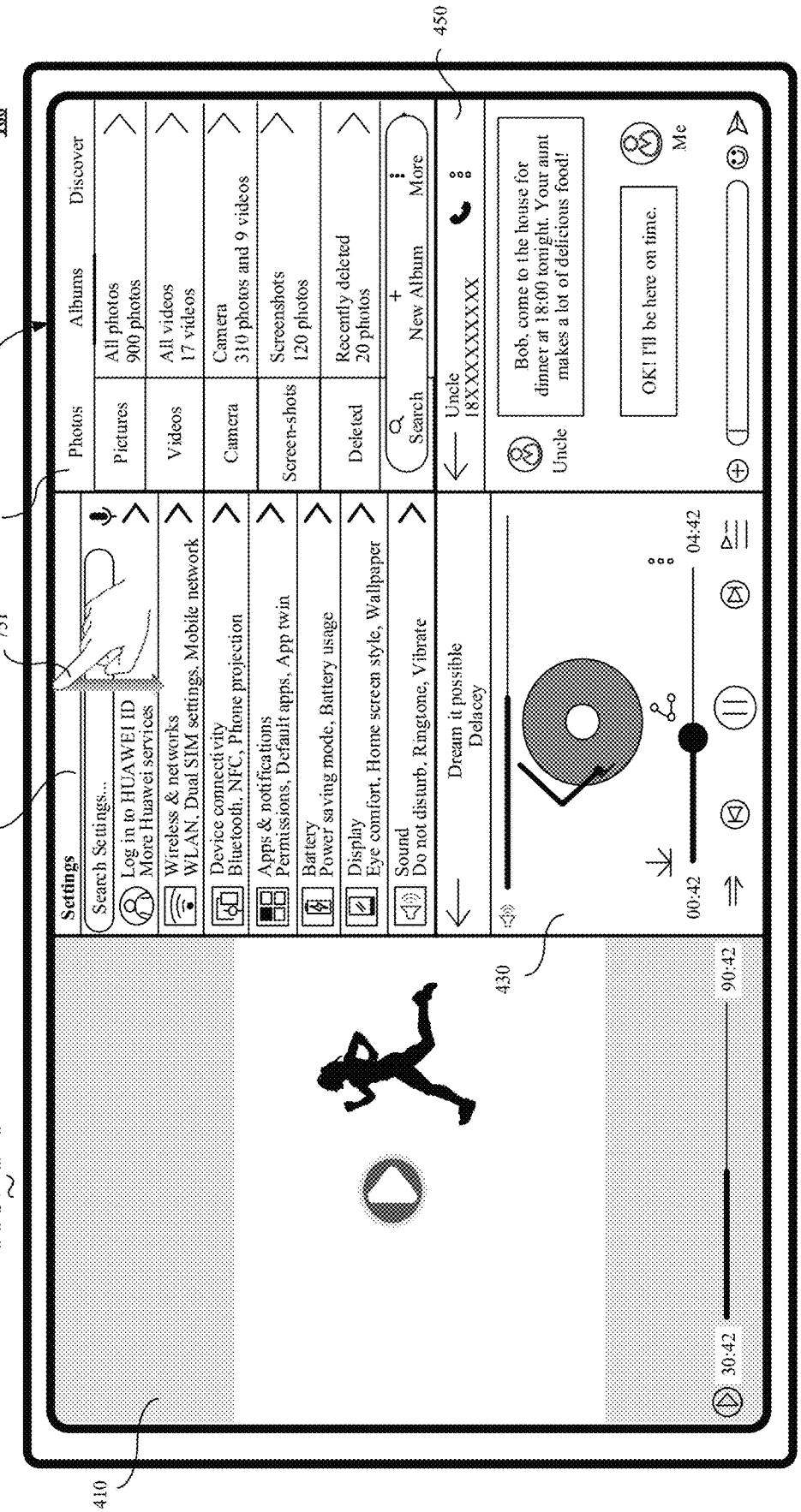

As shown in FIG. 7D-1 and FIG. 7D-2, an application interface 510 of Video, an application interface 520 of Settings, an application interface 530 of Music, and an application interface 540 of Gallery are displayed on the display of the external display device 200. For details, refer to the embodiment shown in FIG. 6D-1 and FIG. 6D-2. Details are not described herein again.

In a possible implementation, after the electronic device 100 exits displaying the projection notification window 710, the electronic device 100 may receive a gesture operation (for example, swiping down from the top of the touchscreen 300) by the user. In response to the gesture operation, the electronic device 100 may display the projection notification window 710 again.

For example, as shown in FIG. 7D-1 and FIG. 7D-2, the electronic device 100 has projected, onto the display of the external display device 200 for displaying, the application interface 410 of Video, the application interface 420 of Settings, the application interface 430 of Music, and the application interface 440 of Gallery on the touchscreen 300. The electronic device 100 may receive a gesture operation 751 (for example, swiping down from the top of the touchscreen 300) by the user on the touchscreen 300. In response to the gesture operation 751, as shown in FIG. 7E-1 and FIG. 7E-2, the electronic device 100 may display the window 460 and the projection notification window 710 on the touchscreen 300.

In a possible implementation, after the electronic device 100 projects, onto the display of the external display device 200 for displaying, the one or more application interfaces on the touchscreen 300, the electronic device 100 may receive an input operation of the user, to cancel projection of one or more application interfaces onto the display of the external display device 200 for displaying.

Figures 1, 2, 7E:
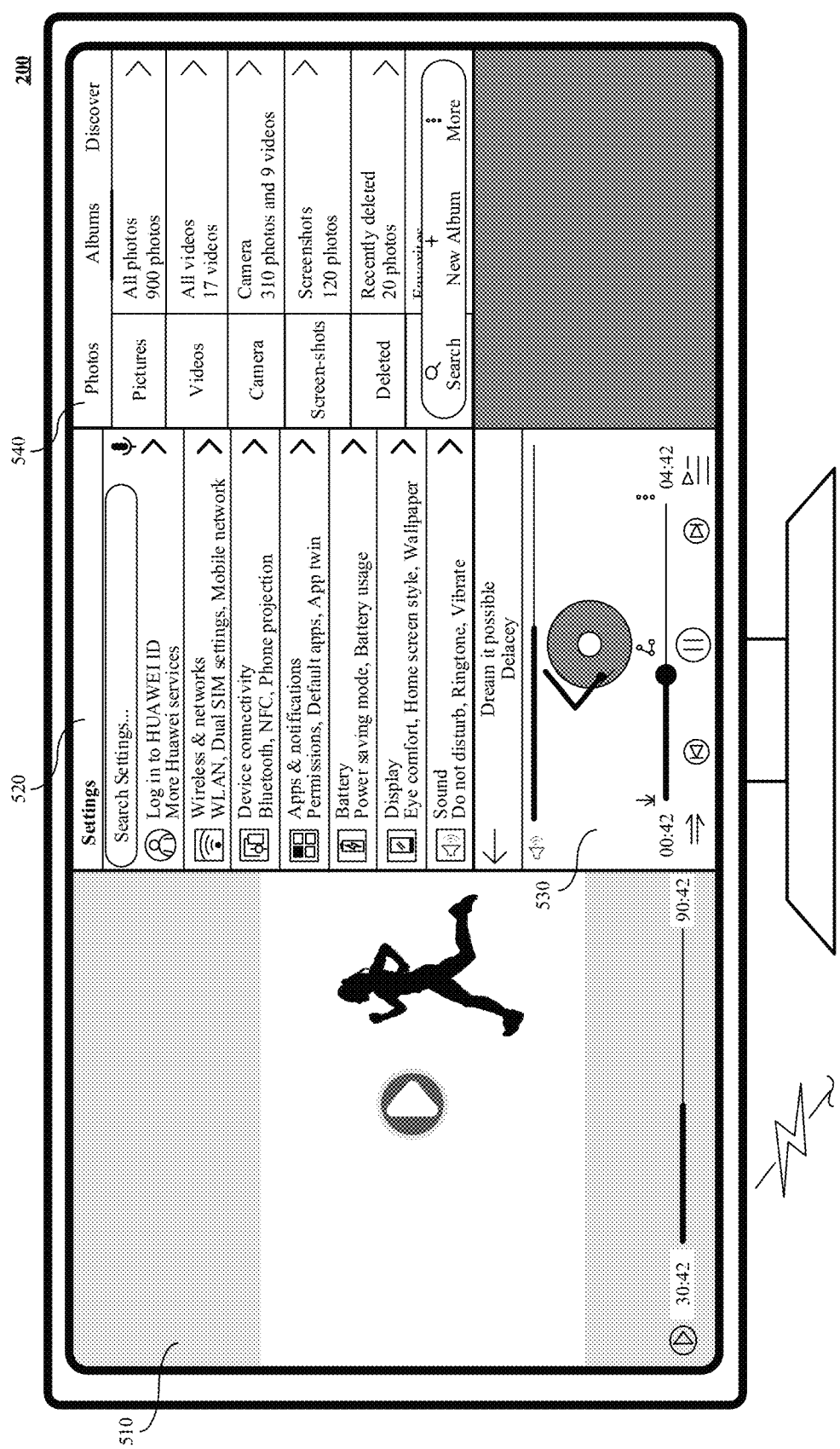
Figures 2, 7E:
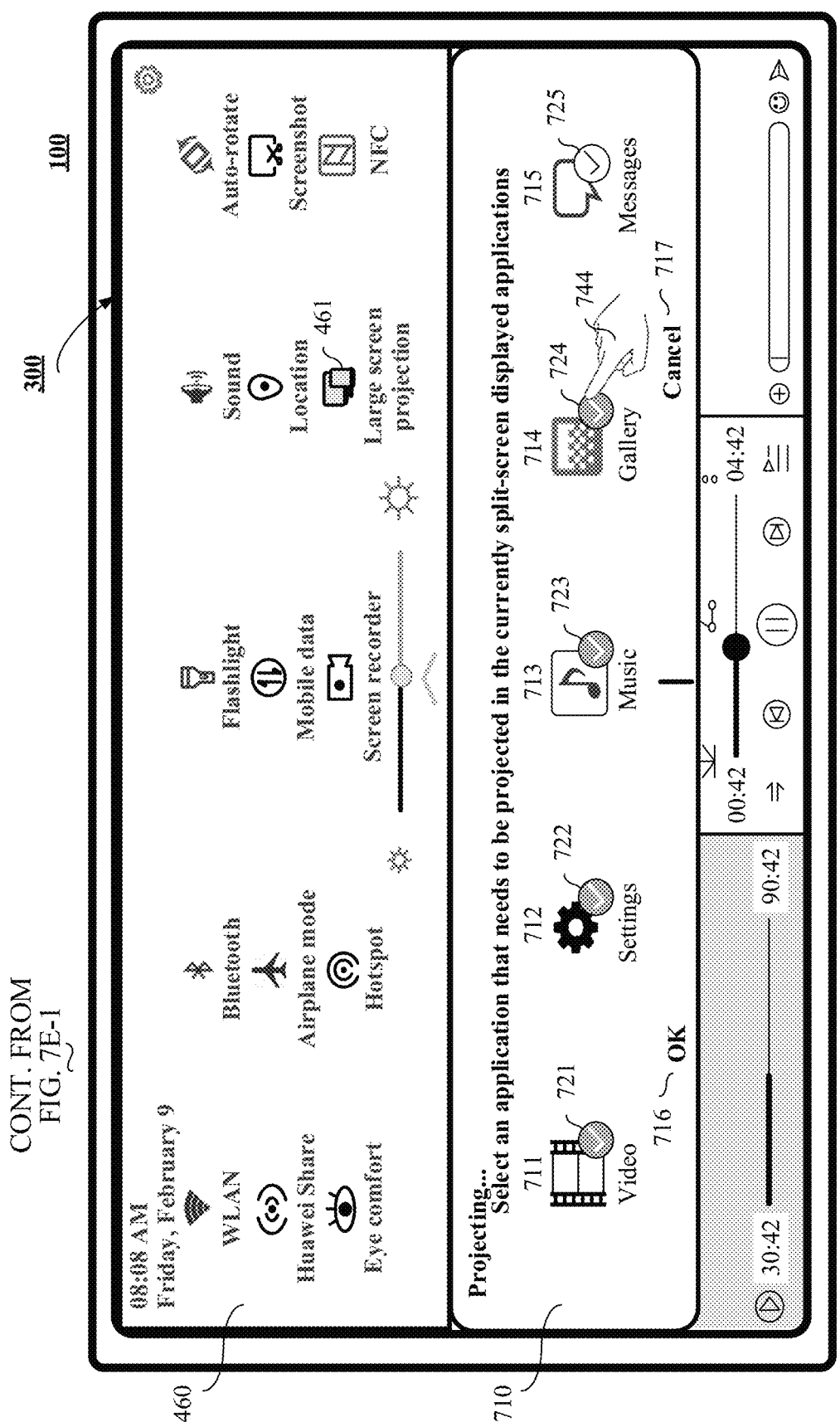

As shown in FIG. 7E-1 and FIG. 7E-2, the application interface 410 of Video, the application interface 420 of Settings, the application interface 430 of Music, and the application interface 440 of Gallery are selected by the user and are projected onto the display of the external display device 200 for displaying. Therefore, the marker 721 on the application option 711 of Video, the marker 722 on the application option 712 of Settings, the marker 723 on the application option 713 of Music, and the marker 724 on the application option 714 of Gallery are all in an enabled state. The electronic device 100 may receive an input operation 744 (for example, tapping) by the user on the application option 714 of Gallery, and in response to the input operation 744, the electronic device 100 may switch the marker 724 on the application option 714 of Gallery from an enabled state to a disabled state.

Figures 2, 7F:
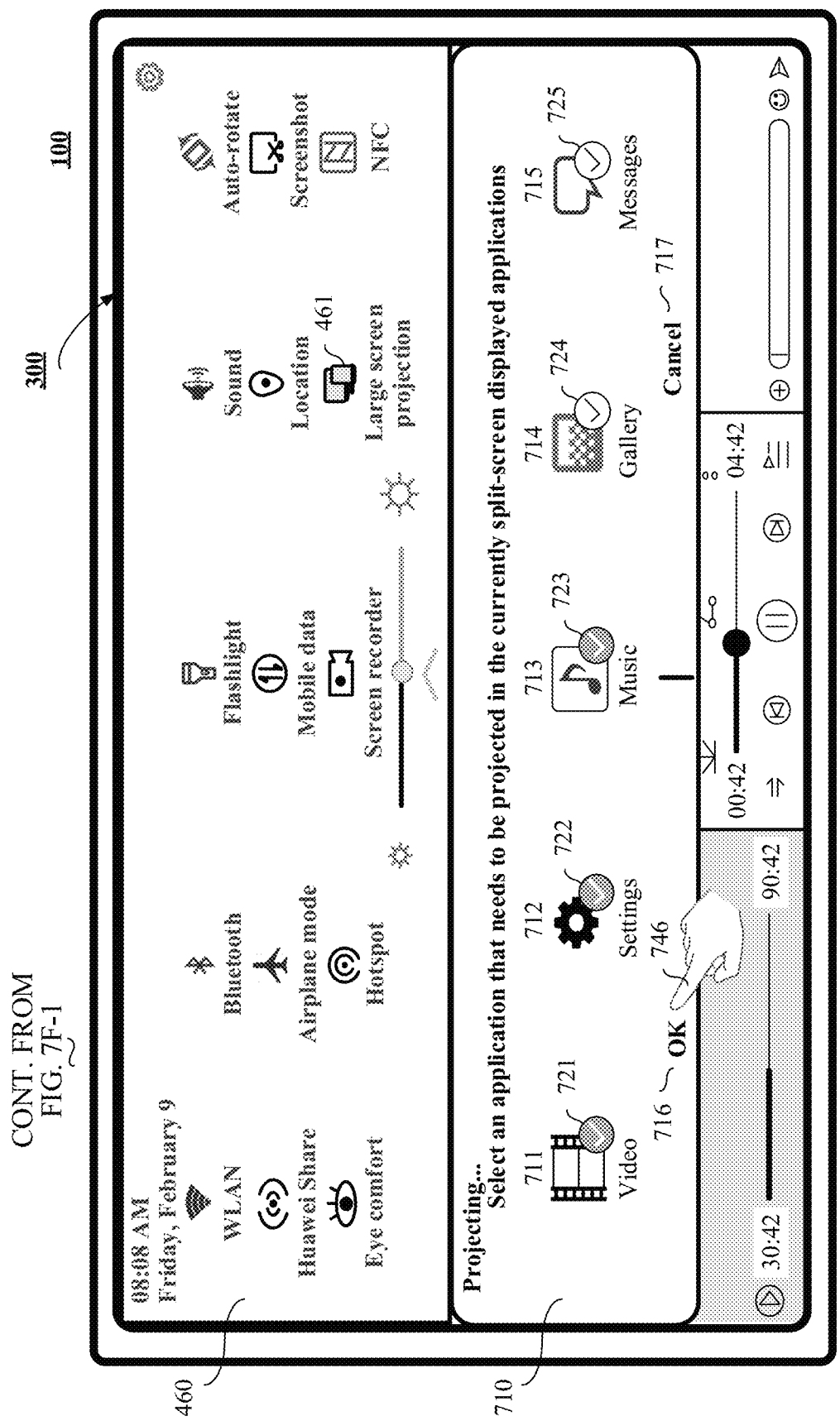

As shown in FIG. 7F-1 and FIG. 7F-2, the electronic device 100 may receive an input operation 746 (for example, tapping) by the user on the OK button 716 in the projection notification window 710. In response to the input operation 746, as shown in FIG. 7G-1 and FIG. 7G-2, the electronic device 100 may cancel projection of the application interface 440 of Gallery onto the display of the external display device 200 for displaying.

Figures 2, 7G:
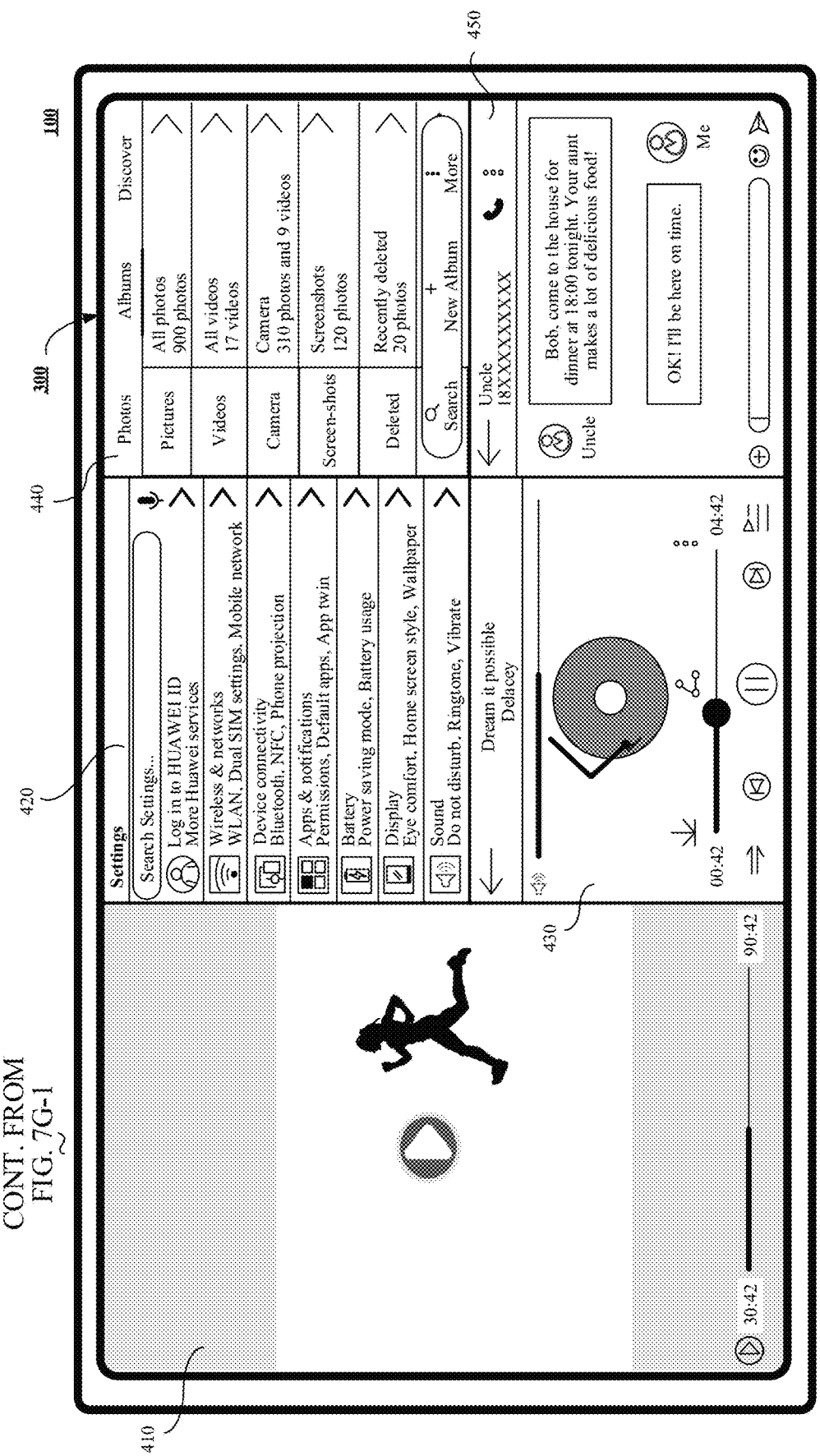

As shown in FIG. 7G-1 and FIG. 7G-2, the application interface 510 of Video, the application interface 520 of Settings, and the application interface 530 of Music are displayed on the display of the external display device 200. For details, refer to the embodiment shown in FIG. 6H-1 and FIG. 6H-2. Details are not described herein again.

In a possible implementation, a layout of the one or more application interfaces displayed on the display of the external display device 200 is different from a layout of the one or more application interfaces displayed on the touchscreen 300. For details, refer to the embodiments shown in FIG. 5B-1 and FIG. 5B-2 to FIG. 5F-1 and FIG. 5F-2. Details are not described herein again.

In some application scenarios, the electronic device 100 has currently displayed some application interfaces (for example, an application interface of Video, an application interface of Settings, and an application interface of Music) in different areas on the touchscreen 300, and has projected one or more (for example, the application interface of Video, the application interface of Settings, and the application interface of Music) of these application interfaces onto the display of the external display device 200 for displaying. In this case, the electronic device 100 may receive an input operation of the user, open another application in response to the input operation, and then split-screen display an application interface (for example, an application interface of Gallery) of the another application and the some application interfaces (for example, the application interface of Video, the application interface of Settings, and the application interface of Music) on the touchscreen 300. Because the electronic device 100 has enabled a screen projection function, when the electronic device 100 split screen displays the application interface (for example, the application interface of Gallery) of the another application on the touchscreen 300, the electronic device 100 does not immediately project the application interface of the another application onto the display of the external display device 200 for displaying. After receiving the input operation of the user, in response to the input operation, the electronic may project the application interface of the other application onto the display of the external display device 200 for displaying. In this way, when the electronic device 100 has projected, onto the display of the external display device 200 for displaying, the one or more application interfaces split screen displayed on the touchscreen 300, and when the electronic device 100 additionally displays an application interface on the touchscreen 300, the electronic device 100 needs to project the added application interface only after receiving the user operation. In this way, only after the user confirms, the electronic device 100 can project, onto the display of the external display device 200, the application interfaces split screen displayed on the touchscreen 200, to protect user privacy.

Figures 1, 2, 8A:
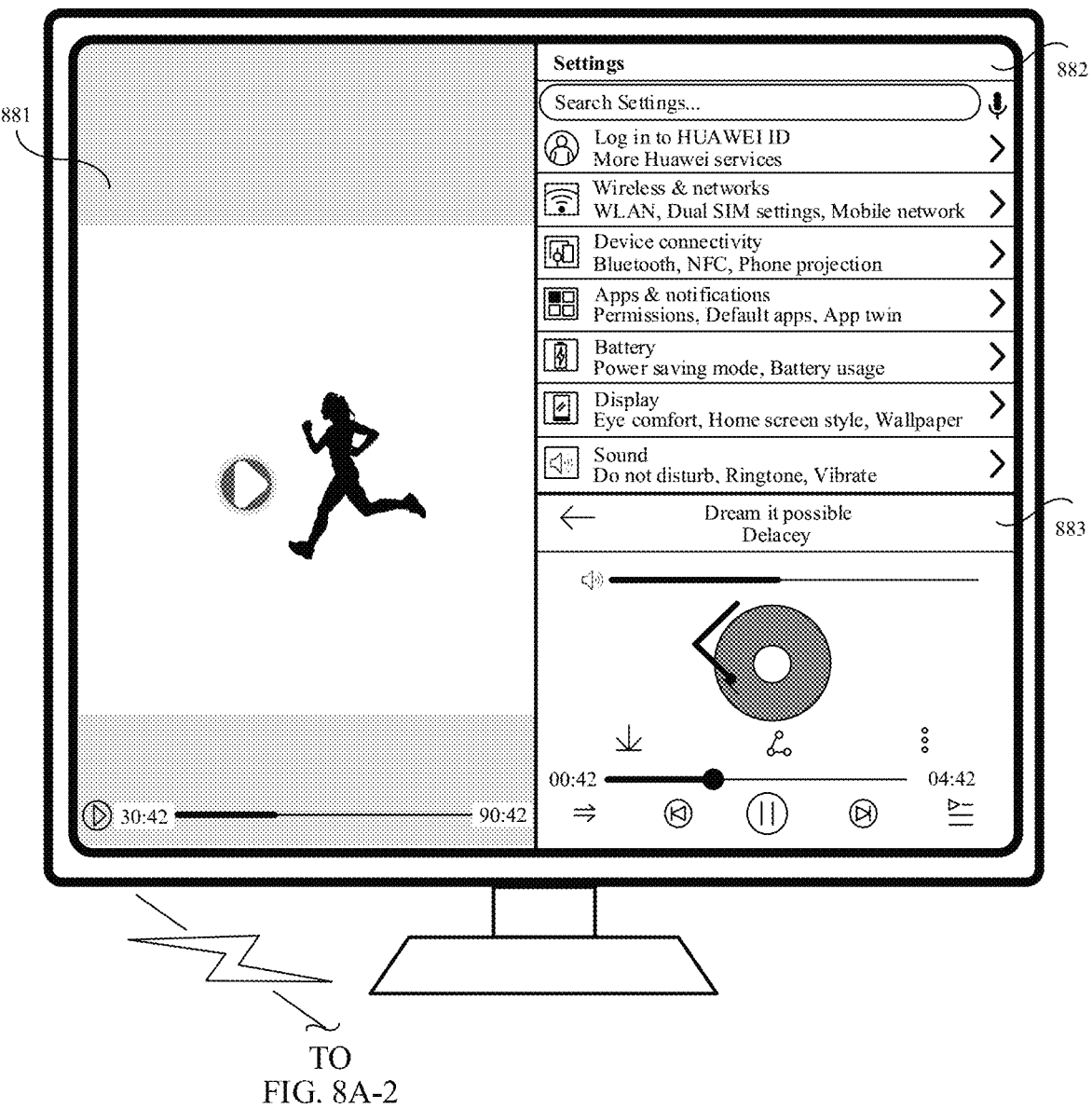
Figures 2, 8A:
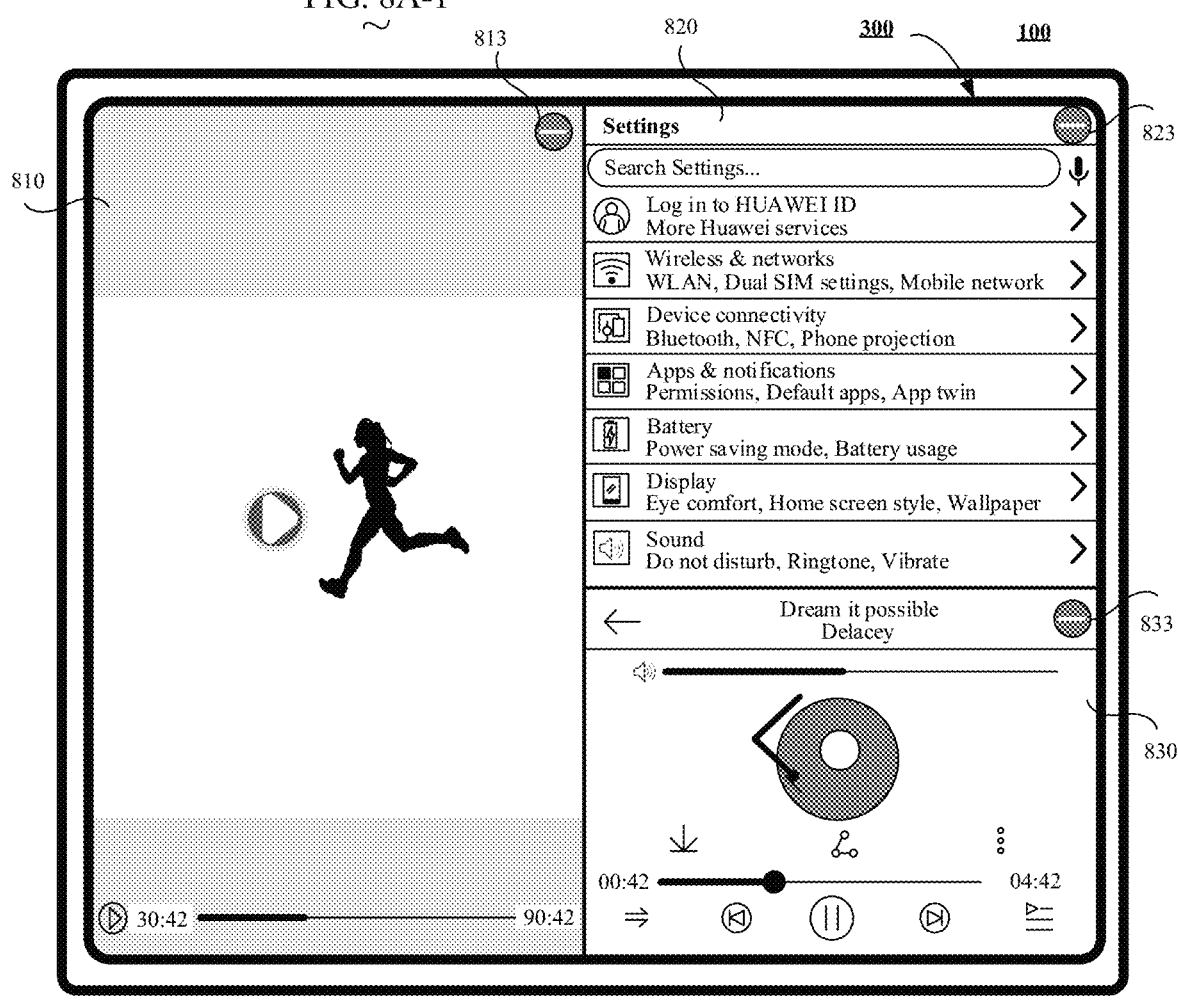

For example, as shown in FIG. 8A-1 and FIG. 8A-2, the electronic device 100 displays an application interface 810 of Video, an application interface 820 of Settings, and an application interface 830 of Music in different areas on the touchscreen 300. In addition, the electronic device 100 has projected the application interface 810 of Video, the application interface 820 of Settings, and the application interface 830 of Music onto the display of the external display device 200 for displaying. An application interface 881 of Video, an application interface 882 of Settings, and an application interface 883 of Music are displayed on the display of the external display device 200. Display content in the application interface 881 of Video is the same as display content in the application interface 810 of Video, display content in the application interface 882 of Settings is the same as display content in the application interface 820 of Settings, and display content in the application interface 883 of Music is the same as display content in the application interface 830 of Music.

Figures 1, 8B:
Figures 2, 8B:
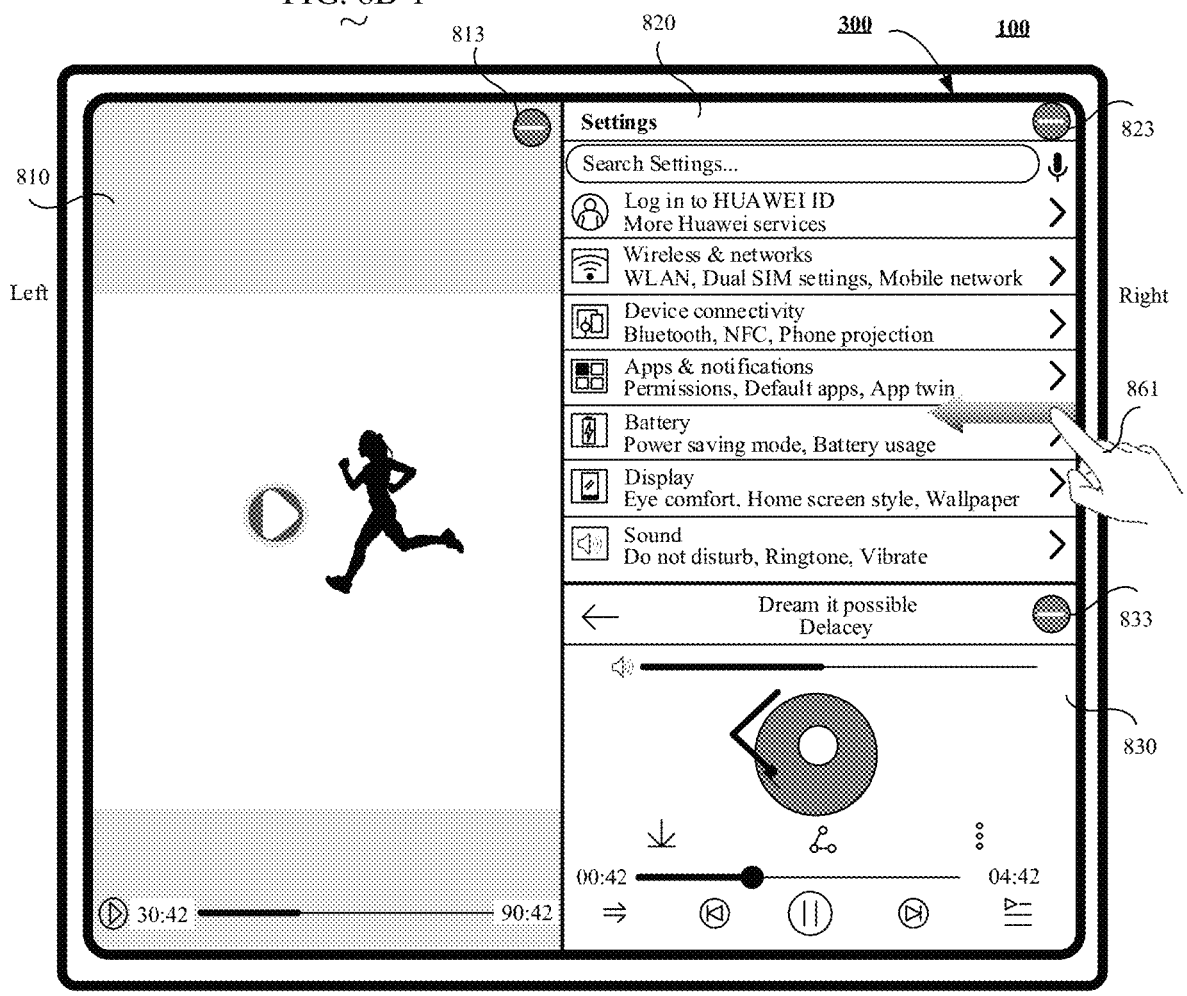
Figures 1, 8C:
Figures 2, 8C:
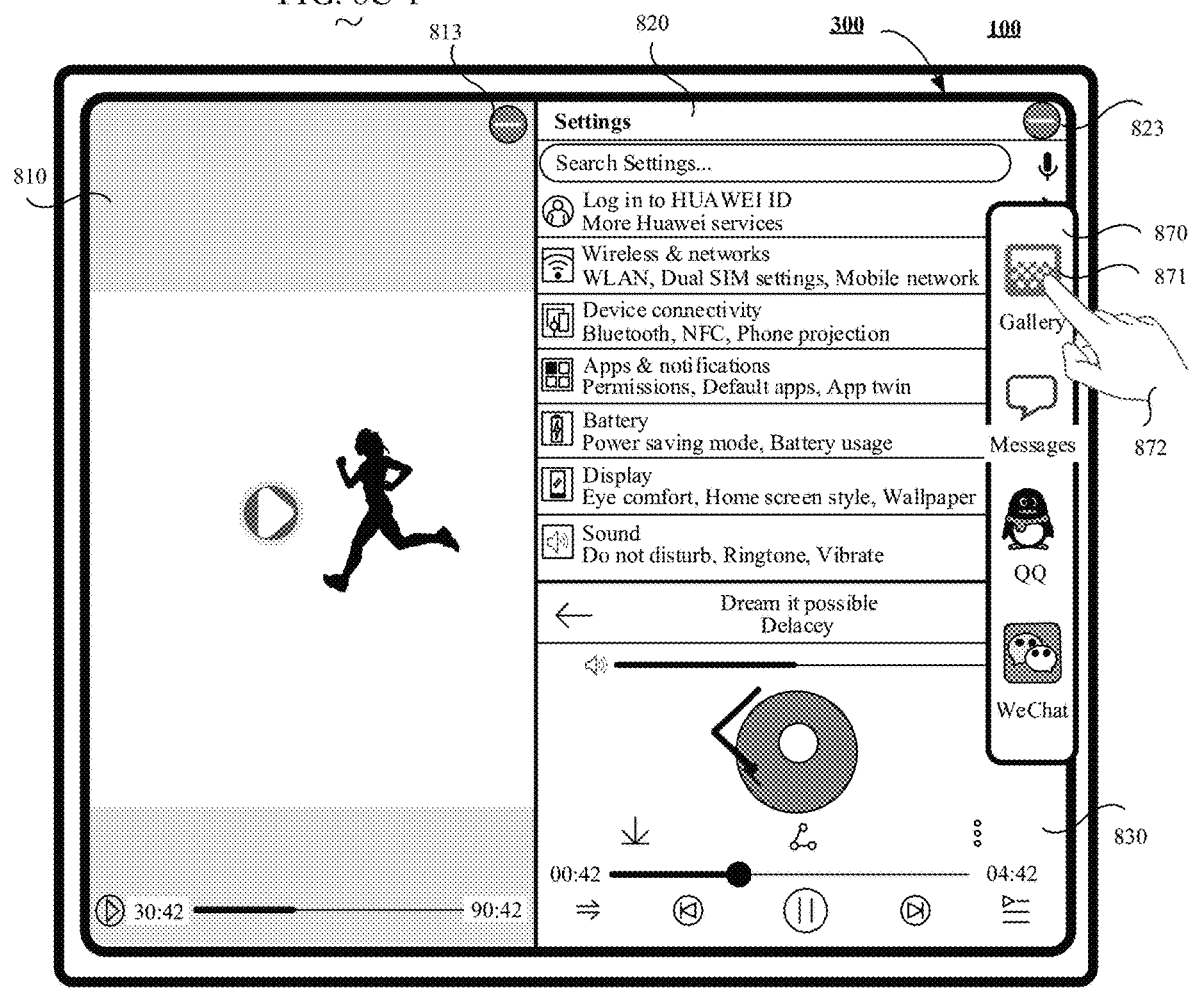

As shown in FIG. 8B-1 and FIG. 8B-2, the electronic device 100 may receive an input operation 861 (for example, swiping left from the right edge of the touchscreen 300) by the user. In response to the input operation 861, as shown in FIG. 8C-1 and FIG. 8C-2, the electronic device 100 may display a shortcut menu 870 on the touchscreen 300. The shortcut menu 870 includes one or more application icons (for example, an application icon 871 of Gallery, an application icon of Messages, an application icon of QQ, and an application icon of WeChat).

The electronic device 100 may receive an input operation 872 (for example, tapping) by the user on the application icon 871 of Gallery. In response to the input operation 872, the electronic device 100 may display, on the touchscreen 300, an application interface of Gallery and the application interfaces that have been split screen displayed on the touchscreen 300.

Figures 1, 8D:
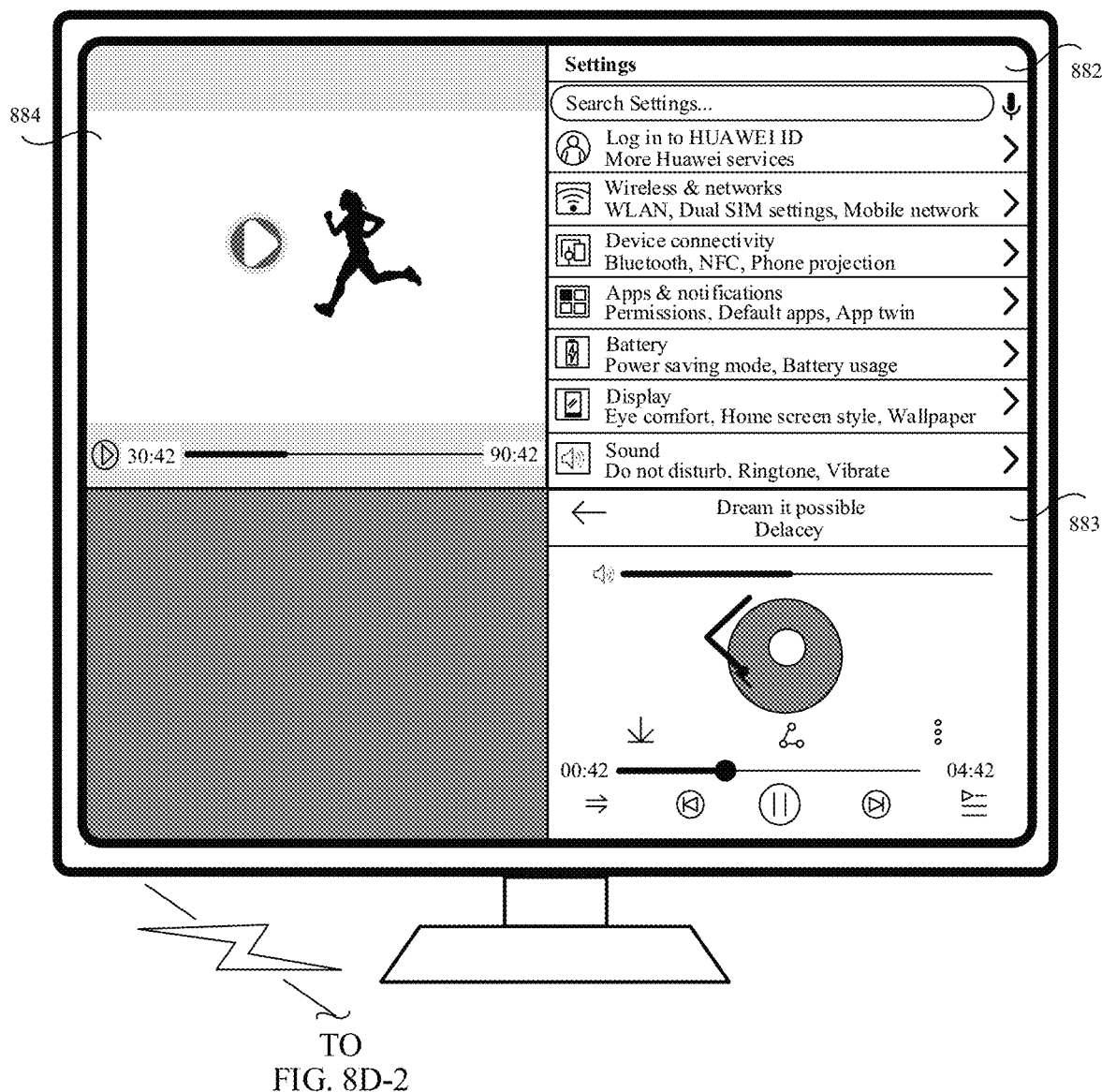
Figures 2, 8D:
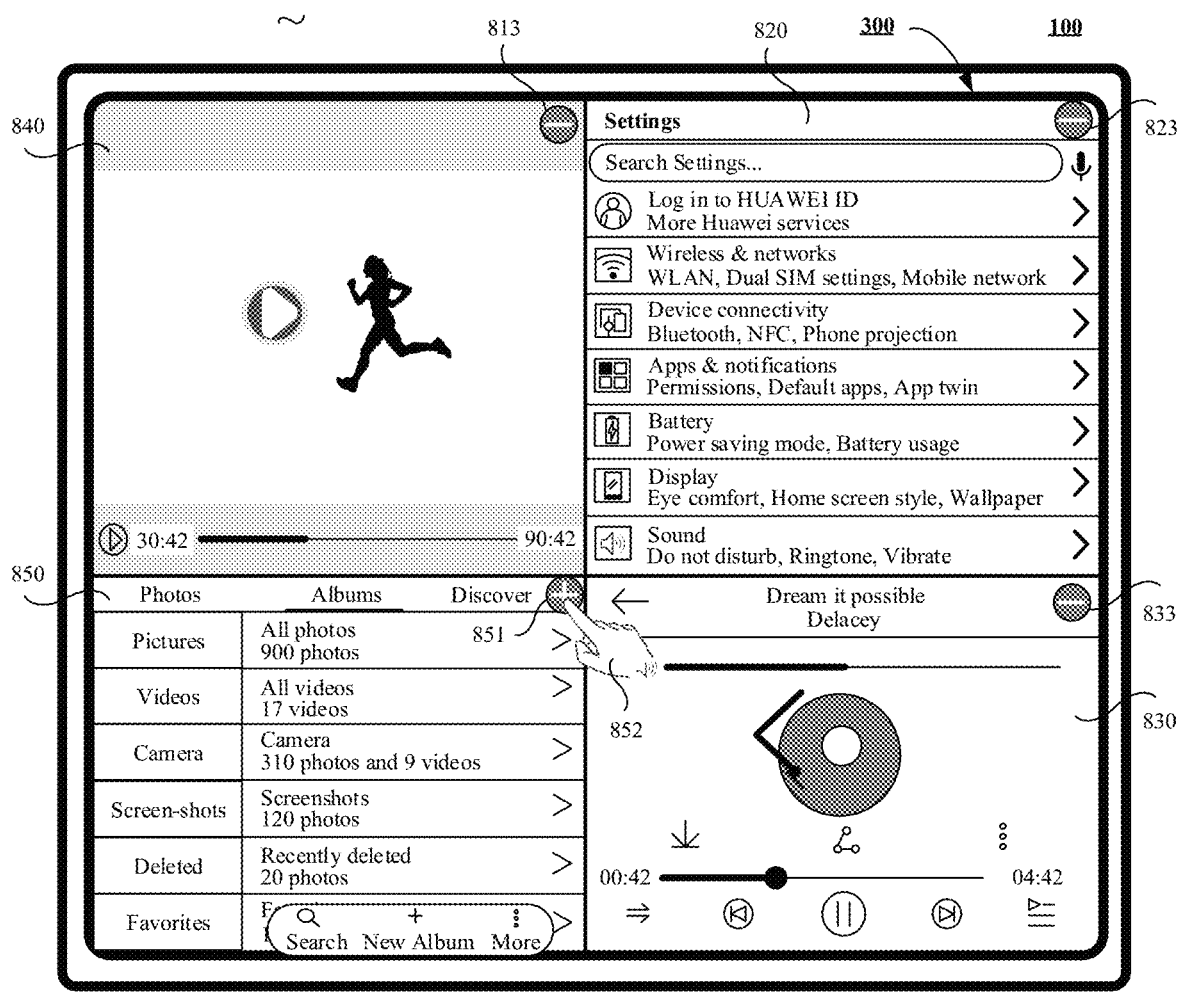

As shown in FIG. 8D-1 and FIG. 8D-2, after responding to the input operation 872 on the application icon 871 of Gallery, the electronic device 100 may split-screen display an application interface 840 of Video, an application interface 820 of Settings, an application interface 830 of Music, and an application interface 850 of Gallery on the touchscreen. In this case, the electronic device 100 projects the application interface 840 of Video, the application interface 822 of Settings, and the application interface 830 of Music onto the display of the external display device 200 for displaying. As shown in FIG. 8D-1 and FIG. 8D-2, an application interface 884 of Video, an application interface 882 of Settings, and an application interface 883 of Music are displayed in different areas on the display of the external display device 200.

Display content in the application interface 884 of Video is the same as display content in the application interface 840 of Video. Display content in the application interface 840 of Video is the same as display content in the application interface 810 of Video shown in FIG. 8C-1 and FIG. 8C-2, but a display ratio of the application interface 840 of Video is different from a display ratio of the application interface 810 of Video. A projection add button 851 may be displayed in an upper right corner of a display area (or may be another position in the display area) corresponding to the application interface 850 of Gallery.

The electronic device 100 may receive an input operation 852 (for example, tapping) by the user on the projection add button 851. In response to the input operation 852, as shown in FIG. 8E-1 and FIG. 8E-2, the electronic device 100 may project the application interface 850 of Gallery, together with the application interface 840 of Video, the application interface 820 of Settings, and the application interface 830 of Music, onto the display of the external display device 200 for displaying.

Figures 1, 8E:
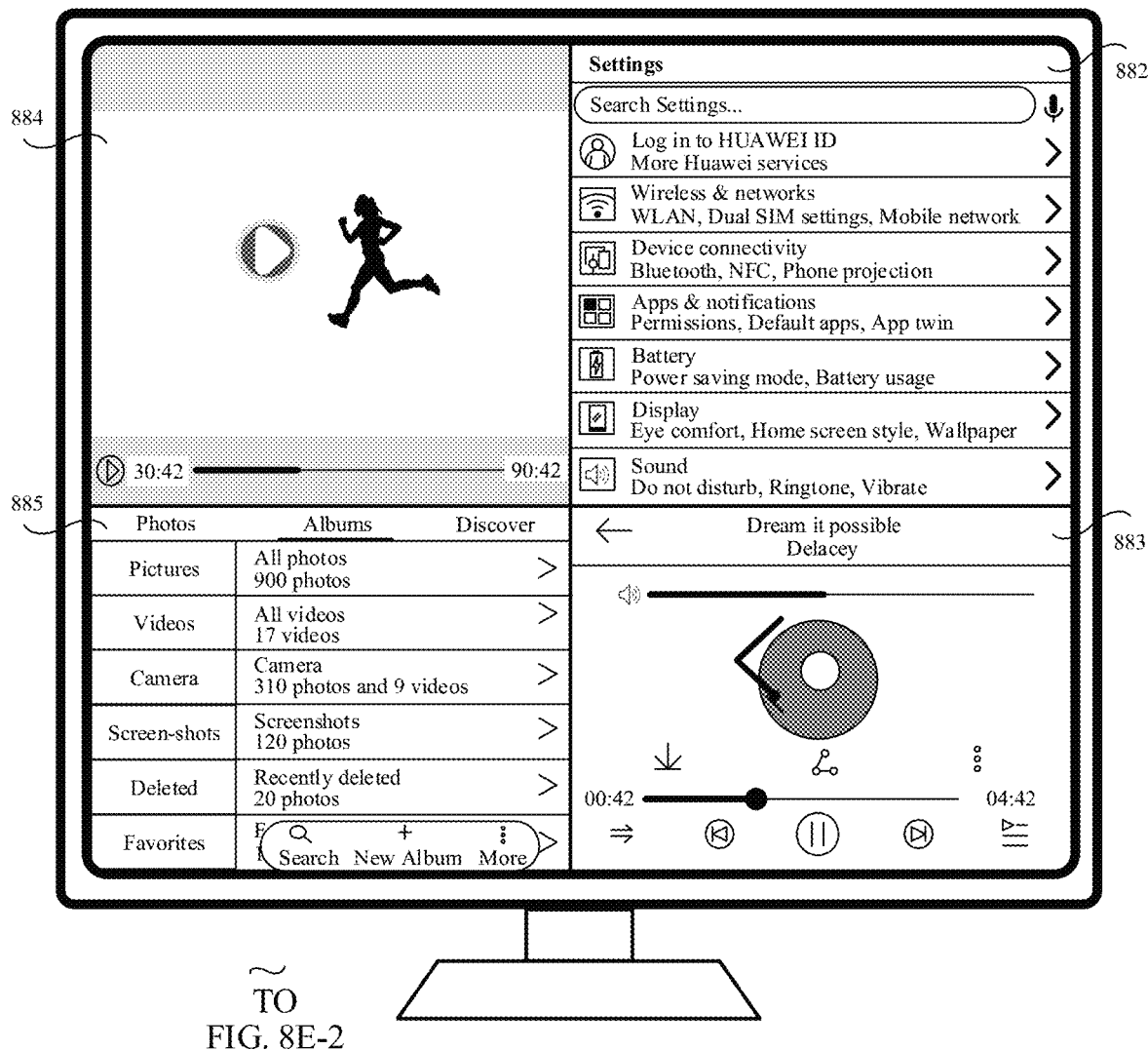
Figures 2, 8E:
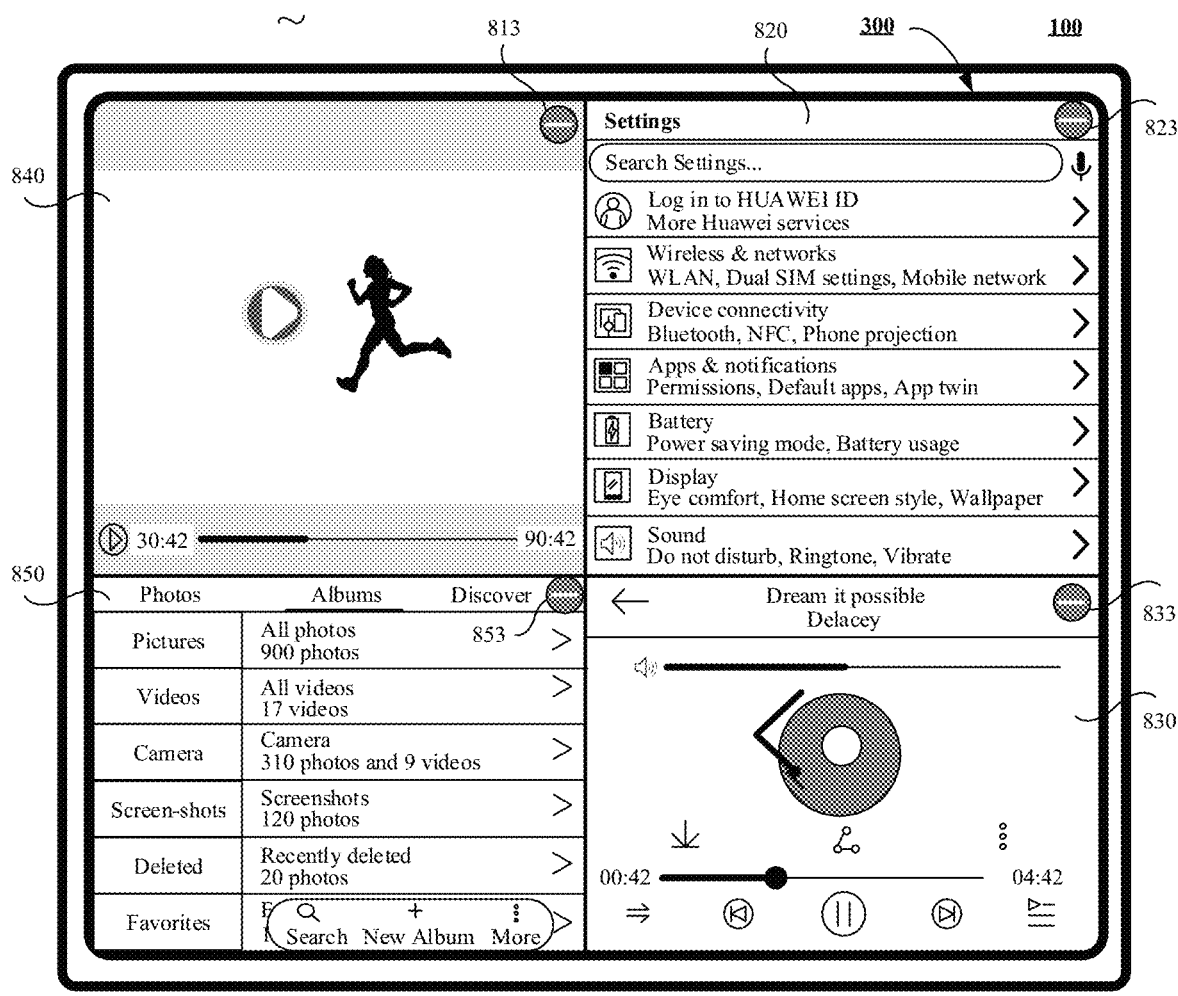

As shown in FIG. 8E-1 and FIG. 8E-2, the application interface 884 of Video, the application interface 882 of Settings, the application interface 883 of Music, and an application interface 884 of Gallery are displayed in different areas on the display of the external display device 200. Display content in the application interface 885 of Gallery is the same as display content in the application interface 850 of Gallery. When projecting the application interface 850 of Gallery onto the display of the external display device 200 for displaying, the electronic device 100 may display a projection cancel button 853 in an upper right corner (or may be another position) of the display area in which the application interface 850 of Gallery is located on the touchscreen 300. The projection cancel button 853 may be used to receive an input operation of the user. In response to the input operation that is performed by the user on the projection cancel button 853, the electronic device 100 may cancel projection of the application interface 850 of Gallery onto the display of the external display device 200 for displaying.

In some application scenarios, the electronic device 100 has currently displayed some application interfaces (for example, an application interface of Video, an application interface of Settings, and an application interface of Music) in different areas on the touchscreen 300, and has projected one or more (for example, the application interface of Video, the application interface of Settings, and the application interface of Music) of these application interfaces onto the display of the external display device 200 for displaying. In this case, the electronic device 100 may receive an input operation of the user, and in response to the input operation, adjust a display ratio of an application interface (for example, the application interface of Video) on the touchscreen 300. The electronic device 100 may project, onto the display of the external display device 200 for displaying, the application interface obtained after the display ratio is adjusted. When the application interface obtained after the display ratio is adjusted is projected onto the display of the external display device 200 for displaying, a display ratio on the display is also adjusted. In this way, the user may adjust, on the electronic device 100, a display ratio of an application interface that is projected onto the external display device 200 for displaying, so that the user can conveniently adjust a display effect of the interface of the application for projection, and user experience is improved.

Figures 1, 9A:
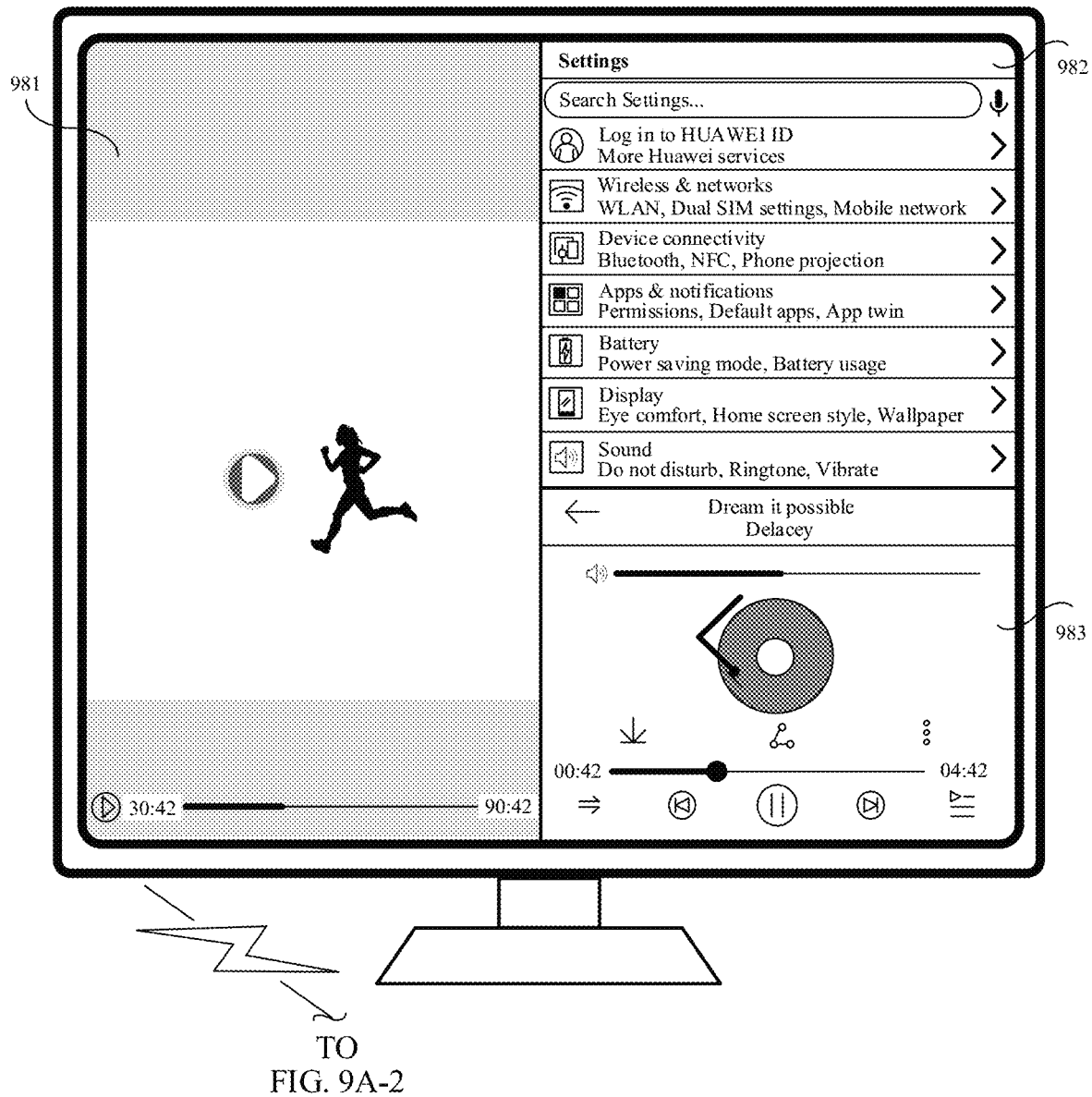
Figures 2, 9A:
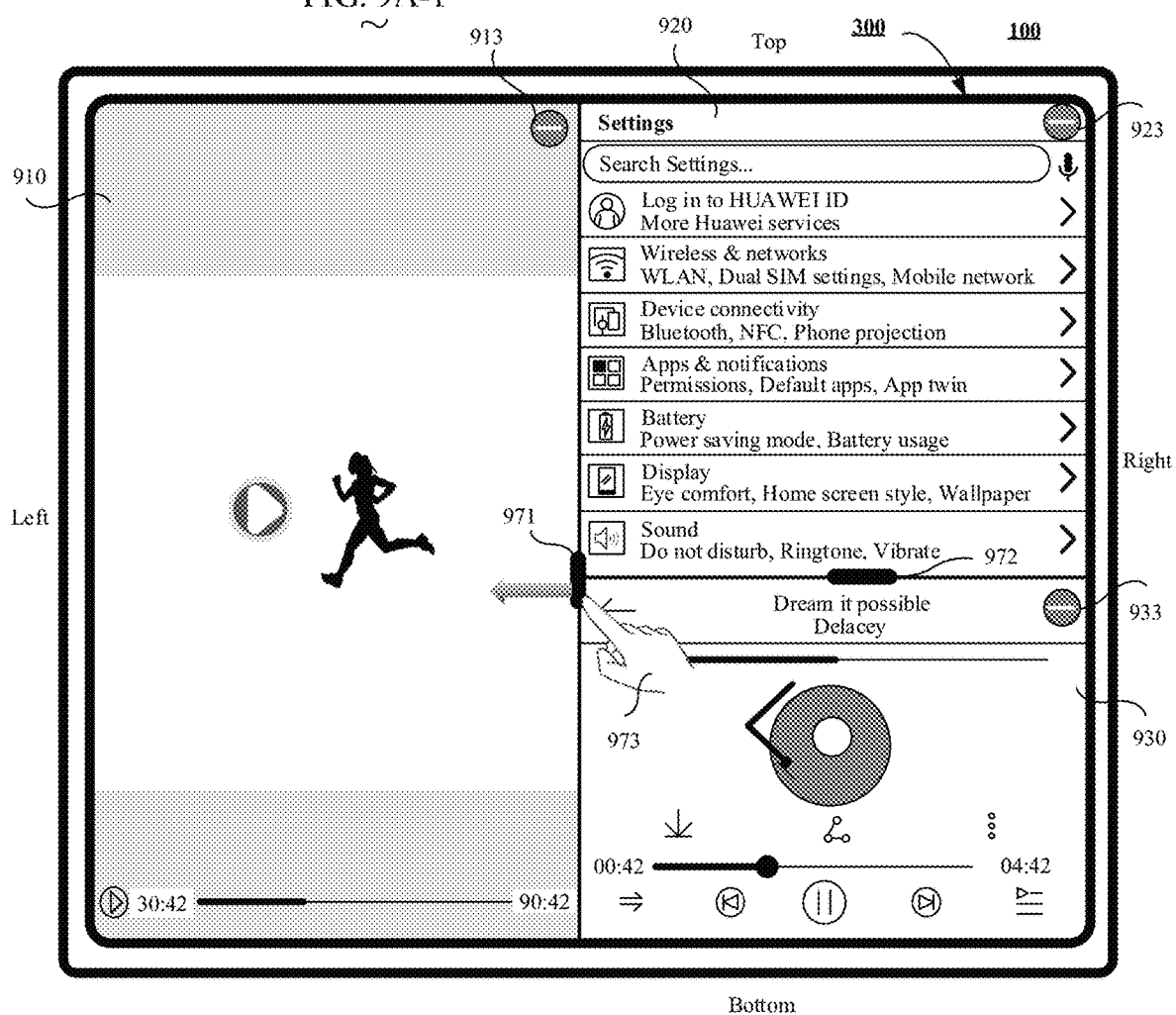

For example, as shown in FIG. 9A-1 and FIG. 9A-2, the electronic device 100 displays an application interface 910 of Video, an application interface 920 of Settings, and an application interface 930 of Music in different areas on the touchscreen 300. In addition, the electronic device 100 has projected the application interface 910 of Video, the application interface 920 of Settings, and the application interface 930 of Music onto the display of the external display device 200 for displaying. An application interface 981 of Video, an application interface 982 of Settings, and an application interface 983 of Music are displayed on the display of the external display device 200. Display content in the application interface 981 of Video is the same as display content in the application interface 910 of Video, display content in the application interface 982 of Settings is the same as display content in the application interface 920 of Video, and display content in the application interface 983 of Music is the same as display content in the application interface 930 of Music.

There are dividing lines at boundaries of the application interface 910 of Video, the application interface 920 of Settings, and the application interface 930 of Music on the touchscreen 300. The dividing lines may be used to receive an input operation (sliding left or right or sliding up or down) by the user, to adjust a display ratio of an application interface (including a width ratio in the left-right direction or a height ratio in the top-to-bottom direction). For example, as shown in FIG. 9A-1 and FIG. 9A-2, a dividing line 971 and a dividing line 972 divide the touchscreen 300 into three display areas. The application interface 910 of Video is displayed in a display area on the left of the dividing line 971, and the application interface 920 of Settings and the application interface 930 of Music are displayed in two display areas on the right of the dividing line 971. The two display areas on the right of the dividing line 971 are separated by the dividing line 972. The application interface 920 of Settings is displayed in a display area on the right of the dividing line 971 and above the dividing line 972, and the application interface 930 of Music is displayed in a display area on the right of the dividing line 971 and below the dividing line 972.

The electronic device 100 may receive an input operation 953 (for example, dragging the dividing line 971 to slide left by a distance) by the user on the dividing line 971. In response to the input operation 973, the electronic device 100 may adjust a width ratio of the application interface 910 of Video to be decreased in the left-right direction, and also adjust width ratios of the application interface 920 of Settings and the application interface 930 of Music to be increased in the left-right direction. After the electronic device 100 adjusts a display ratio of an application interface that is being projected and that is displayed on the touchscreen 300, a display ratio of an application interface displayed on the display of the external display device 200 is also adjusted.

Figures 1, 9B:
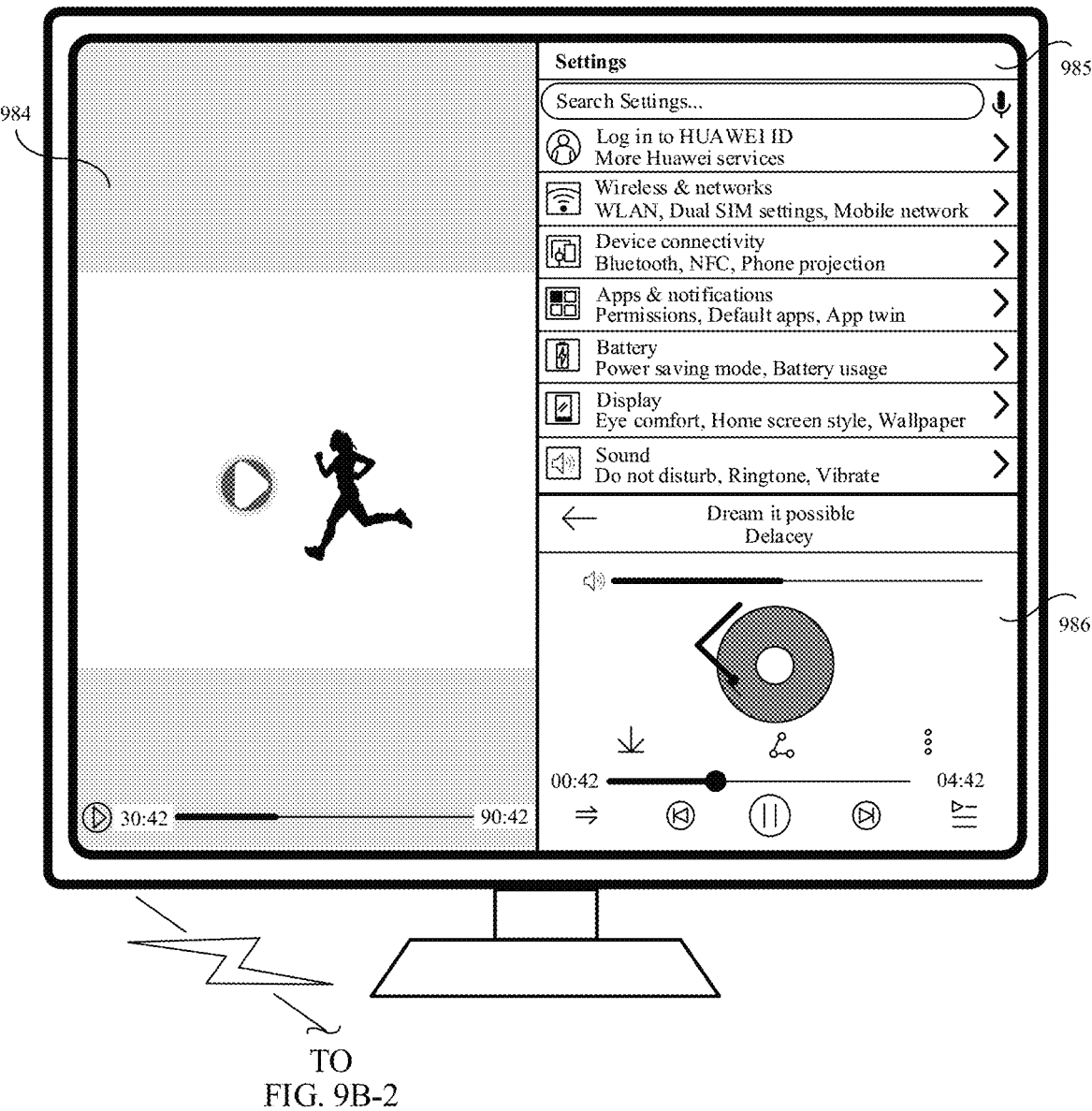
Figures 2, 9B:
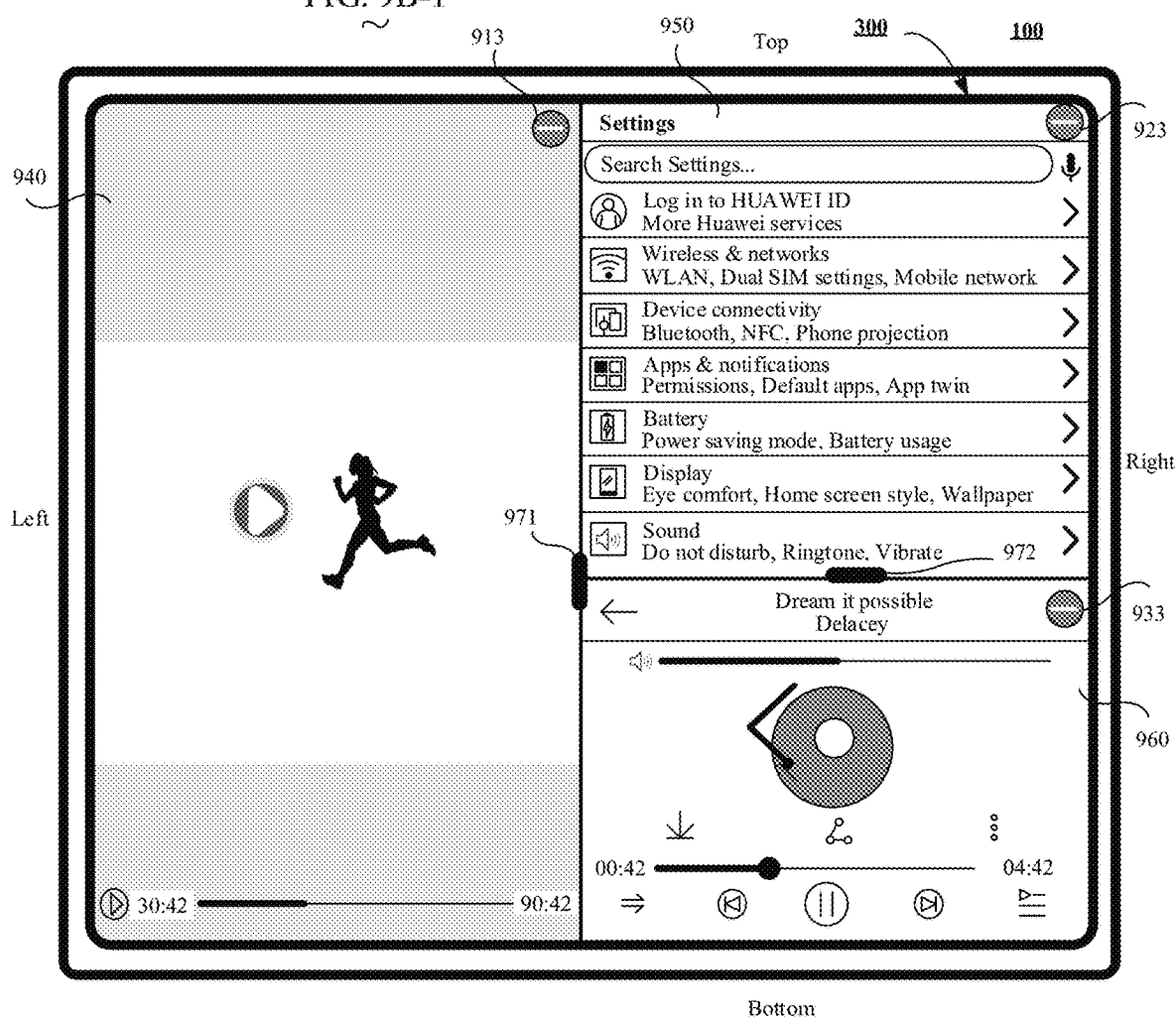

As shown in FIG. 9B-1 and FIG. 9B-2, the electronic device 100 displays an application interface 940 of Video, an application interface 950 of Settings, and an application interface 960 of Music in different areas on the touchscreen 300. A left-right width of the application interface 940 of Video is smaller than a left-right width of the application interface 910 of Video, a left-right width of the application interface 950 of Settings is greater than a left-right width of the application interface 920 of Settings, and a left-right width of the application interface 960 of Music is greater than a left-right width of the application interface 930 of Music. An application interface 984 of Video, an application interface 985 of Settings, and an application interface 986 of Music are displayed in different areas on the display of the external display device 200. A left-right width of the application interface 984 of Video is smaller than a left-right width of the application interface 981 of Video, a left-right width of the application interface 985 of Settings is greater than a left-right width of the application interface 982 of Settings, and a left-right width of the application interface 986 of Music is greater than a left-right width of the application interface 983 of Music.

The following describes a screen projection method procedure when the electronic device 100 split screen displays a plurality of application interfaces in the conventional technology.

Figure 10:
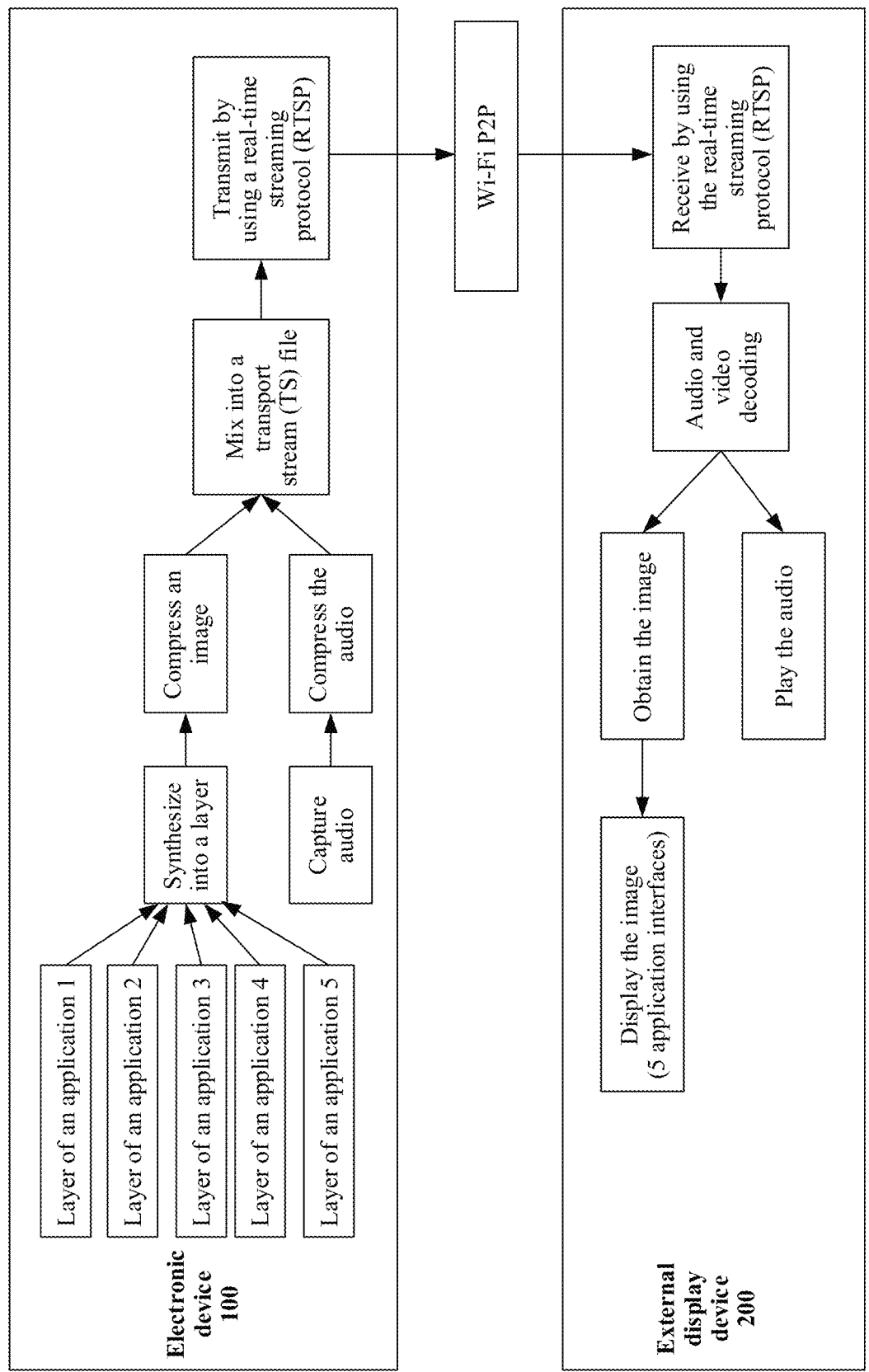
FIG. 10 is a schematic flowchart of a screen projection method in the conventional technology.

FIG. 10 is a schematic flowchart of a screen projection method according to a miracast protocol in the conventional technology. As shown in FIG. 10, an example in which the electronic device 100 displays five application interfaces in different areas on the touchscreen 300 is used for description.

1. The electronic device 100 obtains and synthesizes layers of all applications (an application 1, an application 2, an application 3, an application 4, and an application 5) displayed on the touchscreen 300, to obtain a final synthesized layer, and displays an image at the synthesized layer on the touchscreen 300. A display effect of the image at the synthesized layer may be that the electronic device 100 displays five application interfaces in different areas on the touchscreen 300.

2. After the electronic device 100 enables a screen projection function and establishes a connection to the external display device 200, the electronic device 100 may compress the image at the synthesized layer of all the applications displayed on the touchscreen 300 and audio that is being played by the electronic device 100.

A compression format of the image may be H.264, and the H.264 may also be referred to as MPEG-4 part 10, advanced video coding (MPEG-4 part 10, advanced video coding, MPEG-4 AVC). The electronic device 100 may compress the captured audio, where a compression format of the audio may be advanced audio coding (AAC).

3. The electronic device 100 mixes the compressed image in H.264 format and the compressed audio in AAC format into a transport stream (transport stream, TS) file, and transmits the TS file to the external display device 200 over Wi-Fi P2P by using a real-time streaming protocol (RTSP).

4. The external display device 200 may receive the TS file by using the real-time streaming protocol, and perform audio and video decoding on the TS file, to obtain an image stream of the synthesized layer and the audio from the TS file through decoding.

5. The external display device 200 may display the image at the synthesized layer on the display of the external display device 200. The five application interfaces (for example, an interface of the application 1, an interface of the application 2, an interface of the application 3, an interface of the application 4, and an interface of the application 5) are displayed on the display of the external display device 200. The external display device 200 may play the decoded audio by using an output apparatus of the external display device 200.

It can be learned from the foregoing that, when the electronic device 100 split-screen displays a plurality of application interfaces on the touchscreen 300, after the electronic device 100 enables the screen projection function, the electronic device 100 can only project, onto the display of the external display device 200 for displaying, all the application interfaces split-screen displayed on the touchscreen 300, and cannot project, onto the display of the external display device 200 for displaying, some selected application interfaces on the touchscreen 300. In this way, some application interfaces involving user privacy are also projected onto the display of the external display device 200 for displaying. This easily causes leakage of user privacy.

The following describes a screen projection method provided in the embodiments of this application.

Figure 11:
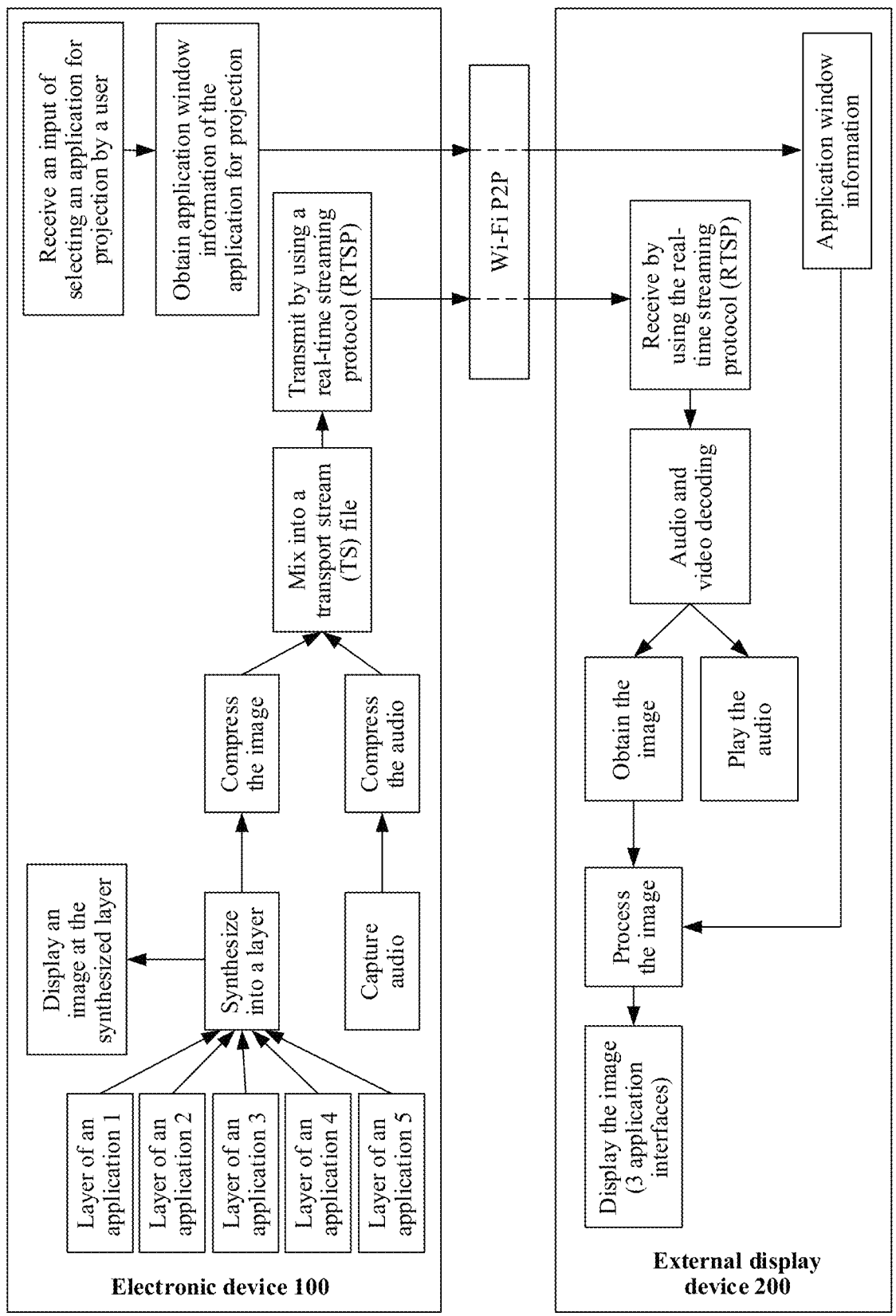
FIG. 11 is a schematic flowchart of a screen projection method according to an embodiment of this application.

FIG. 11 is a schematic flowchart of a screen projection method according to an embodiment of this application. As shown in FIG. 11, an example in which the electronic device 100 displays five application interfaces in different areas on the touchscreen 300 is used for description. For example, an application 1 may be Video, an application 2 may be Settings, an application 3 may be Music, an application 4 may be Gallery, and an application 5 may be Messages. As shown in FIG. 11, the method may include the following steps.

1. The electronic device 100 obtains and synthesizes layers of the five applications (Video, Settings, Music, Gallery, and Messages), to obtain a final synthesized layer, and displays an image at the synthesized layer on the touchscreen 300. A display effect of the image at the synthesized layer may be that the electronic device 100 displays the five application interfaces (for example, the application interface 410 of Video, the application interface 420 of Settings, the application interface 430 of Music, the application interface 440 of Gallery, and the application interface 450 of Messages in FIG. 4A-1 and FIG. 4A-2) in different areas on the touchscreen 300.

2. After the electronic device 100 enables a screen projection function and establishes a connection to the external display device 200, the electronic device 100 may capture the synthesized layer and audio that is being played by the electronic device 100. The electronic device 100 may compress the image at the synthesized layer. A compression format of the image at the synthesized layer may be H.264. The electronic device 100 may compress the captured audio, where a compression format of the audio may be advanced audio coding (advanced audio coding, AAC).

The compression format of the image is not limited to the H.264 format, or may be another image compression format. This is not limited herein. The compression format of the audio is not limited to the AAC format, or may be another audio compression format. This is not limited herein.

3. The electronic device 100 mixes a compressed image file and a compressed audio file into a transport stream (TS) file, and transmits the TS file to the external display device 200 over a Wi-Fi P2P network by using a real-time streaming protocol (RTSP).

The electronic device 100 and the external display device 200 may be connected over the Wi-Fi P2P network, or may be connected over a wired network. This is not limited herein. A protocol used to transmit the TS file by the electronic device 100 is not limited to the RTSP protocol, or may be another protocol. This is not limited herein.

4. The electronic device 100 may receive an input (for example, a combination operation of the input operation 412 on the projection add button 411 in FIG. 4E-1 and FIG. 4E-2, the input operation 422 on the projection add button 421 in FIG. 4F-1 and FIG. 4F-2, and the input operation 432 on the projection add button 431 in FIG. 4G-1 and FIG. 4G-2) of selecting an application for projection by the user. In response to the input of selecting an application for projection, the electronic device 100 may obtain application window information of applications for projection (for example, Video, Settings, and Music). For example, the electronic device 100 may obtain the application window information of the applications for projection by using a window manager service (WMS). After obtaining the application window information of the applications for projection, the electronic device 100 may send the application window information of the applications for projection to the external display device 200.

The application window information includes information such as a window position, a window size, and a window level of the application for projection. For example, as shown in FIG. 4A-1 and FIG. 4A-2, a window of Video is on the left on the touchscreen 300, a height of the window is the same as that of the touchscreen 300, a width of the window is one-third of a width of the touchscreen 300, and a level of the window is 22. The example is merely used to explain this application and shall not constitute a limitation.

5. The external display device 200 may receive the TS file by using the real-time streaming protocol, and perform audio and video decoding on the TS file, to obtain the image at the synthesized layer and the audio from the TS file through decoding.

6. The external display device 200 may crop, from the image at the synthesized layer based on the received application window information of the applications for projection, image areas in which windows of the applications for projection (for example, Video, Settings, and Music) are located, and splice these image areas, to synthesize into a to-be-projected image. The to-be-projected image includes window interfaces of the applications for projection (for example, Video, Settings, and Music).

7. The external display device 200 may display the projected image on the display of the external display device 200. At the same time, the external display device 200 may play the decoded audio by using an output apparatus.

For example, as shown in FIG. 4H-1 and FIG. 4H-2, the projected image is displayed on the display of the external display device 200. The projected image includes the application interface 510 of Video, the application interface 520 of Settings, and the application interface 530 of Music.

In a possible case, a layout of the one or more application interfaces displayed on the display of the external display device 200 is different from a layout of the one or more application interfaces displayed on the touchscreen 300. In other words, before projecting, onto the external display device 200, the one or more application interfaces displayed on the touchscreen 300, the electronic device 100 may change relative positions of the one or more application interfaces displayed on the display of the external display device 200, splice, into one to-be-projected image, the one or more application interfaces obtained after the layout is changed, and send the to-be-projected image to the external display device 200. The external display device 200 displays, on the display, the one or more application interfaces obtained after the layout is changed. For details, refer to the embodiments shown in FIG. 5B-1 and FIG. 5B-2 to FIG. 5E-1 and FIG. 5E-2. Details are not described herein again.

In this embodiment of this application, when the electronic device 100 displays the plurality of application interfaces in different areas on the touchscreen 300, the electronic device 100 obtains the application window information of the applications for projection selected by the user, and sends the application window information and the synthesized image of the plurality of application interfaces to the external display device 200. The application window information includes information such as a window position, a window size, and a window level of the application for projection. After receiving the application window information and the synthesized image of the plurality of application interfaces, the external display device 200 may crop interface images of the one or more applications for projection from the synthesized image based on the application window information, splice the interface images of the one or more applications for projection, and then display a spliced image on the display. In this way, the electronic device 100 can project, onto the display of the external display device 200, some of the plurality of application interfaces split screen displayed on the touchscreen 300. The screen projection method provided in this embodiment of this application ensures that an application interface that involves user privacy is projected only after the user agrees and confirms, and ensures user privacy.

Figure 12:
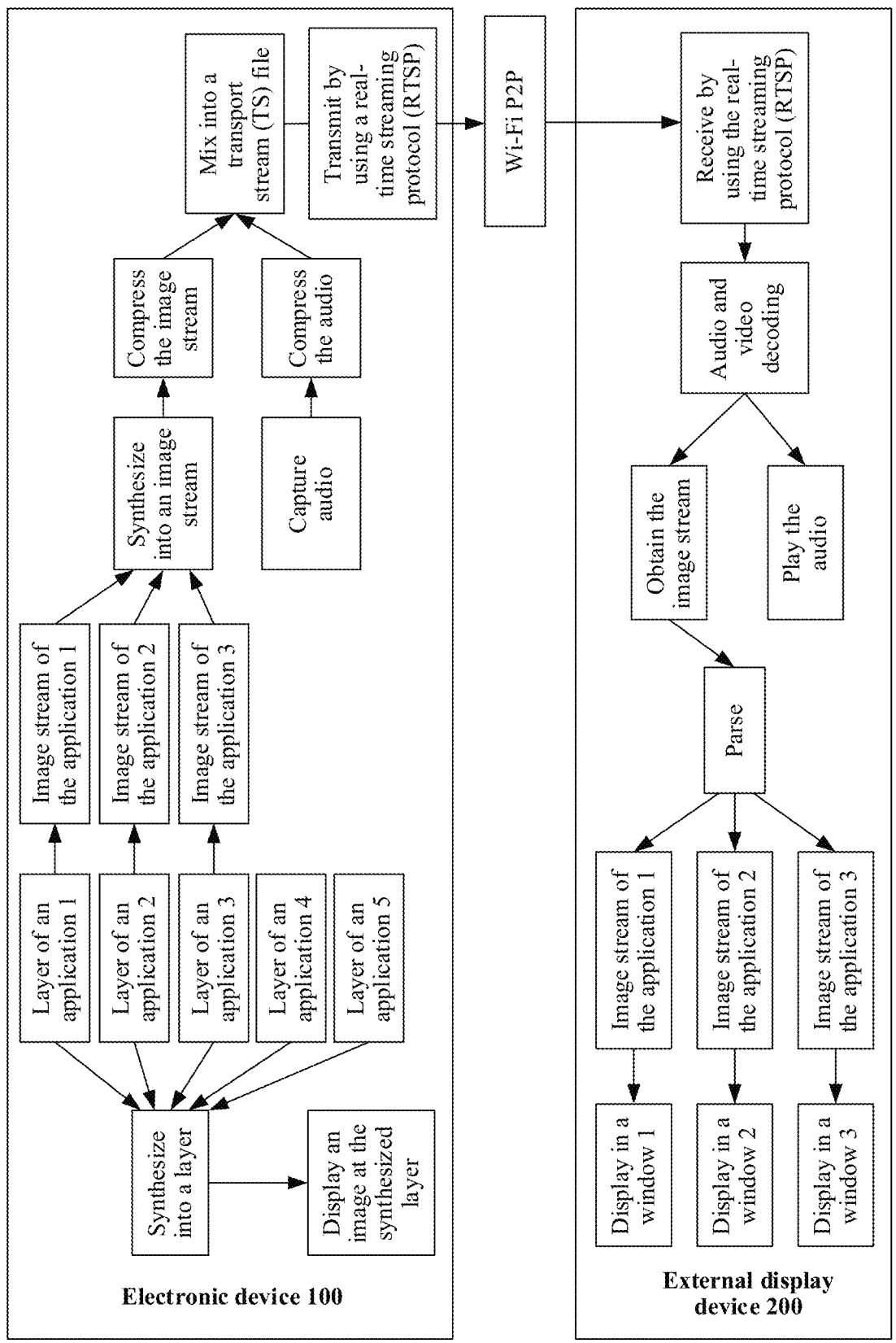
FIG. 12 is a schematic flowchart of a screen projection method according to another embodiment of this application.

FIG. 12 is a schematic flowchart of a screen projection method according to another embodiment of this application. As shown in FIG. 12, an example in which the electronic device 100 displays five application interfaces in different areas on the touchscreen 300 is used for description. For example, an application 1 may be Video, an application 2 may be Settings, an application 3 may be Music, an application 4 may be Gallery, and an application 5 may be Messages. As shown in FIG. 12, the method may include the following steps.

1. The electronic device 100 obtains and synthesizes layers of the five applications (Video, Settings, Music, Gallery, and Messages), to obtain a final synthesized layer, and displays an image at the synthesized layer on the touchscreen 300. A display effect of the image at the synthesized layer may be that the electronic device 100 displays the five application interfaces (for example, the application interface 410 of Video, the application interface 420 of Settings, the application interface 430 of Music, the application interface 440 of Gallery, and the application interface 450 of Messages in FIG. 4A-1 and FIG. 4A-2) in different areas on the touchscreen 300.

2. After the electronic device 100 enables a screen projection function and establishes a connection to the external display device 200, the electronic device 100 may receive an input (for example, a combination operation of the input operation 412 on the projection add button 411 in FIG. 4E-1 and FIG. 4E-2, the input operation 422 on the projection add button 421 in FIG. 4F-1 and FIG. 4F-2, and the input operation 432 on the projection add button 431 in FIG. 4G-1 and FIG. 4G-2) of selecting an application for projection by the user. In response to the input of selecting an application for projection, the electronic device 100 may capture layers of the applications for projection (for example, Video, Settings, and Music) and obtain image streams of the applications for projection from the layers of the applications for projection. Then, the electronic device 100 may synthesize image streams of the plurality of applications for projection into one image stream. The electronic device 100 may capture and compress audio that is being played by the electronic device 100.

For example, the applications for projection may include Video, Settings, and Music, and the electronic device 100 may capture a layer of Video, a layer of Settings, and a layer of Music. Then, the electronic device 100 obtains an image stream of Video from the layer of Video, obtains an image stream of Settings from the layer of Settings, and obtains an image stream of Music from the layer of Music. Then, the electronic device 100 may synthesize the image stream of Video, the image stream of Settings, and the image stream of Music into one image stream, and perform image stream compression on the synthesized image stream. The example is merely used to explain this application and shall not constitute a limitation.

A compression format of the image may be H.264, but is not limited to H.264, or may be another image compression format. A compression format of the audio may be advanced audio coding (AAC), but is not limited to the AAC format, or may be another audio compression format.

3. The electronic device 100 mixes the compressed image in H.264 format and compressed audio in AAC format into a transport stream (TS) file, and transmits the TS file to the external display device 200 over a Wi-Fi P2P network by using a real-time streaming protocol (RTSP).

The electronic device 100 and the external display device 200 may be connected over the Wi-Fi P2P network, or may be connected over a wired network. This is not limited herein. A protocol used to transmit the TS file by the electronic device 100 is not limited to the RTSP protocol, or may be another protocol. This is not limited herein.

4. The external display device 200 may receive the TS file by using the real-time streaming protocol, and perform audio and video decoding on the TS file, to obtain the synthesized image stream and the audio from the TS file through decoding.

5. The external display device 200 may obtain, through parsing, the image streams (for example, the image stream of Video, the image stream of Settings, and the image stream of Music) of the plurality of applications for projection from the synthesized image stream.

6. The external display device 200 may display the obtained image streams of the plurality of applications for projection in respective windows (which may also be referred to as display areas) corresponding to the applications for projection on the display. For example, the external device 200 may display the image stream of Video in a window 1 on the display, display the image stream of Settings in a window 2 on the display, and display the image stream of Music in a window 3 on the display. At the same time, the external display device 200 may play the decoded audio by using an output apparatus.

The external display device 200 may divide, according to a quantity of applications for projection, the display into windows (which may also be referred to as display areas) of a quantity the same as the quantity of applications for projection. In a possible case, a window position of each application for projection on the display of the external display device 200 may be the same as a window position of each application for projection on the touchscreen 300 of the electronic device 100. For details, refer to FIG. 4F-1 and FIG. 4F-2 to FIG. 4I-1 and FIG. 4I-2. Details are not described herein again.

In a possible case, a window position of each application for projection on the display of the external display device 200 may be different from a window position of each application for projection on the touchscreen 300 of the electronic device 100. For details, refer to FIG. 5B-1 and FIG. 5B-2 to FIG. 5F-1 and FIG. 5F-2. Details are not described herein again.

In this embodiment of this application, when the electronic device 100 displays the plurality of application interfaces in different areas on the touchscreen 300, the electronic device 100 captures the layers of the applications for projection selected by the user, and obtains the image streams of the applications for projection. Then, the electronic device 100 may synthesize the image streams of the applications for projection into one image stream. The electronic device 100 sends the compressed image stream to the external display device 200. After receiving the synthesized image stream, the external display device 200 may parse the synthesized image stream to obtain the image stream of each application for projection, and display the image stream in the corresponding window of each application for projection. In this way, the electronic device 100 can project, onto the display of the external display device 200, some of the plurality of application interfaces split screen displayed on the touchscreen 300. The screen projection method provided in this embodiment of this application ensures that an application interface that involves user privacy is projected only after the user agrees and confirms, and ensures user privacy.

Figure 13:
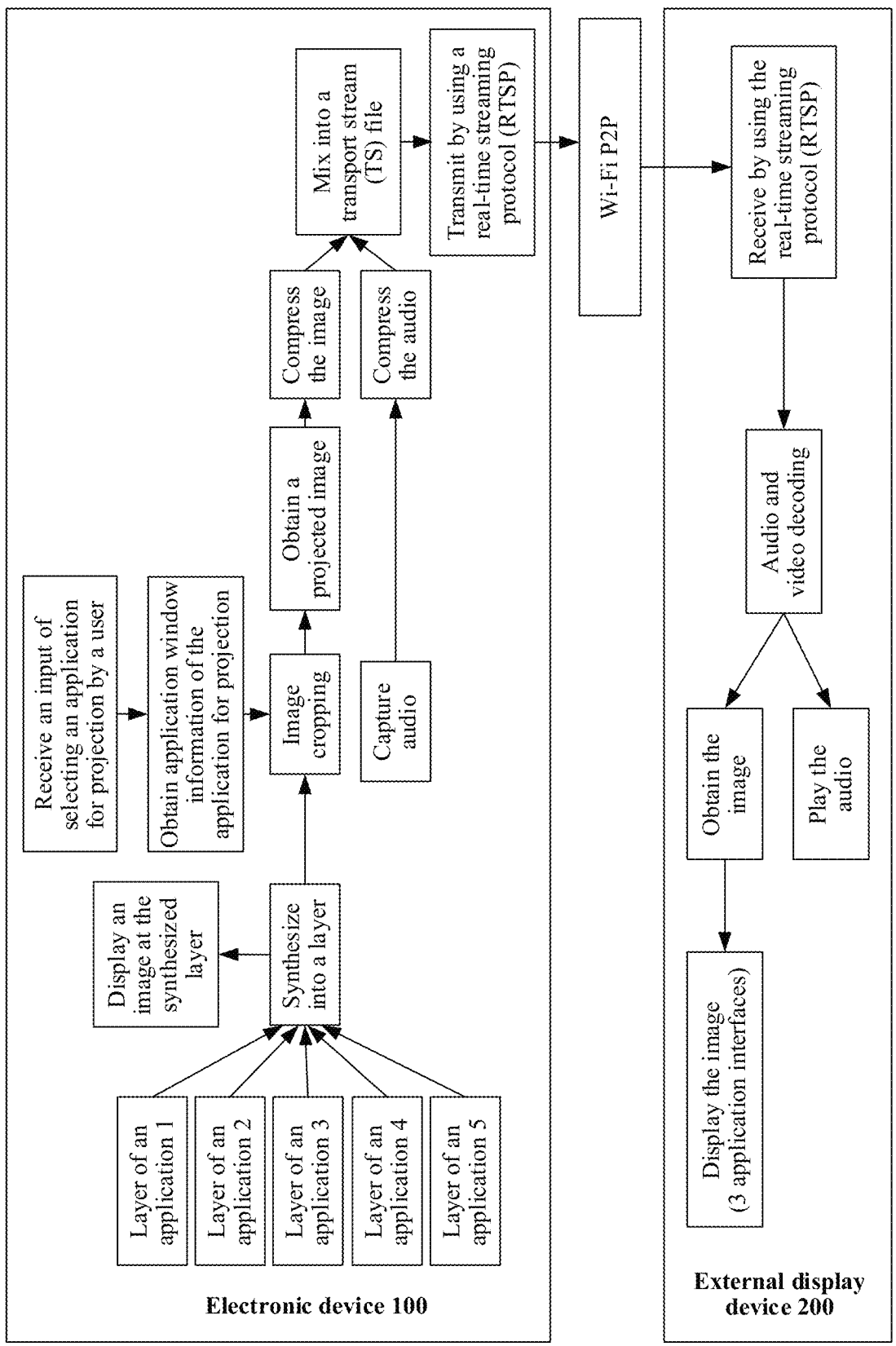
FIG. 13 is a schematic flowchart of a screen projection method according to another embodiment of this application.

FIG. 13 is a schematic flowchart of a screen projection method according to another embodiment of this application. As shown in FIG. 13, an example in which the electronic device 100 displays five application interfaces in different areas on the touchscreen 300 is used for description. For example, an application 1 may be Video, an application 2 may be Settings, an application 3 may be Music, an application 4 may be Gallery, and an application 5 may be Messages. As shown in FIG. 13, the method may include the following steps.

1. The electronic device 100 obtains and synthesizes layers of the five applications (Video, Settings, Music, Gallery, and Messages), to obtain a final synthesized layer, and displays an image at the synthesized layer on the touchscreen 300. A display effect of the image at the synthesized layer may be that the electronic device 100 displays the five application interfaces (for example, the application interface 410 of Video, the application interface 420 of Settings, the application interface 430 of Music, the application interface 440 of Gallery, and the application interface 450 of Messages in FIG. 4A-1 and FIG. 4A-2) in different areas on the touchscreen 300.

2. After the electronic device 100 enables a screen projection function and establishes a connection to the external display device 200, the electronic device 100 may capture the synthesized layer and audio that is being played by the electronic device 100.

3. The electronic device 100 may receive an input (for example, a combination operation of the input operation 412 on the projection add button 411 in FIG. 4E-1 and FIG. 4E-2, the input operation 422 on the projection add button 421 in FIG. 4F-1 and FIG. 4F-2, and the input operation 432 on the projection add button 431 in FIG. 4G-1 and FIG. 4G-2) of selecting an application for projection by the user. In response to the input of selecting an application for projection, the electronic device 100 may obtain application window information of applications for projection (for example, Video, Settings, and Music). For example, the electronic device 100 may obtain the application window information of the applications for projection by using a window manager service (window manager service, WMS).

The application window information includes information such as a window (which may also be referred to as a window interface of an application) position, a window size, and a window level of the application for projection. For example, as shown in FIG. 4A-1 and FIG. 4A-2, a window of Video is on the left on the touchscreen 300, a height of the window is the same as that of the touchscreen 300, a width of the window is one-third of a width of the touchscreen 300, and a level of the window is 22. The example is merely used to explain this application and shall not constitute a limitation.

4. The electronic device 100 may crop, from the image at the synthesized layer based on the application window information, image areas in which windows of the applications for projection (for example, Video, Settings, and Music) are located, and splice these image areas, to synthesize into a to-be-projected image. The to-be-projected image includes window interfaces of the applications for projection (for example, Video, Settings, and Music).

5. The electronic device 100 may compress the to-be-projected image. A compression format of the to-be-projected image may be H.264. The electronic device 100 may compress the captured audio, where a compression format of the audio may be advanced audio coding (AAC).

The compression format of the to-be-projected image is not limited to the H.264 format, or may be another image compression format. This is not limited herein. The compression format of the audio is not limited to the AAC format, or may be another audio compression format. This is not limited herein.

6. The electronic device 100 mixes a compressed image file and a compressed audio file into a transport stream (TS) file, and transmits the TS file to the external display device 200 over a Wi-Fi P2P network by using a real-time streaming protocol (RTSP).

The electronic device 100 and the external display device 200 may be connected over the Wi-Fi P2P network, or may be connected over a wired network. This is not limited herein. A protocol used to transmit the TS file by the electronic device 100 is not limited to the RTSP protocol, or may be another protocol. This is not limited herein.

7. The external display device 200 may receive the TS file by using the real-time streaming protocol, and perform audio and video decoding on the TS file, to obtain the to-be-projected image and the audio from the TS file through decoding.

8. The external display device 200 may display the projected image on the display of the external display device 200. At the same time, the external display device 200 may play the decoded audio by using an output apparatus.

For example, as shown in FIG. 4H-1 and FIG. 4H-2, the projected image is displayed on the display of the external display device 200. The projected image includes the application interface 510 of Video, the application interface 520 of Settings, and the application interface 530 of Music.

In this embodiment of this application, when the electronic device 100 displays the plurality of application interfaces in different areas on the touchscreen 300, the electronic device 100 obtains the application window information of the applications for projection selected by the user, crops an image area of each application for projection from the synthesized image of the plurality of application interfaces based on the application window information, and then splices the image areas of the applications for projection to synthesize into the to-be-projected image. The electronic device 100 sends the to-be-projected image to the external display device 200, and the external display device 200 may receive the to-be-projected image according to an existing miracast projection protocol process, and display the to-be-projected image on the display. In this way, the electronic device 100 can project, onto the display of the external display device 200, some of the plurality of application interfaces split screen displayed on the touchscreen 300. The screen projection method provided in this embodiment of this application ensures that an application interface that involves user privacy is projected only after the user agrees and confirms, and ensures user privacy.

Figure 14:
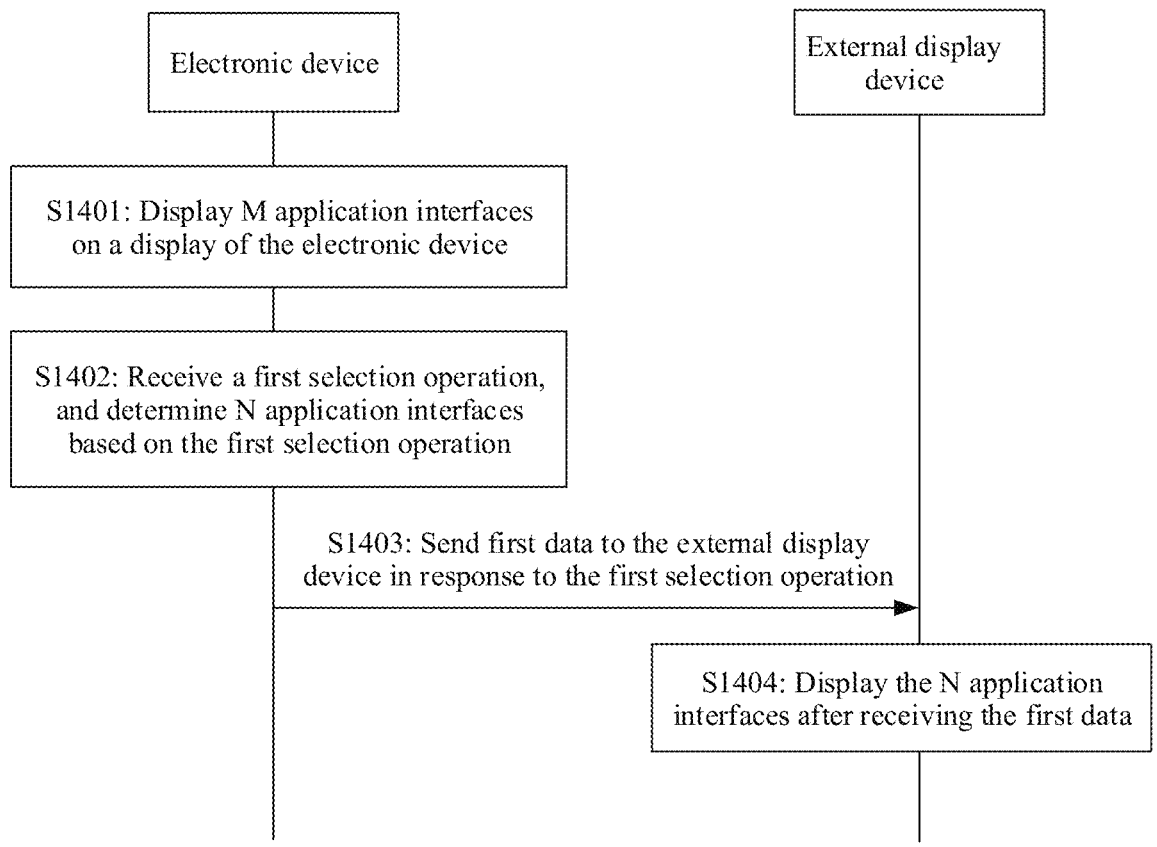
FIG. 14 is a schematic flowchart of a screen projection method according to another embodiment of this application.

FIG. 14 is a schematic flowchart of a screen projection method according to an embodiment of this application.

As shown in FIG. 14, the method may include the following steps.

S1401: An electronic device displays M application interfaces on a display of the electronic device. M is an integer greater than 1.

In an example of this application, the display of the electronic device is the touchscreen 300 in the foregoing embodiments.

For example, reference may be made to the embodiment shown in FIG. 4A-1 and FIG. 4A-2. The electronic device displays five application interfaces in different areas on the touchscreen 300. For details, refer to the embodiment shown in FIG. 4A-1 and FIG. 4A-2. Details are not described herein again.

S1402: The electronic device receives a first selection operation, and determines N application interfaces based on the first selection operation, where the first selection operation is performed on the electronic device to determine the N application interfaces from the M application interfaces, and N is a positive integer less than or equal to M.

In a possible implementation, that the electronic device receives a first selection operation may specifically include: The electronic device receives a first input. In response to the first input, the electronic device displays M projection add controls on the display, where the M projection add controls one-to-one correspond to the M application interfaces. The electronic device receives a second input used by a user to trigger N of the M projection add controls. The electronic device determines, based on the second input, the N application interfaces selected by the user, and sends, to the external display device, first data used to display the N application interfaces.

For example, the first input may be the input operation 472 (for example, tapping) on the projection device option 471 in the embodiment shown in FIG. 4D-1 and FIG. 4D-2. As shown in FIG. 4E-1 and FIG. 4E-2, the electronic device may display one projection add control in each application interface on the touchscreen. The second input that triggers the projection add control may be the input operation on the projection add control 411 and/or the projection add control 421 and/or the projection add control 431 and/or the projection add control 441 and/or the projection add control 451 in FIG. 4E-1 and FIG. 4E-2. After the projection add button is triggered by the user, the electronic device may project an application interface corresponding to the projection add button to an external display device for displaying. For details, refer to the embodiments shown in FIG. 4E-1 and FIG. 4E-2 to FIG. 4I-2 and FIG. 4I-2. Details are not described herein again.

In a possible implementation, in response to the first input, the electronic device may display M projection add controls and an OK button on the display. After receiving a second input used by a user to trigger N of the M projection add controls, the electronic device may further receive a third input used by the user to trigger the OK button. The electronic device determines, based on the second input, the N application interfaces selected by the user. In response to the third input, the electronic device may send, to the external display device, the first data used to display the N application interfaces. In this way, the user can be prevented from accidentally touching a projection add control, to prevent the user from mistakenly projecting an application interface corresponding to the projection add control onto the external display device for displaying. This improves user experience.

For example, as shown in FIG. 4E-1 and FIG. 4E-2, after the electronic device receives the input operation 412 (for example, tapping) on the projection add control 411, the electronic device may further tap an OK button (which is not shown in FIG. 4E-1 and FIG. 4E-2, a display position of the OK button on the display of the electronic device is not limited). In response to the tapping operation on the OK button, the electronic device projects the application interface 410 of Video corresponding to the projection add control 411 onto the external display device for displaying.

In a possible implementation, after any projection add control is triggered, the electronic device displays a projection cancel control corresponding to the projection add control, where the projection cancel control is used by the user to cancel projection of an application interface corresponding to the projection cancel control. The electronic device receives a fourth input used by the user to trigger the projection cancel control. In response to the fourth input, the electronic device stops sending, to the external display device, image data of the application interface corresponding to the projection cancel control. In this way, the electronic device can stop projection of an application interface onto the external display device at any time according to a user requirement, to improve user experience.

For example, as shown in FIG. 4H-1, FIG. 4H-2, FIG. 4I-1, and FIG. 4I-2, after the projection add control 441 is triggered, the electronic device may display the projection cancel control 443 corresponding to the projection add control 441. As shown in FIG. 4J-1 and FIG. 4J-2, after the projection cancel control 443 is triggered, the electronic device may stop projecting the application interface 440 of Gallery corresponding to the projection cancel control 443 onto the external display device for displaying. For details, refer to the embodiments shown in FIG. 4H-1 and FIG. 4H-2 to FIG. 4J-1 and FIG. 4J-2. Details are not described herein again.

In a possible implementation, that the electronic device receives a first selection operation may specifically include: The electronic device receives a fifth input. In response to the fifth input, the electronic device displays a shortcut menu on the display, where the shortcut menu includes M options, and the M options one-to-one correspond to the M application interfaces. The electronic device receives a sixth input used to select N of the M options. The electronic device determines, based on the sixth input, the N application interfaces selected by a user, and sends, to the external display device, the first data used to display the N application interfaces. In this way, the electronic device can select, based on the input operation of the user, the one or more application interfaces from the plurality of application interfaces displayed on the display of the electronic device, and project the one or more application interfaces onto the external display device 200, to ensure that an application interface involving user privacy is projected only after the user agrees and confirms. This ensures user privacy.

For example, the fifth input may be the input operation 472 on the projection device option 471 in FIG. 4D-1 and FIG. 4D-2. The shortcut menu may be shown in the application selection window 610 in FIG. 6A-1 and FIG. 6A-2. The application selection window 610 includes a plurality of application options. The five application options in the application selection window 610 one-to-one correspond to the five application interfaces displayed on the touchscreen 300. The sixth input may be an input operation on the application option 611 of Video and/or the application option 612 of Settings and/or the application option 613 of Music and/or the application option 614 of Gallery and/or the application option 615 of Messages in FIG. 6B-1 and FIG. 6B-2. In response to the sixth input, the electronic device may determine the N application interfaces selected by the user, and send, to the external display device, the first data used to display the N application interfaces. The foregoing examples are merely used to explain this application, and shall not constitute a limitation.

In a possible implementation, the shortcut menu may include the M options and an OK button. After the electronic device receives a sixth input used to select N of the M options, the electronic device may further receive a seventh input used by the user to trigger the OK button. The electronic device may determine, based on the sixth input, the N application interfaces selected by the user. In response to the seventh input, the electronic device may send, to the external display device, the first data used to display the N application interfaces. In this way, after the user selects the N options, the electronic device projects the N application interfaces corresponding to the N options onto the external display device for displaying only after the user confirms. This prevents the user from mistakenly selecting an application interface for projection, and ensures user privacy.

For example, as shown in FIG. 6B-1, FIG. 6B-2, FIG. 6C-1, and FIG. 6C-2, after receiving the sixth input (the input operation 631, the input operation 632, the input operation 633, and the input operation 634) of selecting the N application options (the application option 611 of Video, the application option 612 of Settings, the application option 613 of Music, and the application option 614 of Gallery) by the user, the electronic device may further receive the seventh input (for example, tapping) by the user on the OK button 616. In response to the seventh input on the OK button 616, the electronic device may determine the N application interfaces selected by the user, and send, to the external display device, the first data used to display the N application interfaces. The foregoing examples are merely used to explain this application, and shall not constitute a limitation.

S1403: The electronic device sends the first data to the external device in response to the first selection operation.

In a possible implementation, the first data includes a to-be-projected image including the N application interfaces. Before the electronic device sends the first data to the external display device, the electronic device may further obtain a synthesized image of the M application interfaces and first display information (namely, the application window information in the embodiment shown in FIG. 13) of the N application interfaces, where the first display information includes sizes, positions, and display levels of respective display windows of the N application interfaces. The electronic device crops the to-be-projected image from the synthesized image of the M application interfaces based on the first display information of the N application interfaces. For details, refer to the embodiment shown in FIG. 13. Details are not described herein again.

In a possible implementation, before the electronic device sends the first data to the external display device, the electronic device obtains a synthesized image of the M application interfaces and first display information (namely, the application window information in the embodiment shown in FIG. 11) of the N application interfaces. The first data includes the synthesized image of the M application interfaces and the first display information of the N application interfaces, the first display information includes sizes, positions, and display levels of respective display windows of the N application interfaces, and the first display information is used by the external display device to crop, from the synthesized image of the M application interfaces, an image including the N application interfaces and display the image. For details, refer to the embodiment shown in FIG. 11. Details are not described herein again.

In a possible implementation, the first data includes respective image data streams of the N application interfaces, and is used by the external display device to display the N application interfaces in N display windows in a one-to-one correspondence. Before the electronic device sends the first data to the external display device, the electronic device may further obtain the respective image data streams of the N application interfaces. For details, refer to the embodiment shown in FIG. 12. Details are not described herein again.

S1404: The external display device displays the N application interfaces after receiving the first data.

For example, for displaying the N application interfaces by the external display device, refer to the foregoing embodiments shown in FIG. 4F-1 and FIG. 4F-2 to FIG. 4I-1 and FIG. 4I-2, or refer to the foregoing embodiments shown in FIG. 5B-1 and FIG. 5B-2 to FIG. 5F-1 and FIG. 5F-2. Details are not described herein again.

According to the screen projection method provided in this embodiment of this application, when a plurality of application interfaces are displayed on the display (namely, the touchscreen 300) of the electronic device, the electronic device may receive a selection operation of the user, and project one or more application interfaces selected by the user onto the external display device for displaying. In this way, the electronic device can project, based on the selection operation of the user onto the external display device for displaying, the one or more application interfaces selected by the user on the display of the electronic device. This ensures that an application interface involving user privacy is projected only after the user agrees and confirms, to ensure user privacy and improve user experience.

In a possible implementation, the first data includes a to-be-projected image including the N application interfaces. Before the electronic device sends the first data to the external display device, the electronic device may further obtain a synthesized image of the M application interfaces and first display information of the N application interfaces, where the first display information includes sizes, positions, and display levels of respective display windows of the N application interfaces. The electronic device crops the to-be-projected image from the synthesized image of the M application interfaces based on the first display information of the N application interfaces.

In a possible implementation, the first data includes the synthesized image of the M application interfaces and the first display information of the N application interfaces, the first display information includes sizes, positions, and display levels of respective display windows of the N application interfaces, and the first display information is used by the external display device to crop, from the synthesized image of the M application interfaces, an image including the N application interfaces and display the image.

Before the electronic device sends the first data to the external display device, the method further includes:

The electronic device obtains the synthesized image of the M application interfaces and the first display information of the N application interfaces.

In a possible implementation, the first data includes respective image data streams of the N application interfaces, and is used by the external display device to display the N application interfaces in N display windows in a one-to-one correspondence. Before the electronic device sends the first data to the external display device, the electronic device may further obtain the respective image data streams of the N application interfaces.

In a possible implementation, that the electronic device receives a first selection operation may specifically include: The electronic device receives a fifth input. In response to the fifth input, the electronic device displays a shortcut menu on the display, where the shortcut menu includes M options, and the M options one-to-one correspond to the M application interfaces. The electronic device receives a sixth input used to select N of the M options. In response to the fifth input, the electronic device determines the N application interfaces selected by the user, and sends, to the external display device, the first data used to display the N application interfaces.

In a possible implementation, the shortcut menu may include the M options and an OK button. After the electronic device receives the sixth input used to select N of the M options, the electronic device may further receive a seventh input on the OK button. In response to the seventh input, the electronic device may determine the N application interfaces selected by the user, and send, to the external display device, the first data used to display the N application interfaces.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A screen projection method, comprising:
displaying, by an electronic device, M application interfaces on a display of the electronic device, wherein M is an integer greater than 1;
receiving a first selection operation, and determining N application interfaces based on the first selection operation, wherein the first selection operation is performed on the electronic device to determine the N application interfaces selected from the M application interfaces, and N is a positive integer less than or equal to M; and
sending first data to an external display device in response to the first selection operation, wherein the first data is used by the external display device to display the N application interfaces, and wherein the first data comprises respective image data streams of the N application interfaces, and is used by the external display device to display the N application interfaces in N display windows in a one-to-one correspondence; and before the sending, by the electronic device, of the first data to the external display device, the method further comprises:
obtaining, by the electronic device, the respective image data streams of the N application interfaces.

2. The method according to claim 1, wherein the first data comprises a to-be-projected image comprising the N application interfaces; and
before the sending first data to an external display device, the method further comprises:
obtaining a synthesized image of the M application interfaces and first display information of the N application interfaces, wherein the first display information comprises sizes, positions, and display levels of respective display windows of the N application interfaces; and
cropping the to-be-projected image from the synthesized image of the M application interfaces based on the first display information of the N application interfaces.

3. The method according to claim 1, wherein the first data comprises a synthesized image of the M application interfaces and first display information of the N application interfaces, the first display information comprises sizes, positions, and display levels of respective display windows of the N application interfaces, and the first display information is used by the external display device to crop, from the synthesized image of the M application interfaces, an image comprising the N application interfaces and display the image; and
before the sending, by the electronic device, first data to an external display device, the method further comprises:
obtaining, by the electronic device, the synthesized image of the M application interfaces and the first display information of the N application interfaces.

4. The method according to claim 1, wherein the receiving, by the electronic device, a first selection operation comprises:
receiving, by the electronic device, a first input;
in response to the first input, displaying, by the electronic device, M projection add controls on the display, wherein the M projection add controls respectively correspond to the M application interfaces;
receiving a second input from a user to trigger N of the M projection add controls; and
the sending first data to an external display device in response to the first selection operation is:
determining, based on the second input, the N application interfaces selected by the user, and sending, to the external display device, the first data used to display the N application interfaces.

5. The method according to claim 1, wherein the receiving a first selection operation comprises:
receiving, by the electronic device, a first input;
in response to the first input, displaying, by the electronic device, M projection add controls and an OK button on the display, wherein the M projection add controls one-to-one correspond to the M application interfaces;
receiving a second input from a user to trigger N of the M projection add controls;
receiving a third input from the user to trigger the OK button; and
the sending first data to an external display device in response to the first selection operation is:
determining, by the electronic device based on the second input, the N application interfaces selected by the user; and in response to the third input, sending, by the electronic device to the external display device, the first data used to display the N application interfaces.

6. The method according to claim 4, wherein the method further comprises:
after any projection add control is triggered, displaying, by the electronic device, a projection cancel control corresponding to the projection add control, wherein the projection cancel control is used by the user to cancel projection of an application interface corresponding to the projection cancel control;
receiving, by the electronic device, a fourth input from the user to trigger the projection cancel control; and
in response to the fourth input, stopping, by the electronic device, sending, to the external display device, image data of the application interface corresponding to the projection cancel control.

7. The method according to claim 1, wherein the receiving a first selection operation comprises:
receiving, by the electronic device, a fifth input;
in response to the fifth input, displaying, by the electronic device, a shortcut menu on the display, wherein the shortcut menu comprises M options, and the M options one-to-one correspond to the M application interfaces;
receiving, by the electronic device, a sixth input used to select N of the M options; and
the sending first data to an external display device in response to the first selection operation is:
determining, by the electronic device based on the sixth input, the N application interfaces selected by a user, and sending, to the external display device, the first data used to display the N application interfaces.

8. The method according to claim 1, wherein the receiving a first selection operation comprises:
receiving, by the electronic device, a fifth input;
in response to the fifth input, displaying, by the electronic device, a shortcut menu on the display, wherein the shortcut menu comprises M options and an OK button, and the M options respectively correspond to the M application interfaces;
receiving, by the electronic device, a sixth input used to select N of the M options;
receiving, by the electronic device, a seventh input from a user to trigger the OK button; and
the sending, by the electronic device, first data to an external display device in response to the first selection operation comprises:
determining, by the electronic device based on the sixth input, the N application interfaces selected by the user; and
in response to the seventh input, sending, by the electronic device to the external display device, the first data used to display the N application interfaces.

9. An electronic device, comprising a memory, a display, and at least one processor, wherein the memory stores program code; the memory, the display, and the at least one processor communicate with each other; and the processor runs the code to instruct the electronic device to perform the following operations:
displaying M application interfaces on a display of the electronic device, wherein M is an integer greater than 1;
receiving a first selection operation, and determining N application interfaces based on the first selection operation, wherein the first selection operation is performed to determine the N application interfaces among the M application interfaces, and N is a positive integer less than or equal to M; and
sending first data to an external display device in response to the first selection operation, wherein the first data is used by the external display device to display the N application interfaces, and wherein the first data comprises respective image data streams of the N application interfaces, and is used by the external display device to display the N application interfaces in N display windows in a one-to-one correspondence; and
before the sending, by the electronic device, of the first data to the external display device, the method further comprises:
obtaining, by the electronic device, the respective image data streams of the N application interfaces.

10. A non-transitory computer readable medium, comprising computer instructions, wherein when the computer instructions are run on an electronic device, the electronic device is enabled to perform:
displaying M application interfaces on a display of the electronic device, wherein M is an integer greater than 1;
receiving a first selection operation, and determining N application interfaces based on the first selection operation, wherein the first selection operation is performed to determine the N application interfaces among the M application interfaces, and N is a positive integer less than or equal to M; and
sending first data to an external display device in response to the first selection operation, wherein the first data is used by the external display device to display the N application interfaces, and wherein the first data comprises respective image data streams of the N application interfaces, and is used by the external display device to display the N application interfaces in N display windows in a one-to-one correspondence; and
before the sending, by the electronic device, of the first data to the external display device, the method further comprises:
obtaining, by the electronic device, the respective image data streams of the N application interfaces.

11. The method according to claim 5, wherein the method further comprises:
after any projection add control is triggered, displaying a projection cancel control corresponding to the projection add control, wherein the projection cancel control is used to cancel projection of an application interface corresponding to the projection cancel control;
receiving, by the electronic device, a fourth input for triggering the projection cancel control; and
in response to the fourth input, stopping sending to the external display device image data of the application interface corresponding to the projection cancel control.

12. The electronic device according to claim 9, wherein the first data comprises a to-be-projected image comprising the N application interfaces; and
before sending the first data to an external display device, the electronic device further performs the following operation:
obtaining a synthesized image of the M application interfaces and first display information of the N application interfaces, wherein the first display information comprises sizes, positions, and display levels of respective display windows of the N application interfaces; and cropping the to-be-projected image from the synthesized image of the M application interfaces based on the first display information of the N application interfaces.

13. The electronic device according to claim 9, wherein the first data comprises a synthesized image of the M application interfaces and first display information of the N application interfaces, the first display information comprises sizes, positions, and display levels of respective display windows of the N application interfaces, and the first display information is used by the external display device to crop, from the synthesized image of the M application interfaces, an image comprising the N application interfaces and display the image; and before sending the first data to an external display device, the electronic device further performs the following operation:

obtaining the synthesized image of the M application interfaces and the first display information of the N application interfaces.

14. The electronic device according to claim 9, wherein the receiving of a first selection operation comprises:

receiving a first input;

in response to the first input, displaying M projection add controls on the display, wherein the M projection add controls respectively correspond to the M application interfaces;

receiving a second input from a user to trigger N of the M projection add controls; and the sending first data to an external display device in response to the first selection operation comprises:

determining the N application interfaces selected by the user based on the second input, and sending, to the external display device, the first data used to display the N application interfaces.

15. The electronic device according to claim 9, wherein the receiving of a first selection operation comprises:

receiving a first input;

in response to the first input, displaying M projection add controls and an OK button on the display, wherein the M projection add controls respectively correspond to the M application interfaces;

receiving a second input from a user to trigger N of the M projection add controls;

receiving a third input from the user to trigger the OK button; and the sending first data to an external display device in response to the first selection operation comprises:

determining the N application interfaces selected by the user based on the second input; and in response to the third input, sending, to the external display device, the first data used to display the N application interfaces.

16. The electronic device according to claim 14, wherein the electronic device further performs the following operations:

after any projection add control is triggered, displaying a projection cancel control corresponding to the projection add control, wherein the projection cancel control is used by the user to cancel projection of an application interface corresponding to the projection cancel control;

receiving a fourth input used by the user to trigger the projection cancel control; and in response to the fourth input, stopping sending, to the external display device, image data of the application interface corresponding to the projection cancel control.

17. The electronic device according to claim 9, wherein the receiving of a first selection operation comprises:

receiving a fifth input;

in response to the fifth input, displaying a shortcut menu on the display, wherein the shortcut menu comprises M options, and the M options respectively correspond to the M application interfaces;

receiving a sixth input used to select N of the M options; and the sending first data to an external display device in response to the first selection operation comprises:

determining the N application interfaces selected by a user based on the sixth input, and sending, to the external display device, the first data used to display the N application interfaces.

18. The electronic device according to claim 9, wherein the receiving of a first selection operation comprises:

receiving a fifth input;

in response to the fifth input, displaying a shortcut menu on the display, wherein the shortcut menu comprises M options and an OK button, and the M options respectively correspond to the M application interfaces;

receiving a sixth input used to select N of the M options;

receiving a seventh input used by a user to trigger the OK button; and the sending first data to an external display device in response to the first selection operation comprises:

determining the N application interfaces selected by the user based on the sixth input; and in response to the seventh input, sending, to the external display device, the first data used to display the N application interfaces.

* * * * *